(12) United States Patent
Hamasako et al.

(10) Patent No.: US 12,524,754 B2
(45) Date of Patent: Jan. 13, 2026

(54) INFORMATION PROCESSING METHOD, PROGRAM, AND TERMINAL

(71) Applicant: LINE Financial Corporation, Seongnam-si (KR)

(72) Inventors: Ryosuke Hamasako, Tokyo (JP); Yosuke Mazaki, Tokyo (JP)

(73) Assignee: LINE Financial Corporation, Seongnam-si (KR)

( * ) Notice: Subject to any disclaimer, the term of this patent is extended or adjusted under 35 U.S.C. 154(b) by 126 days.

(21) Appl. No.: 17/552,127

(22) Filed: Dec. 15, 2021

(65) Prior Publication Data

US 2022/0108298 A1    Apr. 7, 2022

Related U.S. Application Data

(63) Continuation of application No. PCT/JP2020/020259, filed on May 22, 2020.

(30) Foreign Application Priority Data

Jun. 28, 2019   (JP) ................................. 2019-121661

(51) Int. Cl.
*G06Q 40/00*    (2023.01)
*G06Q 20/06*    (2012.01)
(Continued)

(52) U.S. Cl.
CPC ....... *G06Q 20/3276* (2013.01); *G06Q 20/065* (2013.01); *G06Q 20/3278* (2013.01); *G06Q 20/409* (2013.01)

(58) Field of Classification Search
CPC ................................................ G06Q 20/3278
See application file for complete search history.

(56) References Cited

U.S. PATENT DOCUMENTS

| 2003/0177068 | A1  | 9/2003  | Fujimoto |
| 2017/0017983 | A1* | 1/2017  | Murata ............. G06Q 30/0207 |
| 2017/0352090 | A1* | 12/2017 | Liu .................... G06Q 30/0635 |

FOREIGN PATENT DOCUMENTS

| CN | 111178868 A  | * 5/2020 | ....... G06Q 20/40145 |
| JP | 2002-176671 A |   6/2002 | |

(Continued)

OTHER PUBLICATIONS

Information Security Stack Exchange (Encryption—Is this a safe way to identify someone through a QR code for a purchase?, p. 3-4, https://security.stackexchange.com/questions/169061/is-this-a-safe-way-to-identify-someone-through-a-qr-code-for-a-purchase, 2017) (Year: 2017).*

(Continued)

*Primary Examiner* — Mark H Gaw
(74) *Attorney, Agent, or Firm* — Sughrue Mion, PLLC

(57) ABSTRACT

An information processing method and a terminal for processing information are provided. The information processing method includes: receiving, by the terminal from a server, first information for making a payment using a code image; storing the first information in a storage of the terminal; displaying, by a display of the terminal, the code image based on the first information; processing, by the terminal, the payment based on the displaying of the code image; and displaying, by the display, second information based on the processing of the payment, the second information indicating the first information is not stored in the storage.

14 Claims, 52 Drawing Sheets

(51) Int. Cl.
    *G06Q 20/32*     (2012.01)
    *G06Q 20/40*     (2012.01)

(56) References Cited

FOREIGN PATENT DOCUMENTS

| | | | |
|---|---|---|---|
| JP | 2004213362 A | * | 7/2004 |
| JP | 2005-301482 A | | 10/2005 |
| JP | 2007-086949 A | | 4/2007 |
| JP | 2007-293834 A | | 11/2007 |
| JP | 2017-027252 A | | 2/2017 |
| JP | 2018-022451 A | | 2/2018 |
| KR | 10-2018-0048024 A | | 5/2018 |

OTHER PUBLICATIONS

International Search Report for PCT/JP2020/020259 dated Aug. 11, 2020 [PCT/ISA/210].
Written Opinion for PCT/JP2020/020259 dated Aug. 11, 2020 [PCT/ISA/237].
Office Action for Japanese Application No. 2019-121661 dated Aug. 4, 2021.
English Translation of Written Opinion issued by the International Searching Authority on Aug. 11, 2020 in International Application No. PCT/JP2020/020259.
Korean Office Action dated Dec. 18, 2023 in Korean Application No. 10-2021-7041815.
Korean Office Action dated Aug. 27, 2024 in Application No. 10-2021-7041815.
Office Action issued Dec. 12, 2024 in Korean Application No. 10-2021-7041815.

* cited by examiner

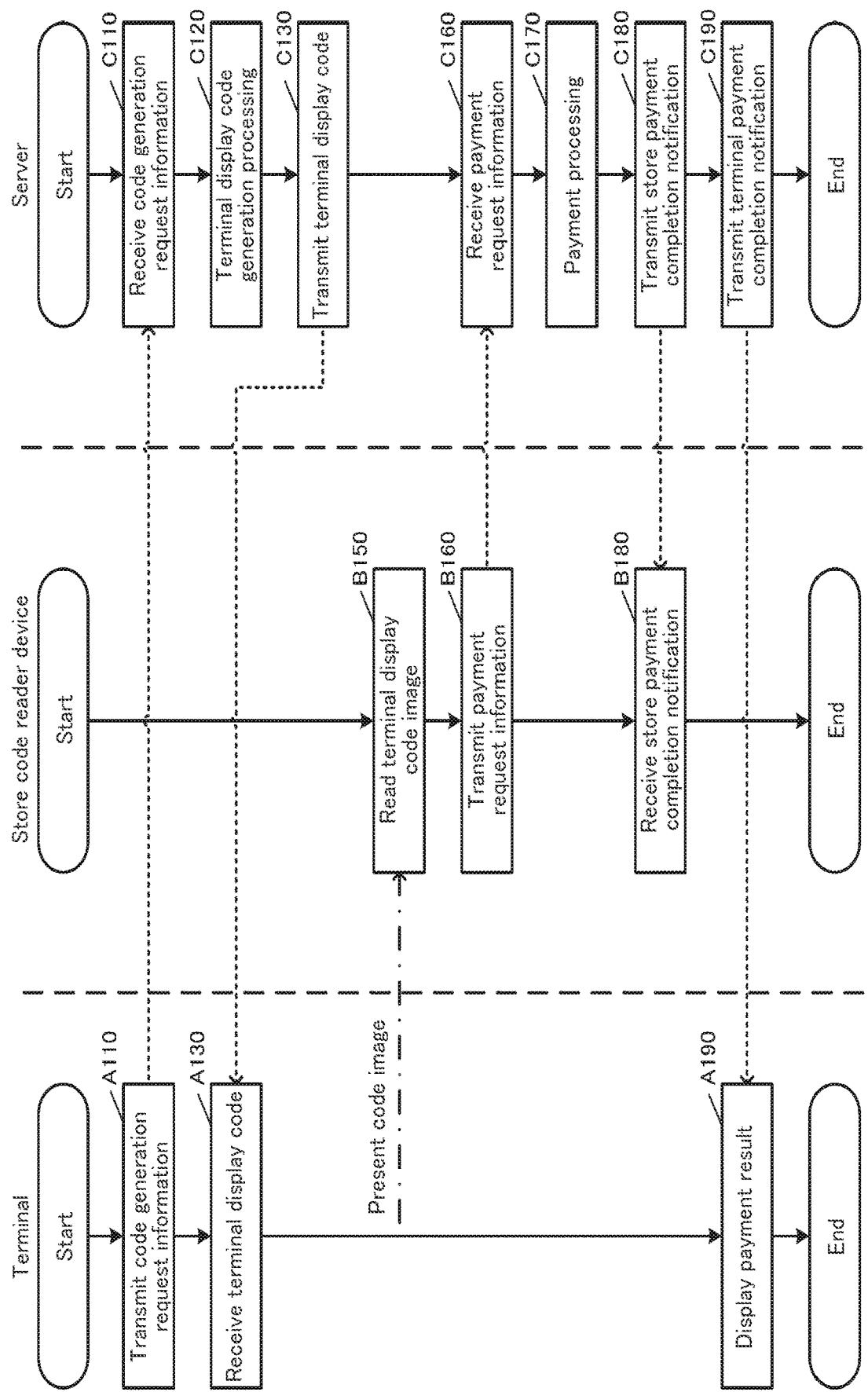

| User name | Terminal telephone number | Terminal mail address | Application ID | Authentication password | Other registration information |
|---|---|---|---|---|---|
| A. A | 090-XXXX-XXXX | *****@.ne.jp | U0001 | ********* | [ ... ] |
| B. B | 090-XXXX-XXXX | ****@.ne.jp | U0002 | *********** | [ ... ] |
| C. C | 080-XXXX-XXXX | ******@.ne.jp | U0003 | ********* | [ ... ] |
| ... | ... | ... | ... | ... | ... |

| Business category | Store name | Store position information | Store POS system information | Store ID |
|---|---|---|---|---|
| Convenience store | Convenience store M | { ... } | { ... } | S00001 |
| | Convenience store N | { ... } | { ... } | S00002 |
| | ⋮ | ⋮ | ⋮ | ⋮ |
| Supermarket | Supermarket P | { ... } | { ... } | S01001 |
| | Q mart | { ... } | { ... } | S01002 |
| | ⋮ | ⋮ | ⋮ | ⋮ |
| Drug store | Drug store S | { ... } | { ... } | S02001 |
| | T drug | { ... } | { ... } | S02002 |
| | ⋮ | ⋮ | ⋮ | ⋮ |
| Bar | Bar X | { ... } | { ... } | S03001 |
| | Bar Y | { ... } | { ... } | S03002 |
| | ⋮ | ⋮ | ⋮ | ⋮ |
| Department store | ⋮ | ⋮ | ⋮ | ⋮ |
| ⋮ | ⋮ | ⋮ | ⋮ | ⋮ |

Payment management data

| Application ID | U0001 |
|---|---|
| Balance | ¥25,000 |
| Points | 500 |
| Daily maximum amount setting | ¥10,000 |
| Auto-reload setting | OFF |

Payment history data

| | Payment date and time | Payment store ID | Payment store name | Paid amount |
|---|---|---|---|---|
| New ↑ | 2019///: | S00002 | Convenience store N | ¥500 |
| | 2019///: | S02001 | Drug store S | ¥2,500 |
| ↓ Old | ⋮ | ⋮ | ⋮ | ⋮ |

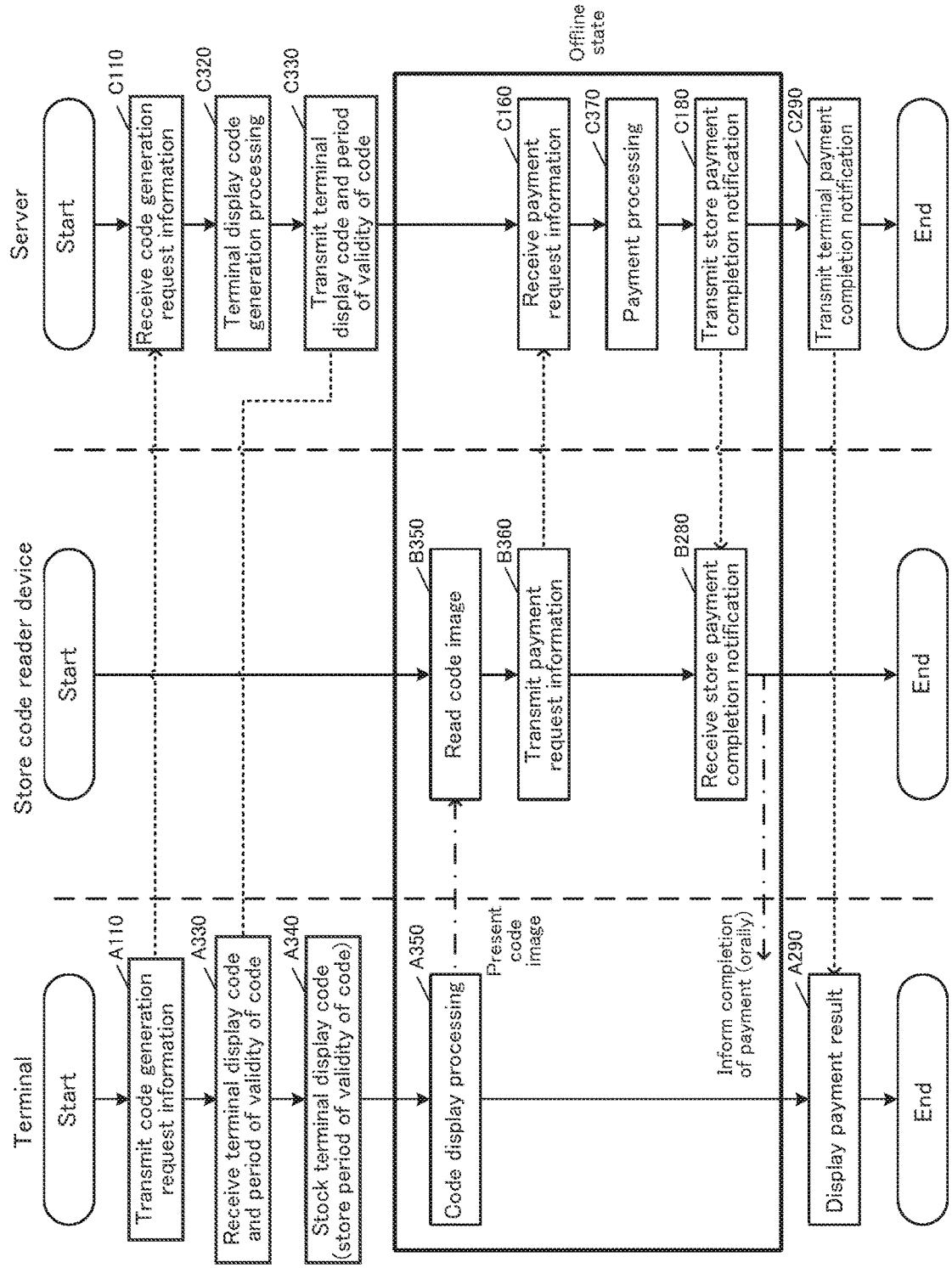

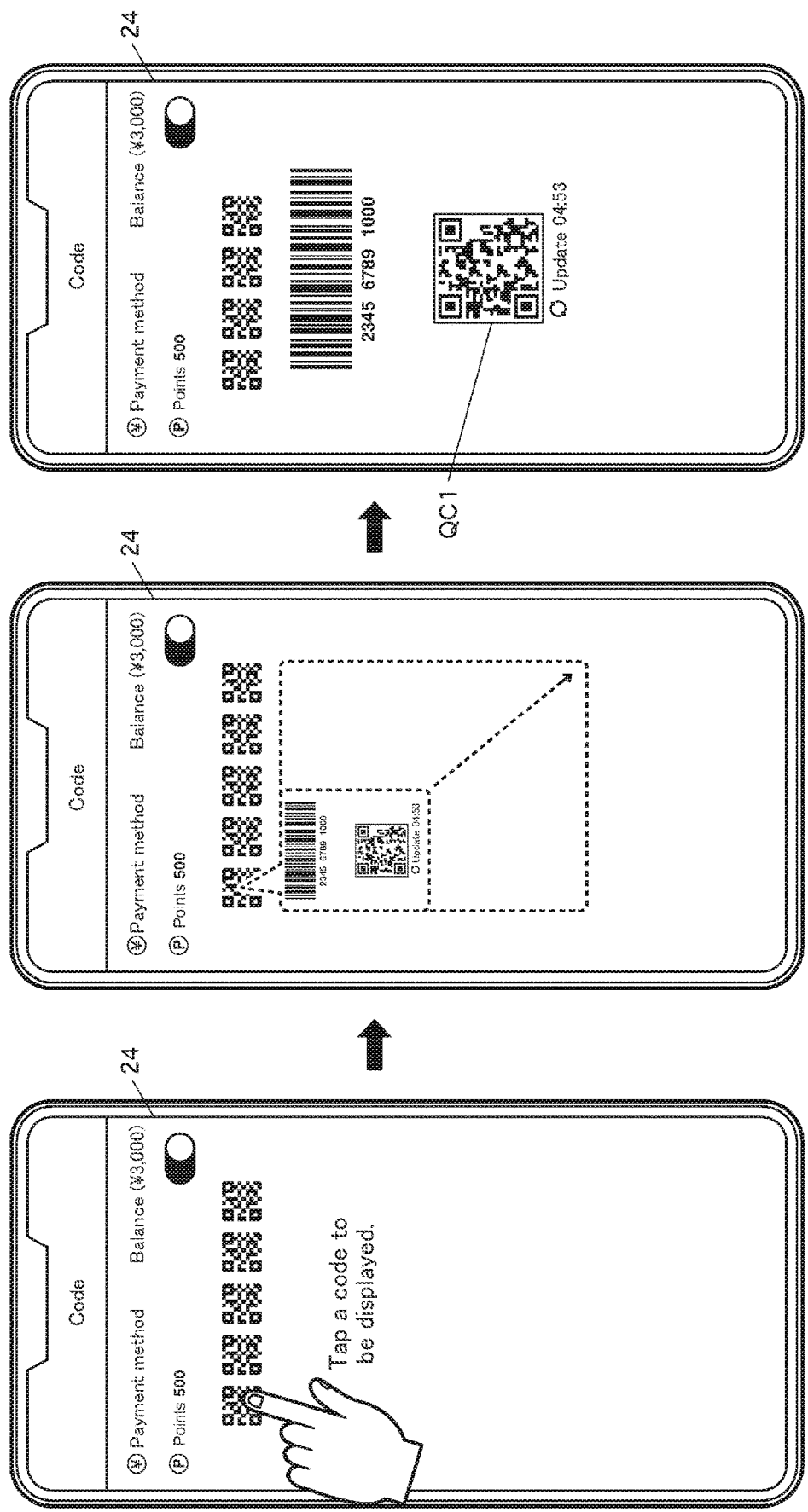

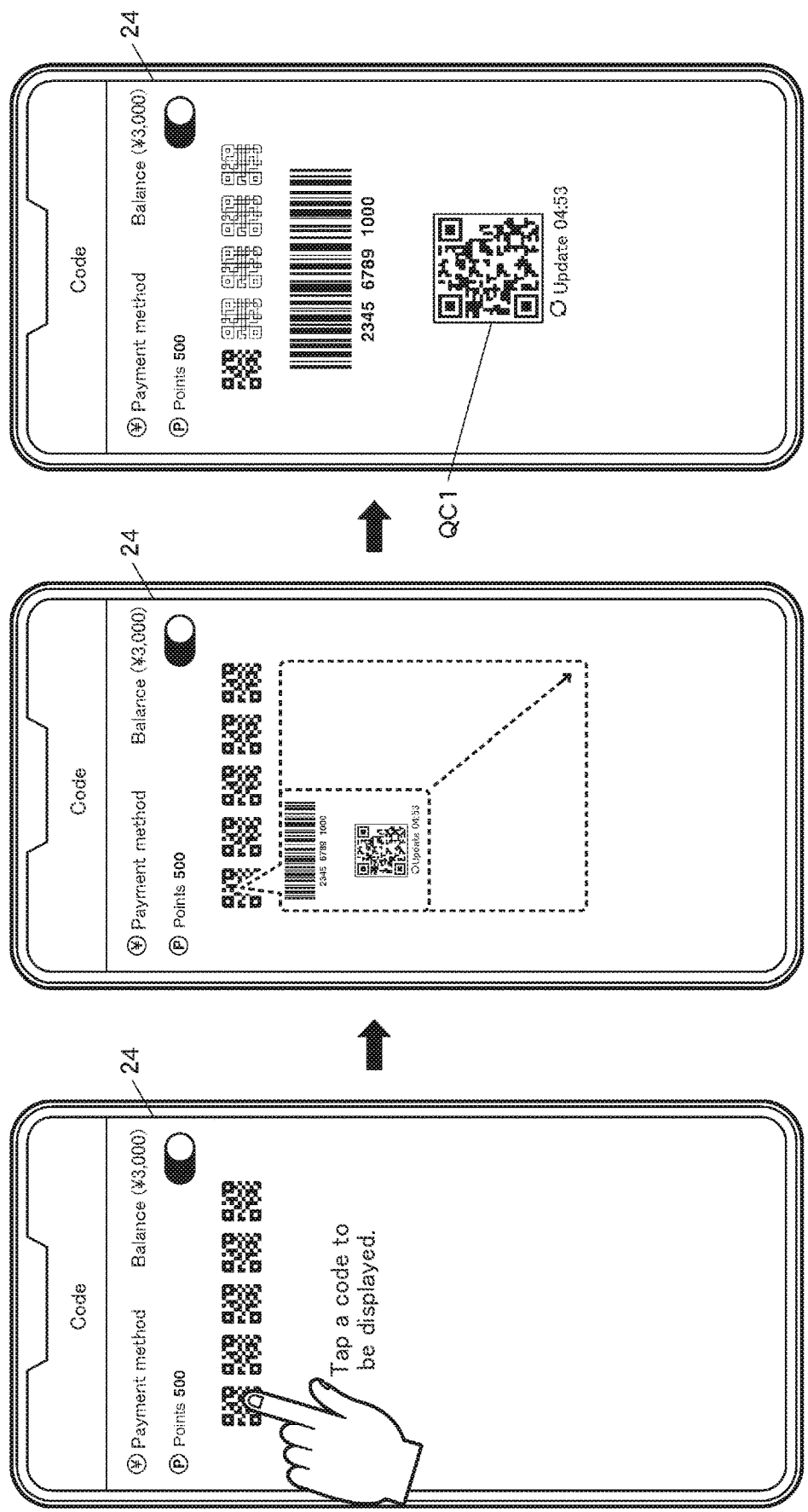

INFORMATION PROCESSING METHOD, PROGRAM, AND TERMINAL

CROSS-REFERENCE TO RELATED APPLICATIONS

This application is a by-pass continuation application of International Application No. PCT/JP2020/020259, filed on May 22, 2020, which claims priority from Japanese Patent Application No. 2019-121661, filed on Jun. 28, 2019, in the Japanese Patent Office, the disclosures of which are incorporated by reference herein in their entireties.

BACKGROUND

1. Technical Field

The present disclosure relates to an information processing method, a program, and a terminal.

2. Description of Related Art

Nowadays, mobile payments or electronic payments are widely used as popular alternatives to traditional payment models. Mobile and/or electronic payment services may allow users to send and/or receive funds from person to person, through mobile devices (e.g., smartphones, tablets), and may allow businesses to process payments that are made in-store through mobile devices.

SUMMARY

According to an aspect of the disclosure, there is provided an information processing method of a terminal, the information processing method including: receiving, by the terminal from a server, first information for making a payment using a code image; storing the first information in a storage of the terminal; displaying, by a display of the terminal, the code image based on the first information; processing, by the terminal, the payment based on the displaying of the code image; and displaying, by the display, second information based on the processing of the payment, the second information indicating the first information is not stored in the storage.

According to an aspect of the disclosure, there is provided a non-transitory computer-readable storage medium storing a program that, when executed by at least one processor of a terminal, causes the terminal to: receive, from a server, first information for making a payment using a code image; store, in a storage of the terminal, the first information; display, by a display of the terminal, the code image based on the first information; process the payment, based on the display of the code image; and display, by the display, second information based on the processing of the payment, the second information indicating that the first information is not stored in the storage.

According to an aspect of the disclosure, there is provided a terminal for processing information, the terminal including: a communication interface configured to receive, from a server, first information for making a payment using a code image; a storage; a display; and a processor configured to: store, in the storage, the first information, control the display to display the code image based on the first information, process the payment based on the display of the code image in the display region, and control the display to display second information based on the processing of the payment, the second information indicating that the first information is not stored in the storage.

According to an aspect of the disclosure, there is provided terminal for processing information, the terminal including: a communication interface; a display; a storage storing instructions; and a processor configured to execute the instructions to: receive, from a server via the communication interface, first information for making a payment using a code image; store, in the storage, the first information; control the display to display the code image based on the first information; process the payment based on the display of the code image; and control the display to display second information based on the processing of the payment, the second information indicating that the first information is not stored in the storage.

BRIEF DESCRIPTION OF THE DRAWINGS

FIG. 3A is a flowchart showing a first example flow of processing that is executed by various devices in an aspect of an embodiment.

FIG. 4C is a diagram showing an example of user registration data according to the first embodiment.

FIG. 4D is a diagram showing an example of store registration data according to the first embodiment.

FIG. 4E is a diagram showing an example of a payment management database according to the first embodiment.

FIG. 5I is a flowchart showing an example flow of processing that is executed by various devices according to the second embodiment.

FIG. 6B is a diagram showing a second example of the display screen of the terminal according to the third embodiment.

FIG. 6C is a diagram showing a third example of the display screen of the terminal according to the third embodiment.

DETAILED DESCRIPTION

Figure 1:
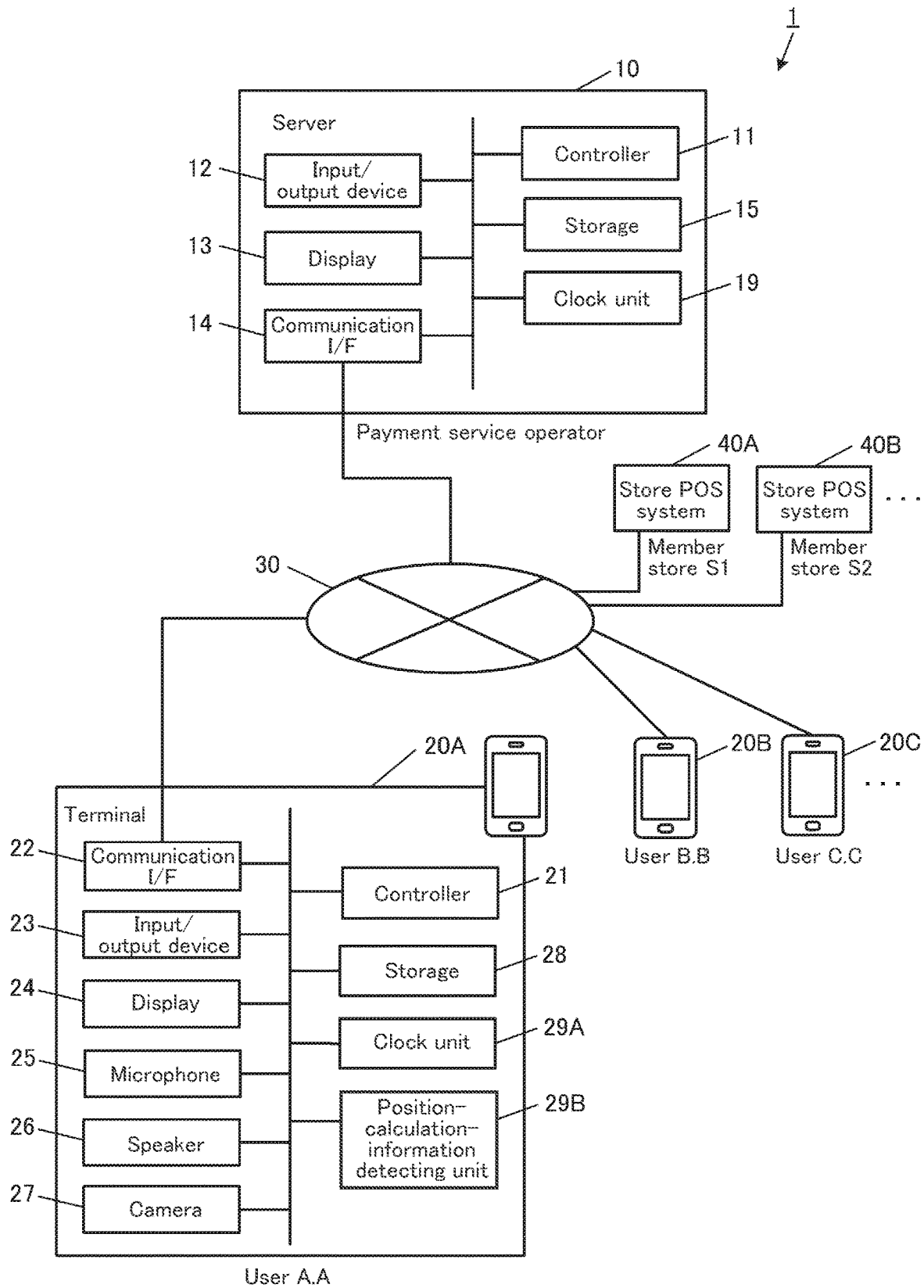
FIG. 1 is a diagram showing an example of a configuration of a communication system in an aspect of an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments may be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a diagram showing an example of a configuration of a communication system 1 according to an embodiment of the present disclosure.

As shown in FIG. 1, in the communication system 1, a server 10, terminals 20 (e.g., terminals 20A, 20B, 20C, . . . ), and store point-of-sale (POS) systems 40 (e.g., store POS 40A, store POS 40B, . . . ) are connected (e.g., communicatively coupled) to each other via a network 30.

The server 10 provides, via the network 30 to the terminals 20 used by respective users (e.g., user A.A, user B.B, user C.C, . . . ), a service for enabling the terminals 20 to transmit and/or receive content including messages and the like. Alternatively or additionally, the server 10 provides a service (hereinafter referred to as a "payment service") for processing an electronic payment (a non-limiting example of payment) by communicating with the terminals 20. Note that there is no limitation on the number of terminals 20 connected to the network 30.

The network 30 serves to connect one or more terminals 20, one or more servers 10, and one or more store POS systems 40 to each other. That is, the network 30 serves as a communication network that provides a connection path to enable the various types of devices described above to transmit and/or receive data after the devices are connected to each other.

One or more portions of the network 30 may be a wired network and/or a wireless network. Non-limiting examples of the network 30 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a mobile phone network, integrated service digital networks (ISDNs), a radio LAN, long term evolution (LTE), code division multiple access (CDMA), Bluetooth™, satellite communication, and a combination of two or more of these networks. The network 30 may be constituted by a single network 30 or a plurality of networks 30.

The terminals 20, each being a non-limiting example of a terminal or an information processing device, may be any information processing terminal capable of implementing functions described in embodiments of the present disclosure. Non-limiting examples of the terminals 20 include a smartphone, a mobile phone (e.g., a feature phone), a computer (non-limiting examples of which include a desktop, a laptop, and a tablet), a media computer platform (non-limiting examples of which include cable and satellite set-top boxes and a digital video recorder), a handheld computer device (non-limiting examples of which include a personal digital assistant (PDA) and an electronic mail client), a wearable terminal (non-limiting examples of which may include an eyeglasses-type device, a watch-type device, and the like), and other types of computers and communication platforms. In some embodiments, the terminals 20 may be referred to as "information processing terminals".

In some embodiments, configurations of the terminals 20A, 20B, and 20C may substantially be the same as each other. Alternatively or additionally, a terminal that is used by a user X will be referred to as a "terminal 20X", and user information that is associated with the user X and/or the terminal 20X in a predetermined service will be referred to as "user information X", as necessary. The user information is information regarding a user associated with an account that is employed by the user in the predetermined service. Non-limiting examples of the user information include information that is input by the user and/or is assigned by the predetermined service, and is associated with the user, such as a name of the user, an icon image of the user, an age of the user, a gender of the user, an address of the user, hobbies/preferences of the user, and a user identifier. Alternatively or additionally, the user information may be any one of or a combination of two or more of these pieces of information.

The server 10 (a non-limiting example of a server, an information processing device, or an information management device) is configured to provide a predetermined service to the terminal 20. The server 10 may be any information processing device capable of implementing functions described in embodiments of the present disclosure. Non-limiting examples of the server 10 include a server device, a computer (non-limiting examples of which include a desktop, a laptop, and a tablet), a media computer platform (non-limiting examples of which include cable and satellite set-top boxes and a digital video recorder), a handheld computer device (non-limiting examples of which include a PDA and an electronic mail client), and other types of computers and communication platforms. In some embodiments, the server 10 may be referred to as an "information processing device". If there is no need to distinguish the server 10 and the terminal 20, either one or both of the server 10 and the terminal 20 may be referred to as an "information processing device".

In the following embodiments, the server 10 may provide a payment service that is implemented using a payment application, for example.

Each store POS system 40 is a POS system that is installed in a store, that is used in a store, and/or that is associated with a business operator that operates the server 10.

In some embodiments, the store POS system 40 includes a store code reader device 50, a code register 60, and a store server 70, for example, without limitation thereto.

Hardware (HW) Configurations of Devices

HW configurations of the devices included in the communication system 1 will be described.

(1) HW Configuration of Terminal

FIG. 1 shows an example of the HW configuration of the terminal 20.

The terminal 20 includes a controller 21 (e.g., a central processing unit (CPU) or processor), a storage 28, a communication interface (I/F) 22, an input/output (I/O) device 23, a display 24, a microphone 25, a speaker 26, a camera 27, a clock unit 29A, and a position-calculation-information detecting unit 29B. The HW constituent elements of the terminal 20 are connected (e.g., communicatively coupled) to each other via a bus B, for example, without limitation thereto. In some embodiments, the HW configuration of the terminal 20 may not include all of the constituent elements shown in FIG. 1. For example, the terminal 20 may be configured such that one or more constituent elements, such as the microphone 25 and/or the camera 27, are removable.

The communication I/F 22 transmits and/or receives various types of data via the network 30. The communication may be carried out in a wired and/or a wireless manner, and may be based on any communication protocol that enables mutual communication to be carried out. The communication I/F 22 may communicate with various types of devices such as the server 10 via the network 30. The communication I/F 22 transmits various types of data to the various types of devices, such as the server 10, in accordance with instructions from the controller 21. Alternatively or additionally, the communication I/F 22 receives various types of data transmitted from the various types of devices, such as the server 10, and conveys the received data to the controller 21. In some embodiments, the communication I/F 22 may be referred to as a "communication interface". Alternatively or additionally, the communication I/F 22 may be referred to as a "communication circuit" in cases where the communication I/F 22 is constituted by a physically structured circuit.

The input/output device 23 includes a device that inputs various operations made to the terminal 20 and/or a device that outputs a result of processing performed by the terminal 20. Alternatively or additionally, the input/output device 23 may be constituted by an input device and/or an output device that are configured as a single device and/or as multiple devices that are separate from each other.

The input device is implemented by any one of or a combination of two or more types of devices capable of accepting input from a user and conveying information regarding the input to the controller 21. Non-limiting examples of the input device include a touch panel, a touch display, hardware keys of a keyboard or the like, a pointing device such as a mouse, a camera (e.g., input of operations via moving images), and a microphone (e.g., input of operations using voice).

The output device is implemented by any one of or a combination of two or more types of devices capable of outputting a result of processing performed by the controller 21. Non-limiting examples of the output device include a touch panel, a touch display, a speaker (e.g., audio output), a lens configured to produce image output (non-limiting examples of which include three-dimensional (3D) image output and hologram image output), and a printer.

The display 24 is implemented by any one of or a combination of two or more types of devices capable of providing display in accordance with display data written in a frame buffer. Non-limiting examples of the display 24 include a touch panel, a touch display, a monitor (non-limiting examples of which include a liquid crystal display and an organic electroluminescence display (OELD)), a head mounted display (HDM), and devices capable of displaying images, text information, and the like using projection mapping or holograms, or in the air (and/or a vacuum). Alternatively or additionally, the display 24 may be capable of displaying display data in 3D.

In some embodiments, if the input/output device 23 is a touch panel, the input/output device 23 and the display 24 may have substantially the same size and shape and be arranged opposing each other.

The clock unit 29A is a built-in clock of the terminal 20 and outputs time information (e.g., time measurement information). The clock unit 29A is configured to include a clock that employs a crystal oscillator, for example, without limitation thereto. In some embodiments, the clock unit 29A may be referred to as a "time measurement unit" and/or a "time information detecting unit", for example, without limitation thereto.

In other embodiments, the clock unit 29A may include a clock to which Network Identity and Time Zone (NITZ) standards or the like are applied.

The position-calculation-information detecting unit 29B is a functional unit that detects (and/or measures) information (hereinafter referred to as "position calculation information") that the controller 21 may use to calculate (and/or measure) the position of the terminal 20. In some embodiments, the position-calculation-information detecting unit 29B may be referred to as a "position calculation sensor unit", for example, without limitation thereto.

In other embodiments, the position-calculation-information detecting unit 29B may be excluded from the constituent elements of the terminal 20.

Non-limiting examples of the position-calculation-information detecting unit 29B include a satellite positioning sensor (e.g., a satellite positioning unit), such as a sensor and/or a unit for calculating the position of the terminal 20 using a satellite positioning system such as Global Positioning System (GPS), and an inertial measurement sensor (e.g., an Inertial Measurement Unit (IMU)), such as a sensor and/or a unit for calculating the position of the terminal 20 using an inertial navigation system.

The satellite positioning unit includes a Radio Frequency (RF) receiving circuit that converts RF signals, which include a positioning satellite signal emitted from a positioning satellite and received by an antenna, into digital signals and a baseband processing circuit that captures the positioning satellite signal by performing correlation operation processing or the like on a digital signal output from the RF receiving circuit and outputs information such as satellite orbit data and time data that are taken from the positioning satellite signal, as position calculation information, for example, without limitation thereto.

The inertial measurement unit includes an inertial sensor that detects information necessary to calculate the position of the terminal 20 through an inertial navigation operation. The inertial sensor includes a three-axis acceleration sensor and a three-axis gyroscope sensor, for example, without limitation thereto, and outputs acceleration detected by the acceleration sensor and angular velocity detected by the gyroscope sensor, as position calculation information.

The controller 21 includes a physically structured circuit for executing functions that are implemented in accordance with codes or commands included in a program, and is implemented by a data processing device embedded in hardware, for example, without limitation thereto. Accordingly, in some embodiments, the controller 21 may be referred to as a "control circuit".

Non-limiting examples of the controller 21 include a central processing unit (CPU), a microprocessor, a processor core, a multiprocessor, an Application-Specific Integrated Circuit (ASIC), and a Field Programmable Gate Array (FPGA).

The storage 28 may store various programs and various types of data that are necessary for the terminal 20 to operate. Non-limiting examples of the storage 28 include various storage media such as a Hard Disk Drive (HDD), a Solid State Drive (SSD), a flash memory, a Random Access Memory (RAM), and a Read Only Memory (ROM). In some embodiments, the storage 28 may be referred to as a "memory".

The terminal 20 stores a program P in the storage 28, and the controller 21 executes the program P to perform operations according to the program P while serving as units that are included in the controller 21. That is, the program P stored in the storage 28 causes the terminal 20 to implement functions executed by the controller 21. In some embodiments, the program P may be referred to as a "program module" or as "computer-readable instructions".

The microphone 25 is used to input audio data. The speaker 26 is used to output audio data. The camera 27 is used to acquire moving image data.

(2) HW Configuration of Server

FIG. 1 shows an example of the HW configuration of the server 10.

The server 10 includes a controller 11 (e.g., CPU), a storage 15, a communication I/F 14, an I/O device 12 (e.g., an IOI/F), a display 13, and a clock unit 19. The HW constituent elements of the server 10 are connected to each other via a bus B, for example, without limitation thereto. In some embodiments, the HW configuration of the server 10 may not include all of the constituent elements. In some embodiments, the HW of the server 10 may be configured such that the display 13 is removable.

The controller 11 includes a physically structured circuit for executing functions that are implemented in accordance with codes or commands included in a program, and is implemented by a data processing device embedded in hardware, for example, without limitation thereto.

The controller 11 may include a CPU, and may be a implemented as microprocessor, a processor core, a multi-processor, an ASIC, or an FPGA. In the present disclosure, the controller 11 is not limited to these examples.

The storage 15 may store various programs and various types of data that are necessary for the server 10 to operate. The storage 15 is implemented by various storage media such as an HDD, an SSD, and a flash memory. However, in the present disclosure, the storage 15 is not limited to these examples. In some embodiments, the storage 15 may be referred to as a "memory".

The communication I/F 14 transmits and receives various types of data via the network 30. The communication may be carried out in a wired or wireless manner, and may be based on any communication protocol that enables mutual communication to be carried out. The communication I/F 14 may communicate with various types of devices such as the terminal 20 via the network 30. The communication I/F 14 transmits various types of data to the various types of devices such as the terminal 20 in accordance with instructions from the controller 11. Alternatively or additionally, the communication I/F 14 receives various types of data transmitted from the various types of devices such as the terminal 20 and conveys the data to the controller 11. The communication I/F 14 may be referred to as a "communication interface". Alternatively or additionally, the communication I/F 14 may be referred to as a "communication circuit" in cases where the communication I/F is constituted by a physically structured circuit.

The input/output device 12 is implemented by a device that inputs various operations that are made to the server 10. The input/output device 12 is implemented by any one of or a combination of two or more of all types of devices capable of accepting input from a user and conveying information regarding the input to the controller 11. The input/output device 12 is implemented by hardware keys, a typical example of which is a keyboard, and a pointing device such as a mouse. In some embodiments, the input/output device 12 may include a touch panel, a camera (input of operations via moving images), or a microphone (input of operations using voice). However, in the present disclosure, the input/output device 12 is not limited to these examples.

The display 13 may be implemented as a display monitor. Non-limiting examples of the display 13 may include a liquid crystal display, an organic electroluminescence display (OELD), a head mounted display (HDM) or the like. In other embodiments, the display 13 may be capable of displaying display data in 3D. In the present disclosure, the display 13 is not limited to these examples.

The clock unit 19 is a built-in clock of the server 10 and outputs time information (e.g., time measurement information). The clock unit 19 is configured to include an Real Time Clock (RTC) as a hardware clock, a system clock, and the like, for example, without limitation thereto. The clock unit 19 may be referred to as a "time measurement unit" or a "time information detecting unit", for example, without limitation thereto.

(3) Configuration of Store POS System

Figure 2:
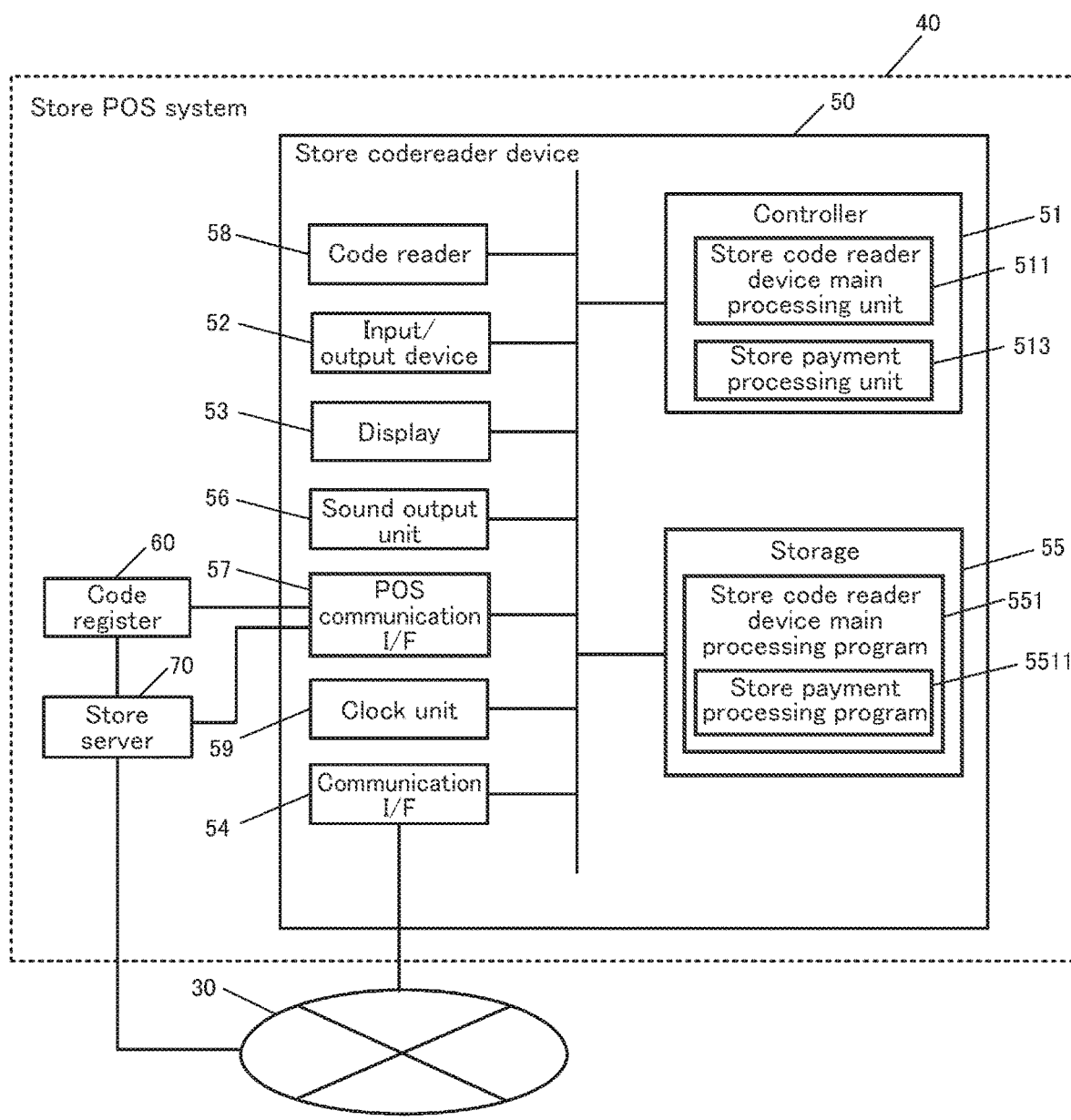
FIG. 2 is a diagram showing an example of a system configuration of a store point-of-sale (POS) system in an aspect of an embodiment.

FIG. 2 shows an example of a system configuration of a store POS system 40.

The store POS system 40 is a POS system that is installed in a store, that is used in a store, and/or that is associated with the business operator operating the server 10. The store POS system 40 includes the store code reader device 50, the code register 60, and the store server 70, for example, although there is no limitation thereto.

The store code reader device 50 is communicably connected to the code register 60 and the store server 70 through a POS communication I/F 57 (non-limiting examples of which include a wired communication I/F and a wireless communication I/F in the store), and reads a terminal display code image that is displayed in the display 24 of the terminal 20 when payment is to be made using the code register 60. Upon reading the terminal display code image, the store code reader device 50 transmits payment request information through a communication I/F 54 to the server 10, and receives information (e.g., a store payment completion notification, which will be described later) regarding a payment result from the server 10 through the communication I/F 54 after payment is carried out by the server 10.

The store code reader device 50 includes a controller 51 (e.g., a CPU or processor), an input/output device 52, a display 53, the communication I/F 54, a storage 55, a sound output unit 56, the POS communication I/F 57, a code reader 58, and a clock unit 59, for example, without limitation thereto.

The code reader 58 is for reading two-dimensional codes, and the code reader 58 described in the present disclosure includes a two-dimensional code reader (e.g., a quick response (QR) code reader) for reading terminal display codes that are two-dimensional codes (e.g., QR codes) displayed in the display 24 of the terminal 20 and presented by the user of the terminal 20.

The code register 60 is communicably connected to the store code reader device 50 and the store server 70 through the POS communication I/F 57, for example, without limitation thereto, and issues a receipt on which information such as the total amount of sold goods and the balance of electronic money of the user of the terminal 20 is printed based on a store payment completion notification received by the store code reader device 50 from the server 10. For example, some embodiments may provide a display that is provided together with the code register 60 as a single unit or is separate from the code register 60, and includes a display surface configured to face a customer. The code register 60 is a register that is configured to support the payment application, and may be referred to as a stationary terminal that supports the payment application.

The store server 70 manages various types of information such as store information regarding the store, information regarding goods sold at the store, information regarding services provided at the store, and information regarding sales of goods sold at the store and services provided at the store, for example, without limitation thereto. The store server 70 is configured to communicate with the store code reader device 50 and the code register 60 through the POS communication I/F 57 and communicate with external devices such as the server 10 via the network 30.

In some embodiments, the store server 70 may not be configured to directly communicate with the store code reader device 50, and/or may be configured to communicate with the store code reader device 50 via the code register 60. For example, some embodiments, may provide for a configuration in which a store payment completion notification received by the store code reader device 50 from the server 10 is transmitted to the code register 60, and thereafter transmitted from the code register 60 to the store server 70.

(4) Others

The server 10 stores the program P in the storage 15, and the controller 11 executes the program P to execute processing while serving as units that are included in the controller 11. That is, the program P stored in the storage 15 causes the server 10 to implement functions executed by the controller 11. In some embodiments, the program P may be referred to as a "program module" and/or as "computer-readable instruction".

This also applies to other devices.

Embodiments of the present disclosure are implemented by enabling and/or configuring CPU(s) of the terminal 20 and/or of the server 10 to execute the program P.

This also applies to other devices.

In some embodiments, the controller 21 of the terminal 20 and/or the controller 11 of the server 10 may perform operations using the CPU(s) including a control circuit, and/or a logic circuit (hardware) or a dedicated circuit that is formed on an integrated circuit (e.g., an Integrated Circuit (IC) chip or a Large Scale Integration (LSI) chip or the like). Alternatively or additionally, these circuits may be implemented by one or more integrated circuits, and a plurality of types of processing described in the embodiments may be implemented by a single integrated circuit. LSI may be referred to as VLSI, super LSI, ultra LSI, or the like depending on the degree of integration. Accordingly, the controller 21 may be referred to as a "control circuit".

This also applies to other devices.

The program P (non-limiting examples of which include a software program, a computer program, and a program module) in the embodiments of the present disclosure may be provided in a state where the program is stored in a computer-readable storage medium. The program P may be stored in a "non-transitory tangible medium". Alternatively or additionally, the program P may be a program for implementing some of the functions described in the embodiments of the present disclosure. Furthermore, the program P may be a differential file (e.g., a differential program) that is configured to implement the functions described in the embodiments of the present disclosure in combination with a program P that is already recorded in a storage medium.

The storage medium may include one or more semiconductor-based or other integrated circuits (ICs, non-limiting examples of which include FPGAs and ASICs), HDDs, hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM drives, secure digital cards, drives, any other appropriate storage media, and a suitable combination of two or more of these storage media. Where appropriate, the storage medium may consist only of a volatile storage medium or a non-volatile storage medium, or a combination of volatile and non-volatile storage media. Note that the storage medium is not limited to these examples, and may be any device or medium that is capable of storing the program P. Alternatively or additionally, the storage medium may be referred to as a "memory".

The server 10 and/or the terminal 20 may implement functions of a plurality of functional units described in the embodiments by reading the program P stored in the storage medium and executing the read program P.

This also applies to other devices.

The program P according to the present disclosure may be provided to the server 10 and/or the terminal 20 via any transmission medium (a communication network, broadcast waves, etc.) that is capable of transmitting the program. The server 10 and/or the terminal 20 implement(s) the functions of the functional units described in the embodiments by executing the program P downloaded via the Internet or the like, for example, without limitation thereto.

This also applies to other devices.

The embodiments of the present disclosure may be implemented in the form of a data signal in which the program P is embodied through electronic transmission.

In some embodiments, at least a portion of processing in the server 10 and/or the terminal 20 may be implemented through cloud computing constituted by one or more computers.

In some embodiments, at least a portion of processing in the terminal 20 may be carried out by the server 10. In this case, the server 10 may carry out at least a portion of processing carried out by functional units of the controller 21 of the terminal 20.

In some embodiments, at least a portion of processing in the server 10 may be carried out by the terminal 20. In this case, the terminal 20 may carry out at least a portion of processing carried out by functional units of the controller 11 of the server 10.

In the embodiments of the present disclosure, configurations for determination are not essential unless explicitly mentioned otherwise, and predetermined processing may be activated in case a determination condition is satisfied, or predetermined processing may be activated in case a determination condition is not satisfied, without limitation thereto.

The program according to the present disclosure is implemented using a script language such as ActionScript or JavaScript™, a compiler language such as Objective-C or Java™, or a markup language such as HyperText Markup Language 5 (HTML5), for example, although there is no limitation thereto.

In the present disclosure, the expression "through a communication I/F" is used as appropriate. This expression indicates that a device transmits and receives various types of information and data via the communication I/F (via a communication interface) based on control performed by a controller (e.g., a processor, and the like), for example, although there is no limitation thereto.

In the present disclosure, the term "time limit" may indicate a certain period of time. Alternatively or additionally, the word "period" may be used instead of or in addition to the term "time limit".

In some embodiments, the term "time limit" may be used with the meaning of a time point or date and time (e.g., a certain time point or certain date and time) at which the period ends.

First Embodiment

Recent years have seen widespread use of applications (e.g., application software) relating to network services such as applications (e.g., payment applications) for making electronic payments using electronic money, applications (e.g., remittance applications) for sending electronic money, and payment applications into which some or all functions of these applications are integrated, and the user of the terminal 20 may use various services relating to electronic money using these applications.

The following embodiments are embodiments in which payment is performed using a payment application that is stored and executed in the terminal 20, by the user of the terminal 20, for example, without limitation thereto. That is, methods for making payment commonly in an online state and an offline state are proposed.

In the following description, a business operator that provides a payment service using the payment application will be referred to as a "payment service operator". In some embodiments, the payment service operator may be referred to as an "operator providing the payment application" or an "operator of the server 10".

Alternatively or additionally, in the following description, it is assumed that the server 10 is operated and managed by the payment service operator. Alternatively or additionally, in the following description, the payment application is appropriately referred to as "Payment App" and shown as such in the drawings.

The payment application may be provided by the server 10 as an independent application that does not include functions of a messaging service (MS) or a composite application that includes the functions of an MS. Alternatively or additionally, the messaging service may include an instant messaging service (IMS) that enables transmission and reception of content such as simple messages between terminals 20.

Alternatively or additionally, the payment application may be provided by the server 10 as an independent application that does not include functions of a social networking service (SNS) or a composite application that includes the functions of an SNS.

In some embodiments, the MS (including the IMS) may be considered as being a form of an SNS. Accordingly, the MS and the SNS may be distinguished from each other, but do not necessarily have to be distinguished from each other.

Alternatively or additionally, stores that are associated with the payment service operator may be referred to as "member stores", and are shown as "member store S1", "member store S2", and so on in FIG. 1.

Alternatively or additionally, the term "electronic money" may refer to electronic money that is distinguished from physical money and is owned and managed by a user of the terminal 20 through a payment application installed on the terminal 20. Alternatively or additionally, the term "payment" may refer to electronic payment that is made using the electronic money.

In some embodiments, the term electronic money may be referred to as "digital currency (digital money)".

Alternatively or additionally, the terms legal tender or a virtual currency may also be used as "electronic money" or "digital currency (digital money)".

Alternatively or additionally, the term cryptocurrency (e.g., crypto-assets) may also be included in "electronic money" or "digital currency (digital money)".

Alternatively or additionally, physical money such as coupons may also be included in a virtual currency.

Payment Method (1) Online Payment

First, a method for making an online payment will be described as an aspect with reference to a flowchart.

In the following description, the term "online" indicates that the terminal 20 may communicate with an external device, such as the server 10, and the term "online state" indicates such a state of the terminal 20 that allows the terminal 20 to communicate with an external device, such as the server 10. Alternatively or additionally, the term "online payment" indicates payment that is carried out by the server 10 in the online state.

In some embodiments, communication between the terminal 20 and the server 10 is implemented using a first communication method in which a frequency band different from that used in wireless LAN communication is used, via base stations and the like that are installed by a telecommunications company (e.g., communication earner), for example, without limitation thereto. The first communication method includes packet communication (e.g., mobile data communication in the terminal 20), for example, without limitation thereto.

Alternatively or additionally, a second communication method that is different from the first communication method may be used as a communication method. The second communication method includes wireless LAN (e.g., Wireless-Fidelity (WiFi)), for example, without limitation thereto.

Alternatively or additionally, a state where the terminal 20 and the server 10 may communicate with each other using at least one of the first communication method and the second communication method may be defined as the "online state".

FIG. 3A is a flowchart showing an example flow of processing that is executed by devices in this case. Examples of operations which are executed by the controller 21 of the terminal 20, by the controller 51 of the store code reader device 50, and the controller 11 of the server 10 are shown in FIG. 3A.

Alternatively or additionally, the flowchart described below shows an example of operations carried out in the present embodiment, and some operations in the flowchart may also be omitted and/or additional operations may be added to the flowchart.

This also applies to other flowcharts described in the present disclosure.

First, upon receiving a payment request from a user or an external device, the controller 21 transmits code generation request information to request generation of a terminal display code to the server 10 through the communication I/F 22 (via the communication I/F 22) (operation A110).

In the following description, the term "code information" will be described as a concept that includes information (hereinafter referred to as "original information") that is to be stored or has been stored in a code image through encoding or the like and the term "code image" in which the original information is stored, for example, without limitation thereto. That is, in some embodiments, the "code information" includes the "original information" and the "code image".

Alternatively or additionally, the "original information" may be referred to as "encoded information", "stored information", or the like.

Alternatively or additionally, in the following description, "code" has substantially the same meaning as "code information", for example, without limitation thereto.

However, these definitions are merely examples, and there is no limitation thereto.

For example, the term "code information" may be used as having the meaning of "original information".

Alternatively or additionally, the word "code" may be used as having the meaning of the term "code image".

In the present embodiment, a "payment number" is described as an example of the "original information." The payment number may be a random number having a predetermined number of digits and may be uniquely generated by the server 10 for each terminal 20 that has transmitted the code generation request information or the user of the terminal 20. Alternatively or additionally, the payment number may be referred to as information that is associated with the terminal 20 or the user of the terminal 20 and is used for payment carried out by the server 10.

In the following description, a payment code that is generated by the server 10 based on the code generation request information will be referred to as a "terminal display code", and a code image of the terminal display code will be referred to as a "terminal display code image".

Although details will be described later, the payment number described above is stored in the terminal display code image.

The terminal display code image and the payment number are examples of "first information" for making a payment using a code image, and are transmitted from the server 10. The "first information" may contain information that enables a fund transfer from a mobile terminal (e.g., the terminal 20) to the store POS system 40, and may be presented to a product seller or a service provider (e.g., the store code reader device 50 of the store POS system 40) so that a customer (e.g., the user of the terminal 20) tenders a payment in exchange for goods and services. The "first information" may be also referred to as payment processing information which may be required by the store POS system 40 to process an electronic payment made by the terminal 20.

The following describes a case in which the code generation request information is information that requests the server 10 to generate the terminal display code image described above. That is, in this operation, the terminal 20 requests the server 10 to generate the terminal display code image, for example, without limitation thereto, and the code generation request information that requests generation of the terminal display code image is transmitted to the server 10 in operation A110.

Alternatively or additionally, in the present disclosure, the "terminal display code" will be described as a code that is used for a payment of a payment type "terminal code display".

When the user of the terminal 20 makes a payment of the payment type "terminal code display" in a store or the like, the user presents the terminal display code image displayed in the terminal 20 to a cleric at the code register 60 of the store, using the payment application stored in the terminal 20. Then, the terminal display code image is read by the store code reader device 50 or the like to process the payment.

The terminal display code is a code (code image) that is presented by the user of the terminal 20 to a clerk of a store or the like, and, as such, may also be referred to as a "presentation code" or a "user presentation code".

Identification information for identifying the terminal 20 or the user of the terminal 20 may be included in the code generation request information transmitted in operation A110, for example, without limitation thereto. Examples of the identification information include terminal identification information (e.g., a terminal identification (ID)) for identifying the terminal 20, user identification information (e.g., a user ID) for identifying the user of the terminal 20, and account information (e.g., an application ID) of the payment application.

Upon receiving the code generation request information from the terminal 20 through the communication I/F 14 (operation C110), the controller 11 performs terminal display code generation operation (operation C120).

That is, the controller 11 generates a random number having a predetermined number of digits (e.g., about 10 to 12 digits) as a payment number using a method (algorithm) for generating random numbers having the predetermined number of digits, for example, without limitation thereto. Then, the controller 11 generates a terminal display code image that includes at least the payment number as original information, for example, without limitation thereto. Moreover, the controller 11 generates the terminal display code image that is represented as an image of a two-dimensional code (e.g., a QR code), by encoding at least the payment number and expressing the payment number as a figure (image). Alternatively or additionally, the controller 11 stores identification information regarding the terminal 20 or the user of the terminal 20 included in the received code generation request information and the generated payment number in association with each other in the storage 15.

Next, the controller 11 transmits the generated terminal display code (in this example, the terminal display code image) to the terminal 20 through the communication I/F 14 (operation C130). The terminal 20 receives the terminal display code (in this example, the terminal display code image) from the server 10 through the communication I/F 22 (operation A130). In this case, the controller 21 causes the display 24 to display the received terminal display code image, for example, without limitation thereto.

Thereafter, when the terminal display code image displayed in the display 24 is presented by the user of the terminal 20 to a store clerk or the like, the controller 51 controls the code reader 58 to read the terminal display code image displayed in the display 24 of the terminal 20 (operation B150).

Thereafter, the controller 51 accesses the server 10 through the communication I/F 54 using, for example, an application interface (API) that is provided (distributed) by the payment service operator and is associated with the payment application, and transmits, to the server 10 through the communication I/F 54, payment request information that includes at least the payment number acquired from the read terminal display code image through decoding, identification information (hereinafter referred to as "store identification information") for identifying the store or the store code reader device 50, and an amount to be paid (hereinafter referred to as a "to-be-paid amount") (operation B160).

Upon receiving the payment request information from the store code reader device 50 through the communication I/F 14 (operation C160), the controller 11 performs payment processing (operation C170). That is, the controller 11 determines whether or not the payment number included in the received payment request information is stored in the storage 15 in association with identification information regarding the terminal 20 or the user of the terminal 20. If the payment number is stored, the controller 11 determines that "payment can be made", and carries out payment by subtracting the to-be-paid amount from the balance of electronic money on the terminal 20 or of the user of the terminal 20 identified from the identification information stored in association with the payment number (i.e., the balance of electronic money associated with an application ID of the payment application (hereinafter referred to as the "balance")).

Thereafter, the controller 11 transmits a payment completion notification for the store (hereinafter referred to as a "store payment completion notification") to the store code reader device 50 through the communication I/F 14 (operation C180). The store payment completion notification includes a notification indicating completion (success) of the payment, date and time of the payment (payment date and time), and store payment information such as an amount that has been paid (paid amount), for example, without limitation thereto.

Alternatively or additionally, the controller 11 transmits a payment completion notification for the terminal (hereinafter referred to as a "terminal payment completion notification") to the terminal 20 through the communication I/F 14 (operation C190). The terminal payment completion notification includes a notification indicating completion (success) of the payment, and terminal payment information such as date and time of the payment (payment date and time), store identification information regarding the store to which the payment has been made (payment store identification information), and the amount paid (paid amount), for example, without limitation thereto.

In some embodiments, the store payment completion notification and the terminal payment completion notification are transmitted from the server 10 if the payment has been successfully carried out by the server 10, but there are cases where the server 10 cannot carry out the payment since the balance is insufficient, for example. In such a case, a notification (e.g., a payment error notification or a failed payment notification) indicating that the payment could not be carried out may be transmitted to the store code reader device 50 and the terminal 20.

Upon receiving the store payment completion notification from the server 10 through the communication I/F 54 (operation B180), the controller 51 ends the payment processing operation.

Alternatively or additionally, upon receiving the terminal payment completion notification from the server 10 through the communication I/F 22, the controller 21 updates the balance that is stored as data regarding the payment application in the terminal 20, based on the received terminal payment completion notification. Alternatively or additionally, the controller 21 causes the display 24 to display a payment result (operation A190). Then, the controller 21 ends processing.

Figure 3B:
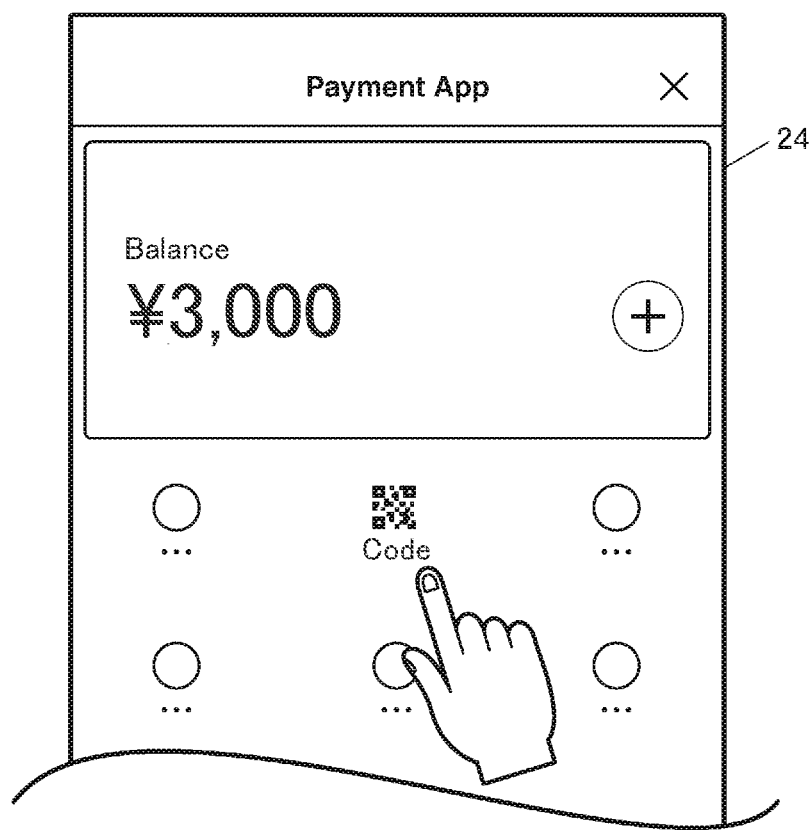
FIG. 3B is a diagram showing a first example of a display screen of a terminal in an aspect of an embodiment.

FIG. 3B is a diagram showing an example of a top screen that is displayed by the payment application executed in the terminal 20.

The top screen is a display screen that is displayed when the payment application is launched, and the name of the payment application "Payment App" is displayed in an upper portion of the screen. The balance (for example, "¥3000" (3,000 yen)) is displayed within a frame below the name, and a reload button for reloading (e.g., adding) electronic money is displayed beside the balance. Alternatively or additionally, a plurality of function icons that correspond to various functions of the payment application are displayed below the frame.

Among these function icons, an icon shown as "code" is a "code icon" for displaying a code display screen in the display 24, for example, without limitation thereto. When the code icon is touched by the user of the terminal 20, the code generation request information is transmitted from the terminal 20 to the server 10, and the terminal display code is generated by the server 10, for example, without limitation thereto. Then, the generated terminal display code is transmitted from the server 10 to the terminal 20, and a code display screen shown in FIG. 3C is displayed in the display 24 of the terminal 20.

Figure 3C:
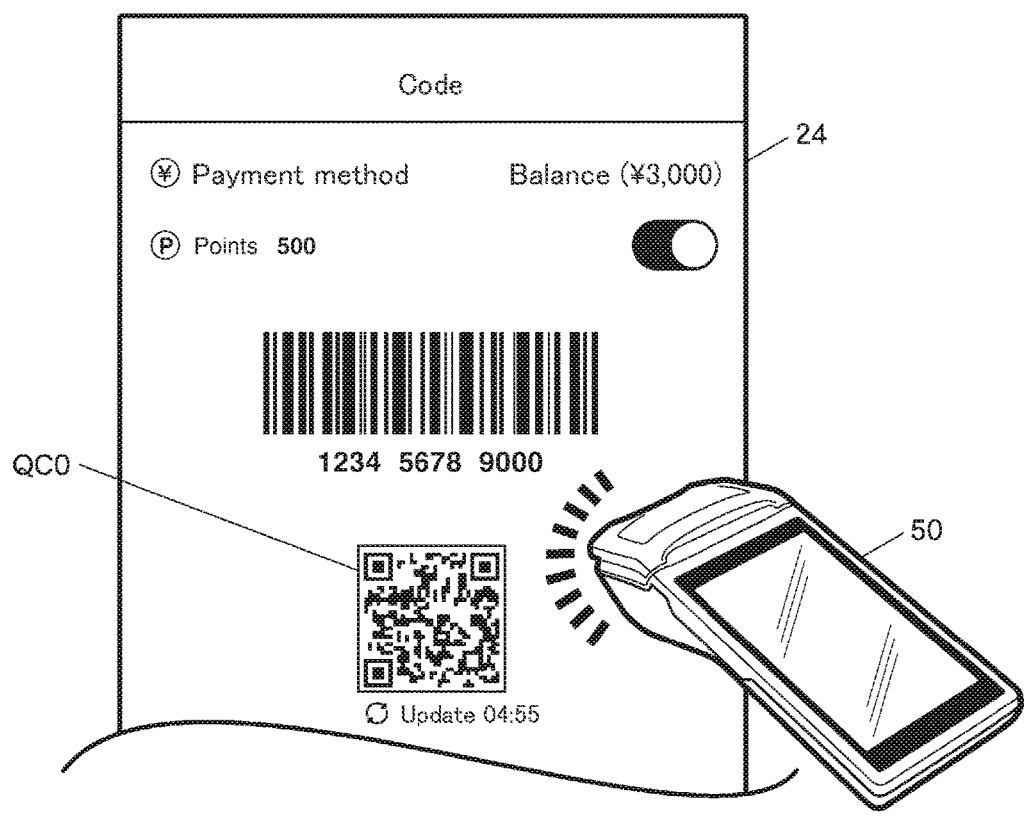
FIG. 3C is a diagram showing a second example of the display screen of the terminal in an aspect of an embodiment.

FIG. 3C is a diagram showing an example of the code display screen.

In the code display screen, characters "code" are displayed in an upper portion of the screen, and a payment method, points possessed by the user, and a point tab for setting whether or not to make payment using the points are displayed below "code".

Alternatively or additionally, in different regions of the display screen below the payment method, the points, and the point tab, a one-dimensional terminal display code image that is represented as a barcode and a two-dimensional terminal display code image QC0 that is represented as a QR code are displayed as code images of the terminal display code acquired from the server 10. Alternatively or additionally, a 12-digit payment number is displayed below the one-dimensional terminal display code image, for example, without limitation thereto.

In this example, the terminal display code displayed in the code display screen has a time limit (hereinafter referred to as a "code display time limit" and/or "code valid time") within which the code is displayed.

The code display time limit is a period of time during which the terminal display code is displayed in the terminal 20, for example, without limitation thereto. The code display time limit may be set to a "period from a first point in time (e.g., date and/or time) at which the terminal display code is displayed (i.e., display of the code is started) in the terminal to a second point in time at which a code display period and/or a code valid time elapses". Although setting of the code display period may be appropriately changed, the code display period may be set to "5 minutes", for example, without limitation thereto.

In some embodiments, the code display time limit may be defined as a time point (e.g., date and/or time) at which the period during which the terminal display code is displayed in the terminal 20 ends (e.g., expires), rather than the period during which the terminal display code is displayed in the terminal 20.

The remaining time of the code display time limit is displayed in a countdown manner together with an update mark and characters "update" below the two-dimensional terminal display code image QC0. The remaining time is displayed based on information obtained through time measurement by the clock unit 29A of the terminal 20.

If the remaining time is "0", the code display screen is closed and the terminal display code is hidden. If the user of the terminal 20 wants to make a payment after the remaining time becomes 0, the user needs to reacquire a terminal display code from the server 10.

The user of the terminal 20 makes a payment by presenting the code display screen shown in FIG. 3C to a clerk of the store at the code register 60 so that the terminal display code image may be read by the store code reader device 50 within the code display time limit In this case, the store code reader device 50 accesses the server 10 through the communication I/F 54 using the API described above or the like, and transmits information necessary for the payment to the server 10. As a result, payment processing is carried out by the server 10.

An example of processing an online payment has been described. In this processing, the terminal display code that is generated by the server 10 and is transmitted to the terminal 20 is immediately used for payment, for example, without limitation thereto.

However, there are cases where the user wants to use the terminal display code received from the server 10 later to make a payment, rather than immediately use the terminal display code.

Alternatively or additionally, in order to apply the processing described above, it is necessary that the terminal 20 and the server 10 are in a state (i.e., an online state) where the terminal 20 and the server 10 may communicate with each other. In some embodiments, the store code reader device 50 and the server 10 may be in a state where the store code reader device 50 and the server 10 may communicate with each other.

One or more other embodiments are provided in a case where the terminal 20 and the server 10 cannot communicate with each other (or have difficulty in communicating) and it is difficult to make a payment (e.g., a case where the payment is to be made at a place, such as somewhere underground, where radio wave conditions are poor, a case where the payment is to be made at an event site or the like in a situation in which lines are congested). One or more other optional or additional embodiments are provided in a case where an amount of communication performed by the terminal 20 (or an amount of data transmitted or received through the communication) during a predetermined period (e.g., one month) has exceeded a predetermined amount and a restriction is imposed on the amount or the speed of communication.

Therefore, the following embodiments are described as an example of a method for processing a payment even in such cases.

In some embodiments, a payment method described below may be similarly applied to both the online state and the offline state, but will be described as a method for processing a payment in the offline state.

(2) Offline Payment

A method for making an offline payment will be described as an aspect of a method according to the present disclosure with reference to a flowchart.

In the following description, the term "offline" indicates that the terminal 20 cannot communicate with the server 10, and the term "offline state" indicates such a state. Alternatively or additionally, the term "offline payment" indicates a payment that is processed by the server 10 in the offline state.

In some embodiments, the store code reader device 50 may communicate with the server 10.

Figure 3D:
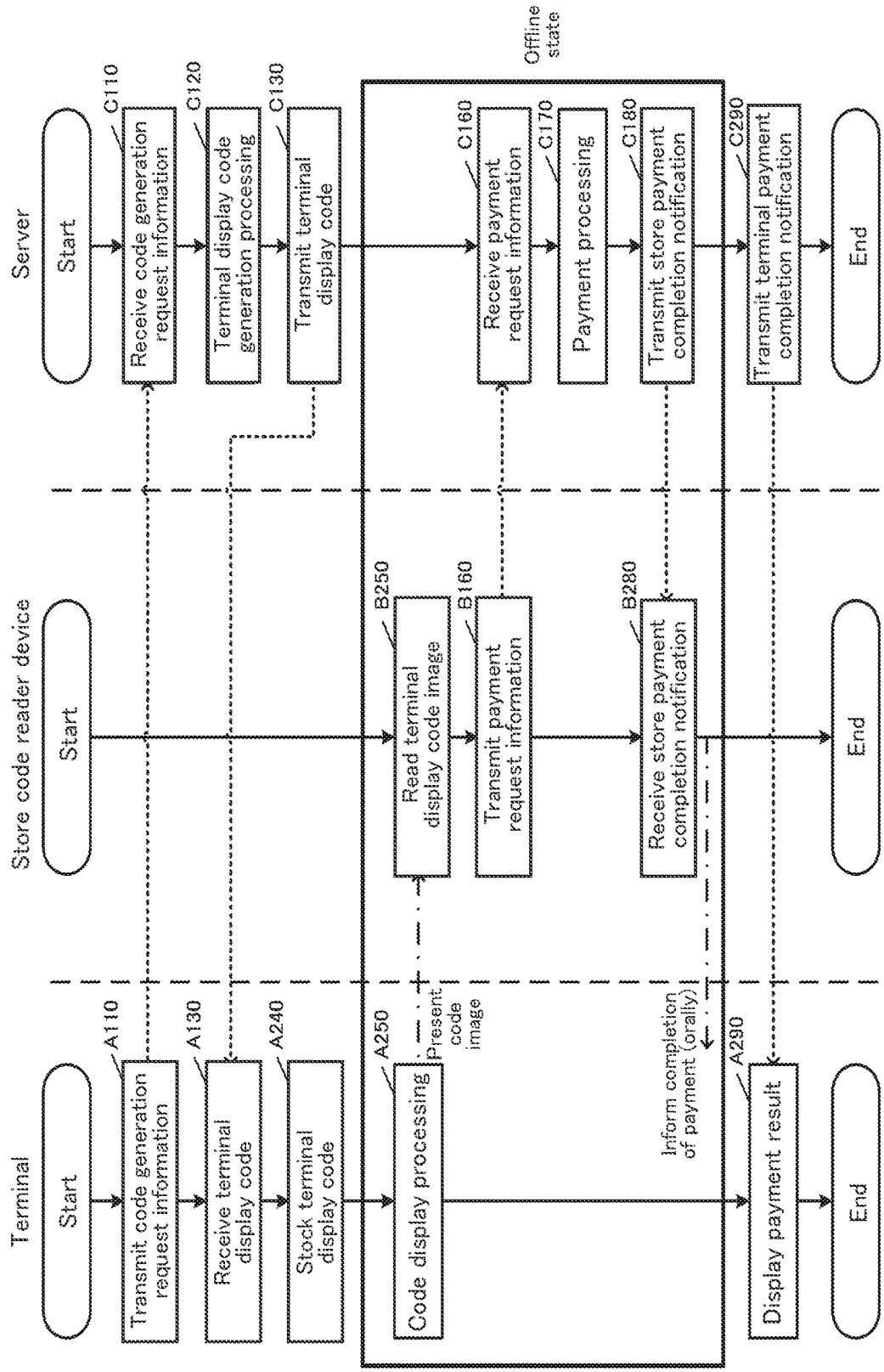
FIG. 3D is a flowchart showing a second example flow of processing that is executed by various devices in an aspect of an embodiment.

FIG. 3D is a flowchart showing an example flow of processing that is executed by the devices in this case. This flowchart is to be viewed in the same manner as that of the flowchart described above.

The flowchart shown in FIG. 3D is modified from the flowchart shown in FIG. 3A to be adapted to the offline state. Differences from the flowchart shown in FIG. 3A are processing operations (e.g., operation A240) in the online state, processing operations (e.g., operations A250, B250, and B280) in the offline state, and processing operations (e.g., operations A290 and C290) when the communication state has returned from the offline state to the online state, for example, without limitation thereto.

After operation A130, the controller 21 stocks the received terminal display code (in this example, the terminal display code image) in the storage 28 (operation A240).

In some embodiments, the term "stock" refers to storing the received terminal display code in the storage 28 so that the terminal display code may be used later.

In some embodiments of the present disclosure, the term "stock" may also be referred to as "store". Alternatively or additionally, stocking a terminal display code may also be referred to as "storing a terminal display code in terminal-display-code stock data".

In this processing, the terminal display code (in this example, the terminal display code image) acquired from the server 10 in the online state is stocked (stored) in the storage 28 of the terminal 20 to enable an offline payment. Then, when payment needs to be carried out in the offline state, the stocked terminal display code is used to make payment without communicating with the server 10.

This will be described in more detail. Assume that the communication state has entered the offline state after operation A240.

In some embodiments, the terminal 20 detects that the communication state has entered the offline state using any one of the following methods, for example, without limitation thereto.

(A) A connection confirmation request is transmitted from the server 10 to the terminal 20 periodically or at predetermined points in time while the payment application is executed in the terminal 20, and a connection response including identification information (e.g., an application ID) is transmitted from the terminal 20 to the server 10 in response to the connection confirmation request. In this case, if the connection confirmation request is not received from the server 10, the controller 21 of the terminal 20 determines that the communication state has entered the offline state.

(B) A connection notification including identification information (e.g., an application ID) is transmitted from the terminal 20 to the server 10 periodically or at predetermined points in time while the payment application is executed in the terminal 20, and a connection confirmation is transmitted from the server 10 to the terminal 20 in response to the connection notification. In the offline state, the terminal 20 cannot transmit the connection notification to the server 10. Therefore, if the occurrence of an error in transmission of the connection notification is detected, the controller 21 of the terminal 20 determines that the communication state has entered the offline state, for example, without limitation thereto.

In some embodiments, the terminal 20 may determine whether or not the communication state has entered the offline state by acquiring information regarding communication conditions of the terminal 20 using a library, an application, or the like for acquiring network connection conditions, for example, without limitation thereto.

When a code display operation is performed by the user of the terminal 20 in the offline state, for example, without limitation thereto, the controller 21 performs code display processing (operation A250). That is, the controller 21 causes the display 24 to display the terminal display code image that has been stocked in operation A240. When the displayed terminal display code image is presented by the user of the terminal 20 to a store clerk or the like, the controller 51 controls the code reader 58 to read the terminal display code image displayed in the display 24 of the terminal 20 (operation B250). Then, the controller 51 proceeds to operation B160.

When the store payment completion notification is received from the server 10 through the communication I/F 54 after operation B160 (operation B280), the store clerk or the like orally informs the user of the terminal 20 that the offline payment is complete (successful) based on the received store payment completion notification.

After operation C180, the controller 11 transmits the terminal payment completion notification to the terminal 20 (operation C290). However, the terminal 20 cannot receive the terminal payment completion notification in the offline state. When the terminal 20 has returned to the online state, the terminal payment completion notification transmitted from the server 10 is received by the terminal 20. Upon receiving the terminal payment completion notification from the server 10 by means of through the communication I/F 22, the controller 21 causes the display 24 to display a payment result, based on the received terminal payment completion notification (operation A290).

The processing described above is an example of processing for making an offline payment.

In some embodiments, the code generation request information may be information that requests generation of a single terminal display code, or information that requests generation of a plurality of terminal display codes. That is, in the terminal 20 or the server 10, an upper limit is set for the number of codes for which the terminal 20 requests code generation at a time (or the number of codes to be generated by the server 10 at a time), for example, without limitation thereto, rather than terminal display codes being added one-by-one. The user of the terminal 20 may acquire the upper limit number of terminal display codes through a single operation. In this case, a plurality of terminal display codes may be generated by the server 10, the generated terminal display codes may be transmitted to the terminal 20, and the received terminal display codes may be stocked in the terminal 20.

The processing described above may be similarly applied to the online state. That is, in any of the following cases, a terminal display code that is generated and transmitted by the server 10 in the online state is stocked in the terminal 20 as described above.

(1) A case where a payment is to be made using the terminal display code later in the online state.

(2) A case where an offline payment is to be made.

Then, a payment is made using the terminal display code stocked in the terminal 20.

However, some users may forget having stocked the terminal display code in the terminal 20.

Alternatively or additionally, when a plurality of terminal display codes are stocked in the terminal 20, for example, it may be difficult for the user to be aware of the number of terminal display codes that have already been used for payment or the number of terminal display codes that have not been used for payment yet.

Functional Configuration (1) Functional Configuration of Server

FIG. 4-1A is a diagram showing an example of functions implemented by the controller 11 of the server 10 in the present embodiment.

The following describes a case where the user of the terminal 20 makes payment of the payment type "terminal code display" described above, for example, without limitation thereto, using the payment application stored in the terminal 20.

The server 10 includes a payment management processing unit 111 as a function implemented by the controller 11.

The payment management processing unit 111 may manage various types of information and data regarding the payment application executed in the terminal 20 and execute payment management processing for managing payment that is made using electronic money by the terminal 20 or the user of the terminal 20, in accordance with a payment management processing program 151 that is stored in the storage 15.

In the present embodiment, the payment management processing unit 111 executes the processing shown in FIG. 3D, for example, as the payment management processing in accordance with the payment management processing program 151 stored in the storage 15.

The payment management processing unit 111 includes a terminal-display-code generation processing unit 1111 that generates a terminal display code through terminal display code generation processing and a payment processing unit 1113 that executes payment through payment processing, for example, without limitation thereto.

The terminal-display-code generation processing unit 1111 generates a terminal display code image that is represented as a two-dimensional code, for example, without limitation thereto. Two-dimensional codes are codes that include information in the horizontal direction and the vertical direction, such as matrix-type codes (hereinafter referred to as "matrix codes") in which small squares are arranged in the vertical and horizontal directions and stack-type codes (hereinafter referred to as "stack codes") in which a plurality of one-dimensional codes (non-limiting examples of which include barcodes) are stacked in the vertical direction.

In the present embodiment, a QR code, which is an example of widely used matrix codes, will be described as an example of the terminal display code for the sake of convenience of description.

In some embodiments, unlike the present embodiment, SP Codes, VeriCodes, MaxiCodes, CP Codes, Chameleon Codes, and the like may be used as matrix codes other than QR codes. Alternatively or additionally, various types of stack codes may be used, rather than matrix codes.

Alternatively or additionally, the terminal-display-code generation processing unit 1111 may generate a one-dimensional code (non-limiting examples of which include barcodes) as the terminal display code, in addition to the two-dimensional code (non-limiting examples of which include QR codes). This is because, depending on the store, there are cases where two-dimensional codes cannot be read, but one-dimensional codes may be read.

The payment processing unit 1113 may perform the payment processing based on information that is transmitted from the store POS system 40 and information that is transmitted from the terminal 20, for example, without limitation thereto.

Figure 4A:
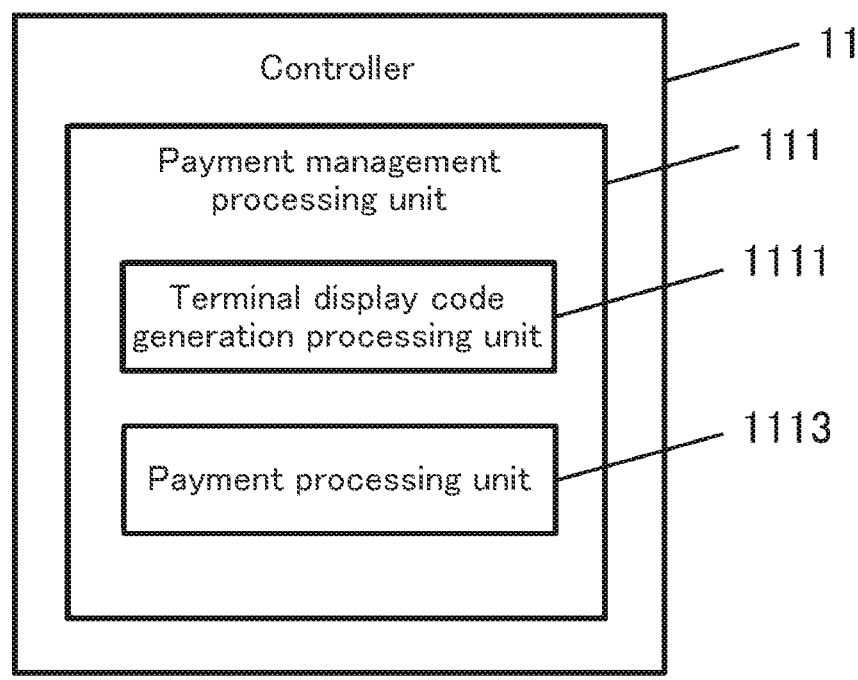
FIG. 4A is a diagram showing an example of functions implemented by a controller of a server according to a first embodiment.
Figure 4B:
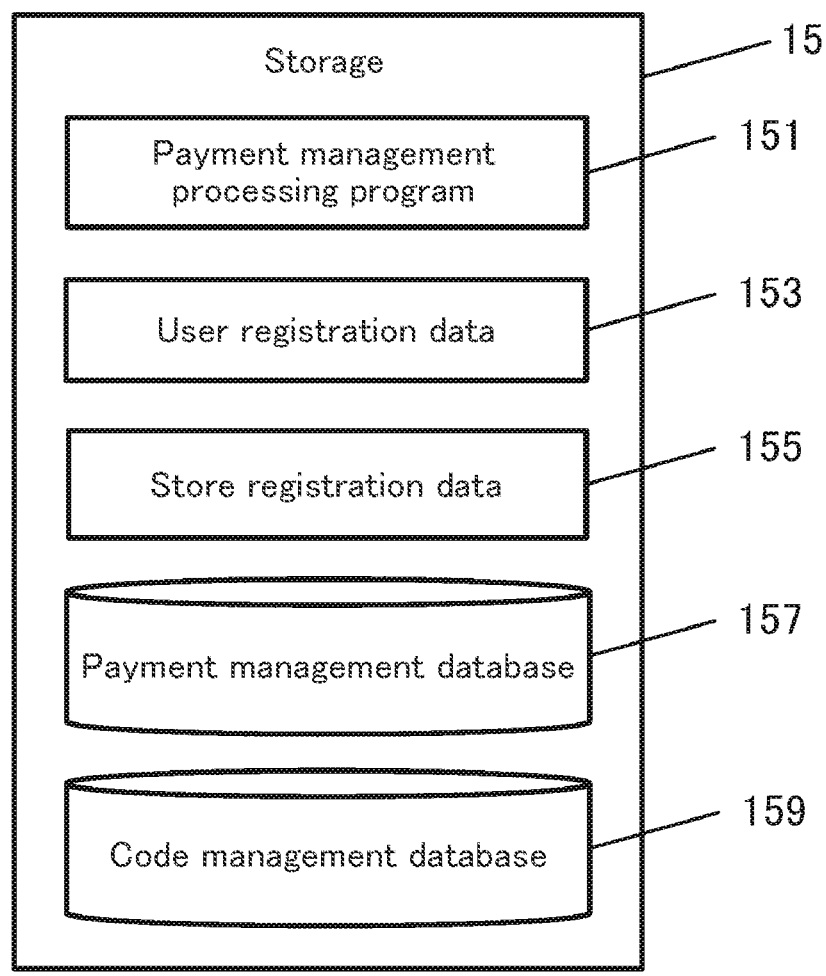
FIG. 4B is a diagram showing an example of information stored in a storage of the server according to the first embodiment.

FIG. 4B is a diagram showing an example of information that is stored in the storage 15 of the server 10 in the present embodiment.

The payment management processing program 151 that is read by the controller 11 and is executed as the payment management processing is stored as a program in the storage 15, for example, without limitation thereto.

Alternatively or additionally, user registration data 153, store registration data 155, a payment management database 157, and a code management database 159 are stored as data in the storage 15, for example, without limitation thereto.

The user registration data 153 is registration data of terminals 20 and users of the terminals 20 who use the payment service, and an example of a data structure of the user registration data 153 is shown in FIG. AC.

A user name, a terminal telephone number, a terminal mail address, an application ID, an authentication password, and other registration information are stored in association with each other in the user registration data 153, for example, without limitation thereto.

The user name is the name of a user of a terminal 20 who uses the payment service, and is registered by the user of the terminal 20 when the user uses the payment service.

The terminal telephone number is the telephone number of the terminal 20 of the user corresponding to the user name, and is registered by the user of the terminal 20 when the user uses the payment application.

The terminal mail address is the mail address of the terminal 20 of the user corresponding to the user name, and is registered by the user of the terminal 20 when the user uses the payment application.

The terminal telephone number and the terminal mail address are examples of identification information (hereinafter referred to as "terminal identification information") for identifying the terminal 20.

The application ID is an account (account information) of the payment application, and is an ID based on which the terminal 20 or the user of the terminal 20 may be identified. A unique ID is set by the server 10 and is stored as the application ID, for example, without limitation thereto.

The authentication password is a password for authentication, input of which is requested to the user when authentication processing for payment (hereinafter referred to as "authentication processing") is performed in the terminal 20 of the user corresponding to the user name, and the authentication password is set by the user.

In some embodiments, authentication processing for payment may not have to be performed, and may be omitted. In this case, there is no need to store the authentication password in the user registration data 153.

The other registration information is other registration information regarding the user corresponding to the user name, and includes a user icon image, which is image data of an icon that is used by the user in the payment application, a profile of the user, and the like, for example, without limitation thereto.

The store registration data 155 is registration data of stores that are associated with the operator providing the payment application (the operator of the server 10). FIG. 4D shows an example data structure of store registration data 155A, which is an example of the store registration data 155.

A business category, a store name, store position information, store POS system information, and a store ID are stored in association with each other as store information in the store registration data 155A, for example, without limitation thereto.

The business category of a store is stored as the business category. Business categories include various categories such as "convenience store", "supermarket", "drug store", "bar", "department store", "restaurant", "bookstore", and "watch store", for example, without limitation thereto.

With respect to each business category, the name of a store that is included in (belongs to) the category is stored as the store name.

Position information (hereinafter referred to as "store position information") regarding the location of the store corresponding to the store name is stored as the store position information. The store position information may indicate the location of the store using two-dimensional or three-dimensional position coordinates or using longitude and latitude (altitude may also be added to longitude and latitude).

Information regarding the store POS system 40 that is used in the store is stored as the store POS system information. The store POS system information includes information that is necessary for the server 10 to communicate with the store code reader device 50 and the store server 70, for example, without limitation thereto.

The store POS system 40 performs processing in cooperation with the server 10, and accordingly, a configuration is also possible in which a software package for the payment application that is provided (distributed) from the server 10 is acquired in advance and is stored in the store code reader device 50 or the store server 70, and is called up from a program for payment processing in the store to be used, for example, without limitation thereto. An application programing interface (API) is an example, and the store code reader device 50 activates the API to transmit information to the server 10 and receive information from the server 10, for example.

Alternatively or additionally, the server 10 may receive information such as the business category of the store, the store name, the store position information, and the store POS system information from the store server 70 of the store, for example, without limitation thereto, and store the information in the store registration data 155.

The store ID serves as identification information for identifying the store corresponding to the store name. A unique ID is set for each store by the server 10 and is stored as the store ID, for example, without limitation thereto.

The store ID is an example of store identification information.

The payment management database 157 is a database in which data for managing information regarding payment made by the user of each terminal 20 is accumulatively stored, and FIG. 4E shows an example structure of a payment management database 157A, which is an example of the payment management database 157.

Payment management data that is generated for each terminal 20 or each user of a terminal 20 is stored in the payment management database 157A.

An application ID, the balance, points, daily maximum amount setting, an auto-reload setting, and payment history data are stored in each piece of payment management data, for example, without limitation thereto.

An application ID that is stored in the user registration data 153 is stored as the application ID.

The balance that is associated with the application ID is stored as the balance.

Points, which may be collected using various services associated with the payment application and member stores associated with the payment application operator, are stored as the points. A point has a value that is equivalent to 1 yen, for example, without limitation thereto, and points may be exchanged for gift cards, goods, or the like, and may also be exchanged for cash and used for payment in the payment application.

The maximum amount that may be used for payment per day by the terminal 20 corresponding to the application ID or the user of the terminal 20 is stored as the daily maximum amount setting.

The auto-reload setting is a setting as to whether or not to automatically reload or add electronic money or funds to the user account when the balance is small (e.g., "500 yen") or "0 yen", and "ON" is stored if the auto-reload setting is activated by the user of the terminal 20, otherwise "OFF" is stored. Electronic money may be automatically reloaded from a bank account or the like that is linked to the user account of the terminal 20, for example, without limitation thereto.

The payment history data is data regarding a history of payments that have been made by the user corresponding to the application ID, and payment date and time at which payment has been carried out by the server 10, the store ID of a store to which payment has been made, a payment store name that is the name of the store corresponding to the store ID, and a paid amount are stored in association with each other in time series with respect to the application ID, for example, without limitation thereto.

In some embodiments, the payment management data described above may not include all of the information described above. A configuration is also possible in which some or all of the points, the daily maximum amount setting, and the auto-reload setting are not stored in the payment management data, for example, without limitation thereto.

A configuration is also possible in which information regarding a history of payments is transmitted to and stored in the terminal 20 every time a payment is made, and the payment history data is not stored in the server 10.

Figure 4F:
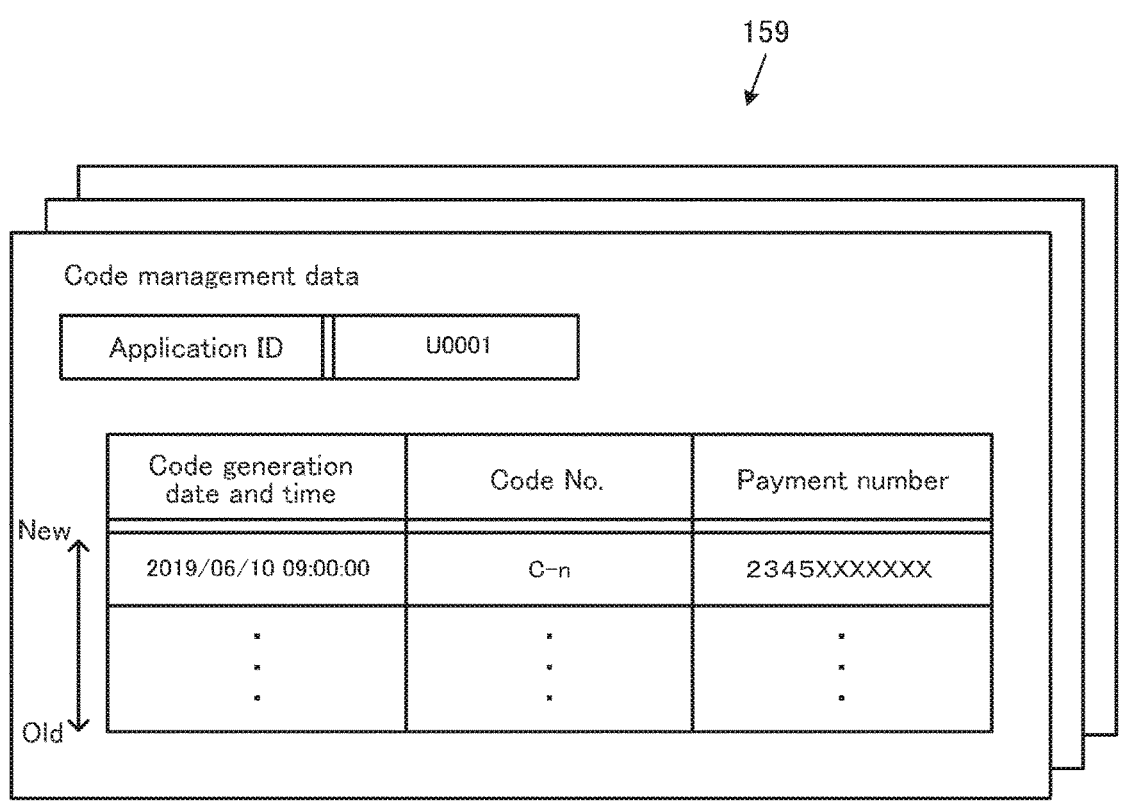
FIG. 4F is a diagram showing an example of a code management database according to the first embodiment.

The code management database 159 is a database for managing codes (in the present embodiments, terminal display codes), and FIG. 4F shows an example of a data structure of the code management database 159.

In the code management database 159, code generation date and time, a code No., and a payment number are stored in association with each other in time senes together with an application ID, as data that is generated for each application ID of the payment application, for example, without limitation thereto.

The date and time at which a terminal display code was generated is stored as the code generation date and time based on information obtained through time measurement by the clock unit 19.

A number for identifying the code is stored as the code No. For example, consecutive numbers are set and stored in association with codes in the order of time when the codes are generated.

A payment number that was issued when the terminal display code was generated is stored as the payment number.

Data regarding a terminal display code that is stored in the code management data may be deleted from the code management data after payment processing is carried out using the terminal display code, for example, without limitation thereto.

In some embodiments, a flag "usable/unusable" that indicates whether or not a terminal display code may be used may be set in association with data regarding the terminal display code, for example, without limitation thereto, rather than deleting data regarding a terminal display code that is no longer usable from the code management data, as described above. In this case, the flag "unusable" may be set for a terminal display code that is no longer usable.

A configuration is also possible in which the code generation date and time is not stored in the code management data, for example.

Alternatively or additionally, terminal identification information such as a terminal telephone number that is stored in the user registration data 153 may be stored in the code management data instead of or in addition to the application ID.

(2) Functional Configuration of Terminal

Figure 4G:
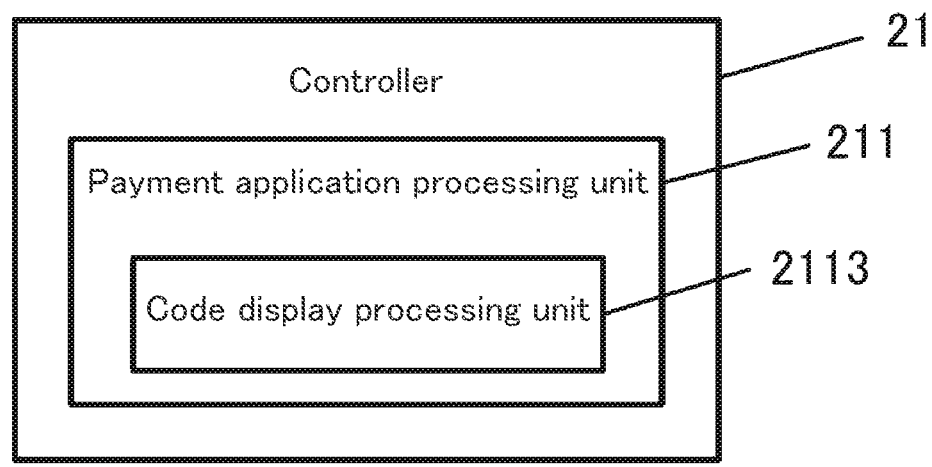
FIG. 4G is a diagram showing an example of functions implemented by a controller of a terminal according to the first embodiment.

FIG. 4G is a diagram showing an example of functions that are implemented by the controller 21 of the terminal 20 in the present embodiment.

The terminal 20 includes a payment application processing unit 211 as a function implemented by the controller 21.

The payment application processing unit 211 may execute payment application processing that is an example of processing for performing processing relating to payment, based on payment application software 281 that is stored in the storage 28.

In the present embodiment, the payment application processing unit 211 executes the processing shown in FIG. 3D, for example, as the payment application processing in accordance with a payment application program 282 that is stored in the storage 28.

In the present embodiment, processing relating to payment is a concept that includes processing that has some relation to payment, such as processing for acquiring a terminal display code from the server 10 (including processing for requesting the server 10 to generate the terminal display code and processing for receiving the generated terminal display code from the server 10), processing for stocking the terminal display code acquired from the server 10, processing (code display processing) for displaying a stocked terminal display code image, processing for instructing (guiding) the user to present the displayed terminal display code image so as to be read by the store code reader device 50, and processing for receiving (acquiring) the terminal payment completion notification from the server 10 after payment is carried out by the server 10, that is, all processing that is executed in the terminal 20 as processing relating to payment.

The payment application processing unit 211 includes a code display processing unit 2113 that executes code display processing as a functional unit, for example, without limitation thereto.

In the present embodiment, the code display processing unit 2113 performs processing for displaying information (hereinafter referred to as "remaining code count related information") relating to "the number of remaining codes" that is specified based on the number of terminal display codes stored in terminal-display-code stock data 2831, as well as processing for displaying a code display screen including a terminal display code image. The remaining code count related information includes various types of information and details thereof will be described later.

In the present embodiment, the total number of terminal display codes stored in the terminal-display-code stock data 2831 is counted as "the number of remaining codes". When no terminal display codes are stored in the terminal-display-code stock data 2831, the number of remaining codes is 0.

The number of remaining codes may be referred to as "the number of stock codes" or "the stock number" with the meaning of the number of stocked codes.

Figure 4H:
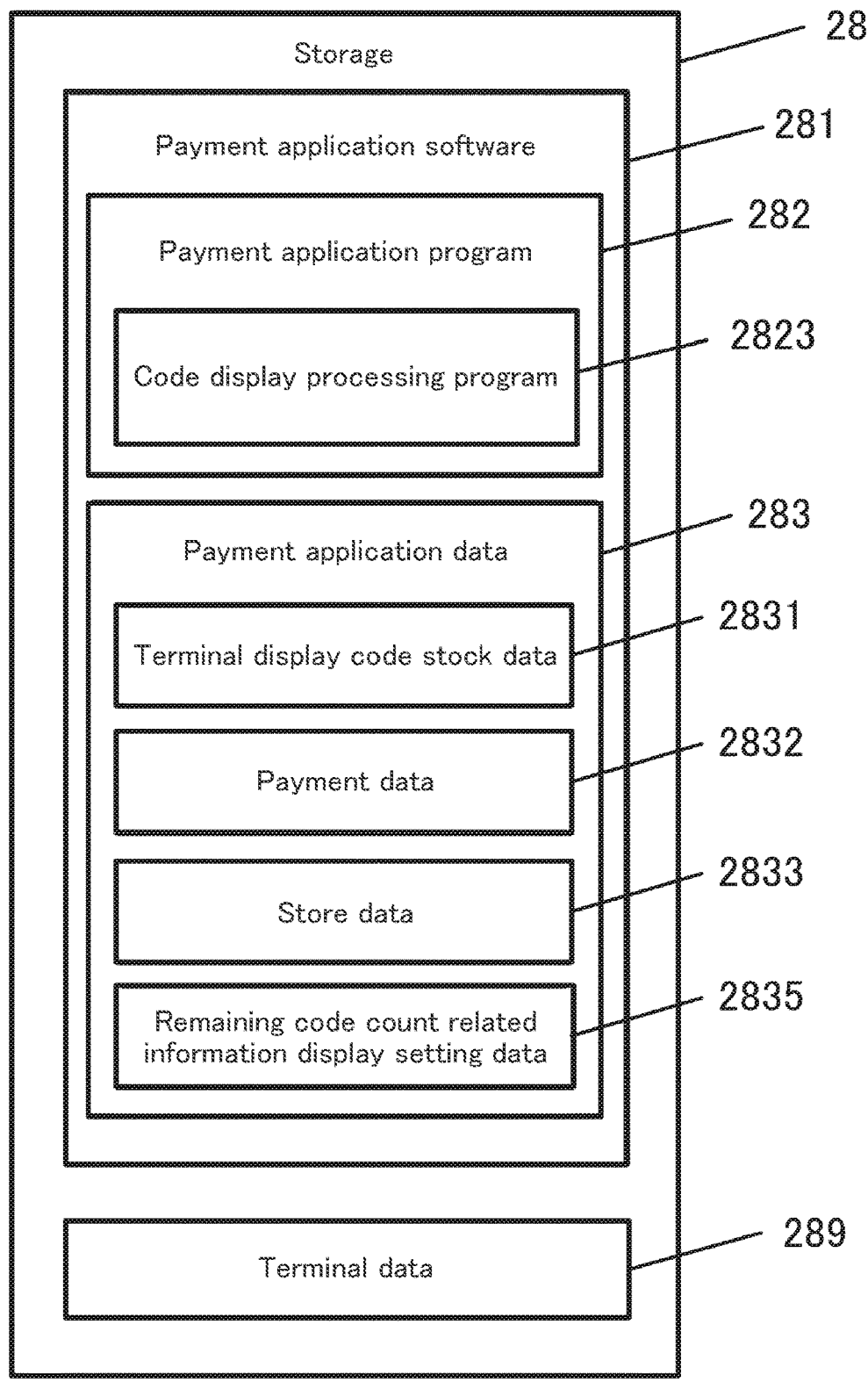
FIG. 4H is a diagram showing an example of information stored in a storage of the terminal according to the first embodiment.

FIG. 4H is a diagram showing an example of information stored in the storage 28 of the terminal 20 in the present embodiment.

The payment application software 281 is stored in the storage 28 as application software that is acquired from the server 10 in advance through downloading, for example, without limitation thereto.

The payment application software 281 includes the payment application program 282 and payment application data 283, for example, without limitation thereto.

The payment application program 282 is a program that is read by the controller 21 and is executed as the payment application processing, and includes, as a sub routine program, a code display processing program 2823 that is executed as the code display processing, for example, without limitation thereto.

Various types of data used in the payment application software are stored in the payment application data 283. The terminal-display-code stock data 2831, payment data 2832, store data 2833, and remaining code count related information display setting data 2835 are stored in the payment application data 283, for example, without limitation thereto.

Figure 4I:
FIG. 4I is a diagram showing an example of a first terminal-display-code stock data according to the first embodiment.

Terminal display codes acquired from the server 10 in the online state are stocked in the terminal-display-code stock data 2831, and FIG. 4I shows an example data structure of first terminal-display-code stock data 2831A, which is an example of the terminal-display-code stock data 2831.

Code received date and time, a code No., and code data are stored in association with each other in time series in the first terminal-display-code stock data 2831A, for example, without limitation thereto.

The date and time at which the terminal 20 received a terminal display code from the server 10 is stored as the code received date and time, for example, without limitation thereto.

A code number that the terminal 20 received together with the terminal display code from the server 10 is stored as the code No.

Data of a code image of the terminal display code that the terminal 20 received from the server 10 is stored as the code data, for example, without limitation thereto.

Data regarding a terminal display code that is stored in the first terminal-display-code stock data 2831A may be deleted from the first terminal-display-code stock data 2831A after payment processing is carried out by the server 10 using the terminal display code and the terminal payment completion notification is received from the server 10 (in a case where an offline payment is carried out, after the communication state returns to the online state and the terminal payment completion notification is received from the server 10), for example, without limitation thereto.

Figure 4J:
FIG. 4J is a diagram showing an example of a second terminal-display-code stock data according to the first embodiment.

In some embodiments, information regarding conditions of use of a terminal display code in association with data regarding the terminal display code may be stored, as is the case with second terminal-display-code stock data 2831B shown in FIG. 4J, for example, without limitation thereto, rather than deleting a terminal display code that is no longer usable from the terminal-display-code stock data 2831 as described above. In this "unused" and "used" may be stored in association with a terminal display code that has not been used and a terminal display code that has been used, respectively.

A configuration is also possible in which the code received date and time is not stored in the terminal-display-code stock data 2831 (the first terminal-display-code stock data 2831A or the second terminal-display-code stock data 2831B), for example.

Alternatively or additionally, date and time (hereinafter referred to as "code stored date and time") at which a terminal display code received from the server 10 was stored in the terminal-display-code stock data 2831 (the first terminal-display-code stock data 2831A or the second terminal-display-code stock data 2831B) may be stored instead of or in addition to the code received date and time, for example, without limitation thereto.

Alternatively or additionally, although details will be described later, data of the code image of the terminal display code may not be stored as the code data, and the original information (in the present embodiment, the payment number) regarding the terminal display code may be stored instead of or in addition to the data of the code image.

Alternatively or additionally, only a single code acquired from the server 10 in the online state may be stored in the terminal-display-code stock data 2831.

Figure 4K:
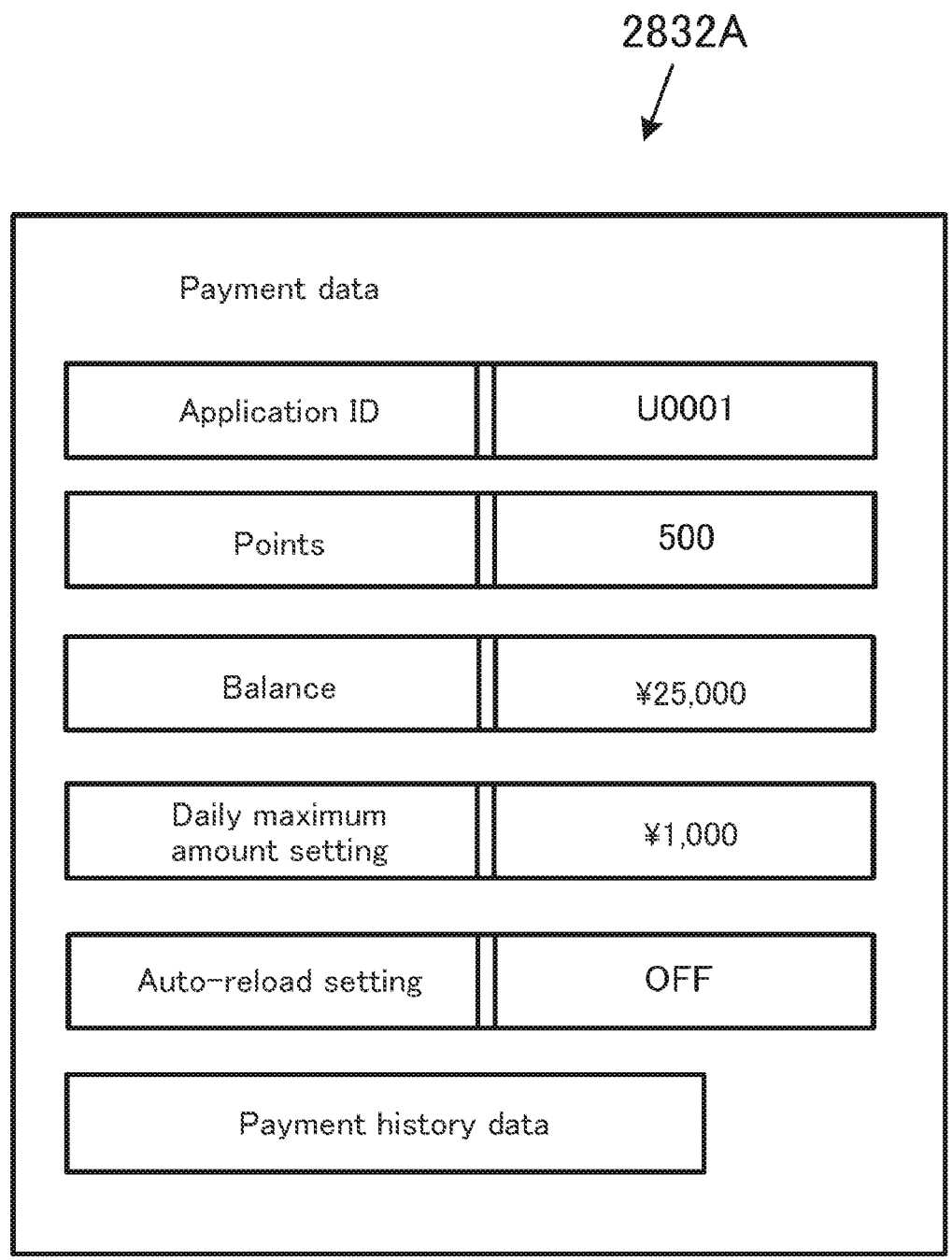
FIG. 4K is a diagram showing an example of payment data according to the first embodiment.

The payment data 2832 is data for payment that is stored in the terminal 20, and FIG. 4K shows the structure of payment data 2832A, which is an example of the payment data 2832.

An application ID, points, the balance, the daily maximum amount setting, the auto-reload setting, and payment history data are stored in the payment data 2832A, for example, without limitation thereto.

The controller 21 stores payment date and time at which payment was earned out by the server 10, the store ID of a store to which payment was carried out by the server 10, a payment store name that is the name of the store corresponding to the store ID, and a paid amount paid by the server 10 in associate, with each other in time series in the payment history data, for without limitation thereto, based on a terminal payment completion notification received torn the server 10 after the communication state returns to the online state.

Various types of store information that is stored in the store registration data 155A in the server 10 is stored as the store data 2833, for example, without limitation thereto.

The store data 2833 may be updated with latest store information distributed from the server 10 to the terminal 20 when the payment application software 281 is updated, for example, without limitation thereto.

The remaining code count related information display setting data 2835 is data in which information of settings (hereinafter referred to as "display settings") relating to display of remaining code count related information is stored.

The display settings include settings of display modes, for example, without limitation thereto. The display modes include various types of display modes such as the display form, the display position, and the display color.

In the present embodiment, the code display processing unit 2113 causes "zero-remaining-codes information", which indicates that the number of remaining codes (the stock number) is zero, to be displayed as an example of the remaining code count related information.

The zero-remaining-codes information is information that indicates or suggests that the number of remaining codes is zero. The zero-remaining-codes information includes a message, an image, or tire like that indicates that no tented display codes me stored in the terminal-display-code stock data 2831, for example, without limitation thereto. Information regarding display settings of the zero-remaining-codes information is stored in the remaining code count related information display setting data 2835.

The zero-remaining-codes information is an example of second information relating to the fact that first information is not stored in the storage, and is an example of information that notifies the user of the terminal that first information is not stored in the storage.

The zero-remaining-codes information may be referred to as "zero-stock-number information", which means that the stock number is zero.

Alternatively or additionally, terminal data 289 is stored m the storage 28, for example, without limitation thereto.

The terminal data 289 is data regarding the terminal 20, and includes terminal identification information such as the terminal telephone number and the terminal mail address, and information regarding various settings in the terminal 20, for example, without limitation thereto.

Display Screen Examples

Figure 4L:
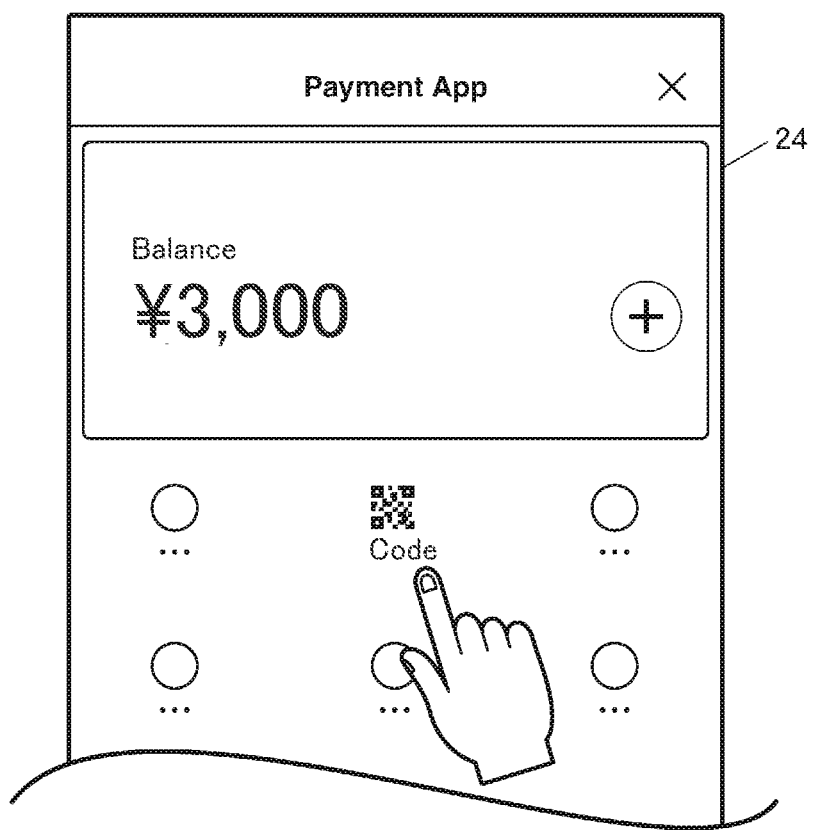
FIG. 4L is a diagram showing a first example of a display screen of the terminal according to the first embodiment

FIG. 4L is a diagram showing an example of the top screen of the payment application displayed in the display 24 of the terminal 20 in the present embodiment.

The configuration of the top screen is the same as that shown in FIG. 3B, and here, a state where the "code icon" is touched by the user of the terminal 20 is shown.

Figure 4M:
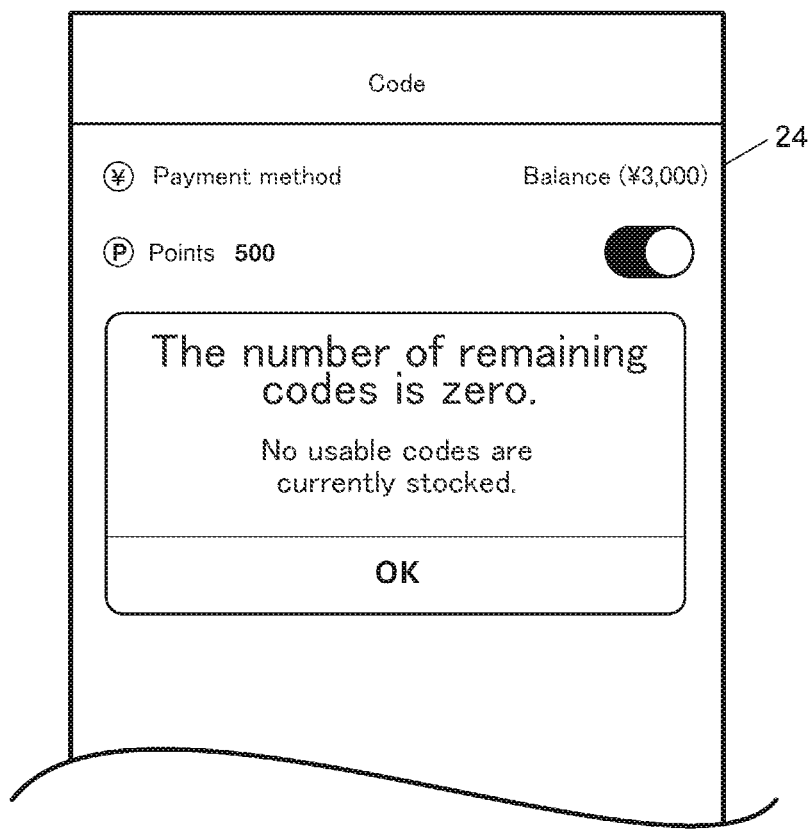
FIG. 4M is a diagram showing a second example of the display screen of the terminal according to the first embodiment.

FIG. 4M is a diagram showing an example of the code display screen displayed in the display 24 of the terminal 20 in the present embodiment. This code display screen is displayed when the "code icon" is touched as shown in FIG. 4L, for example, without limitation thereto, and is an example of the code display screen that is displayed when no terminal display codes are stored in the terminal-display-code stock data 2831.

In this code display screen, a message "The number of remaining codes is zero. No usable codes are currently stocked." is displayed as an example of the zero-remaining-codes information, together with an "OK" icon, for example, without limitation thereto. The "OK" icon is used by the user of the terminal 20 to approve the zero-remaining-codes information, and when the "OK" icon is touched, the display of the zero-remaining-codes information is erased.

On the other hand, if at least one terminal display code is stored in the terminal-display-code stock data 2831 when the "code icon" is touched in the top screen of the payment application shown in FIG. 4L, a code display screen including a terminal display code image similar to that shown in FIG. 3C is displayed, for example, without limitation thereto.

In a case where the user of the terminal 20 makes an offline payment, the user presents the code display screen including the terminal display code image described above to a clerk of the store at the code register 60 to present the terminal display code image so as to be read by the store code reader device 50. In this case, the store code reader device 50 transmits, to the server 10, payment request information that includes information (e.g., a payment number) acquired from the read terminal display code image through decoding, information of a time point at which the terminal display code image was read, and the like, for example without limitation thereto, to make the server 10 carry out payment.

The display screen example described above may improve convenience for the user of the terminal 20 because the user may cause the code display screen to be displayed by touching the code icon, for example, without being conscious of whether the communication state is the online state or the offline state.

Terminal display codes stocked in the terminal 20 may be used not only for offline payment but also for online payment. That is, in some embodiments, the terminal 20 may determine (e.g., detect) whether or not the communication state is the offline state, and payment may be carried out using terminal display codes stocked in the terminal 20, irrespective of whether the communication state is the online state or the offline state.

Processing

Figure 4N:
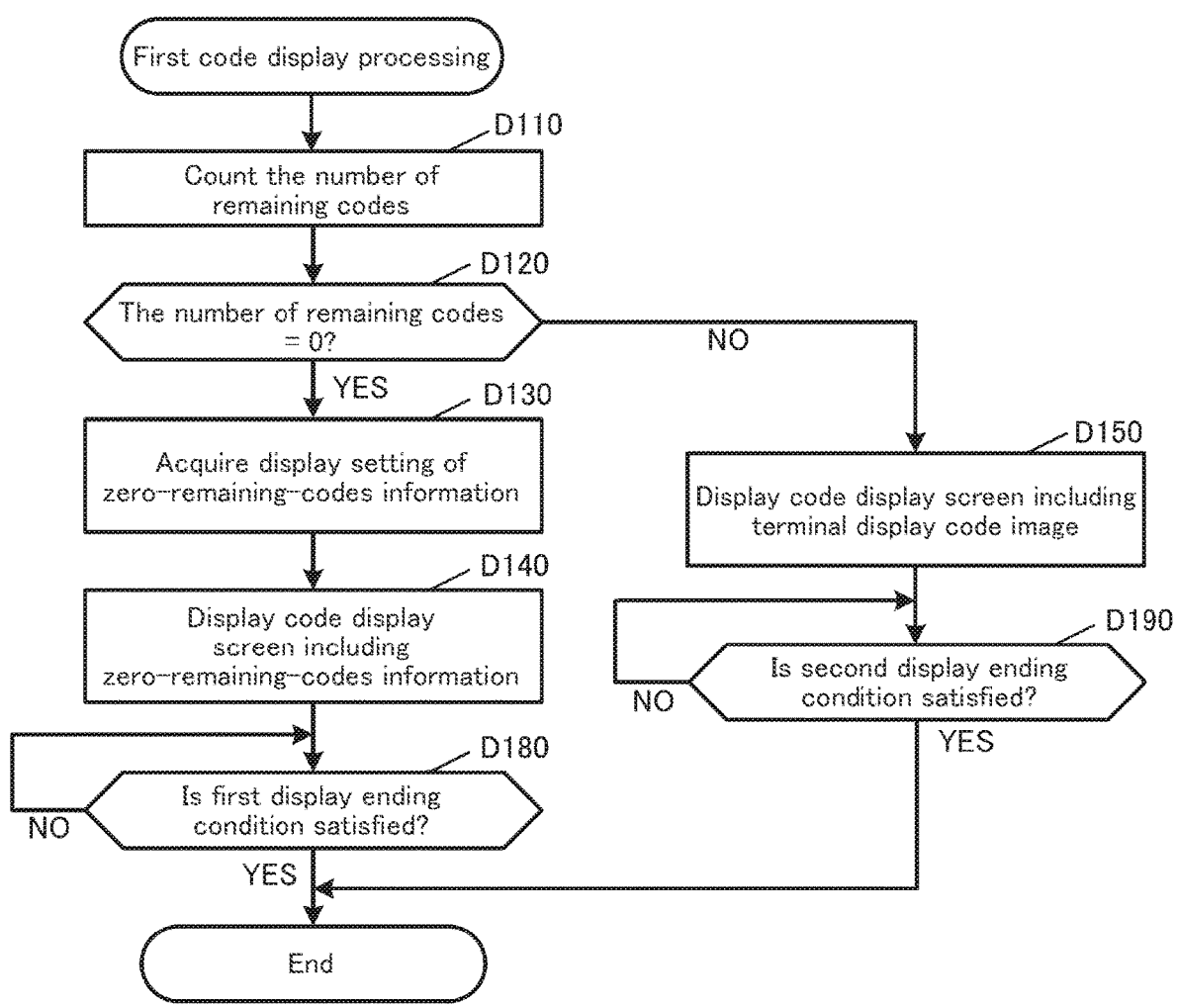
FIG. 4N is a flowchart showing an example flow of a first code display processing according to the first embodiment.

FIG. 4N is a flowchart showing an example flow of first code display processing that is executed by the code display processing unit 2113 of the terminal 20 in accordance with a first code display processing program, which is an example of the code display processing program 2823, in the present embodiment. The first code display processing is executed in operation A250 of the processing shown in FIG. 3D, for example, without limitation thereto.

Here, FIG. 3D shows the processing ending after operation A290, but the processing may be looped.

That is, the controller 21 returns to operation A110 if a code acquisition operation performed by the user of the terminal 20 is detected after operation A290, for example, without limitation thereto. Alternatively or additionally, if a code display operation performed by the user of the terminal 20 is detected after operation A290, the controller 21 returns to operation A250.

As described above, data of a terminal display code that is stored in the terminal-display-code stock data 2831 is deleted from the terminal-display-code stock data 2831 after payment processing is carried out by the server 10 using the terminal display code (operation C170) and the terminal payment completion notification is received from the server 10 in operation A290 (in a case where offline payment is carried out, after the communication state returns to the online state and the terminal payment completion notification is received from the server 10), for example, without limitation thereto. Accordingly, there may be cases where, when processing returns to operation A250 after operation A290, all of the stocked terminal display codes have already been used, and the number of remaining codes is zero.

In the first code display processing, the code display processing unit 2113 counts the number of remaining codes (operation DUO). Then, the code display processing unit 2113 determines whether or not the counted number of remaining codes is zero (operation D120).

Upon determining that the number of remaining codes is zero (operation D120: YES), the code display processing unit 2113 acquires display settings of the zero-remaining-codes information, which are stored in the remaining code count related information display setting data 2835 (operation D130).

Thereafter, the code display processing unit 2113 causes the display 24 to display a code display screen including the zero-remaining-codes information based on the display settings (including settings of display modes, for example) acquired in operation D130 (operation D140).

Thereafter, the code display processing unit 2113 determines whether or not a first display ending condition is satisfied (operation D180). The first display ending condition may be a condition that an operation performed by the user of the terminal 20 to approve the aero-remaining-codes information has been detected, or a condition that an operation performed by the user of the terminal 20 to hide the code display screen has been detected, for example.

Upon determining that the first display ending condition is not satisfied (operation D180: NO), the code display processing unit 2113 waits in this state. Alternatively or additionally, upon determining that the first display ending condition is satisfied (operation D180: YES), the code display processing unit 2113 ends the first code display processing.

Alternatively or additionally, upon determining that the number of remaining codes is not zero (operation D120: NO), the code display processing unit 2113 causes the display 24 to display a code display screen including a code image of a terminal display code stored in the terminal-display-code stock data 2831 (e.g., a code image of a terminal display code that was acquired earliest) (operation D150).

Thereafter, the code display processing unit 2113 determines whether or not a second display ending condition is satisfied (operation D190). The second display ending condition may be a condition that an operation performed by the user of the terminal 20 to hide the code display screen has been detected, or the code display time limit described above has expired, for example.

Upon determining that the second display ending condition is not satisfied (operation D190: NO), the code display processing unit 2113 waits in this state. Alternatively or additionally, upon determining that the second display ending condition is satisfied (operation D190: YES), the code display processing unit 2113 ends the first code display processing.

As described above, the method according to the present disclosure may be applied when a terminal display code is stocked in the terminal 20. Accordingly, the first code display processing described above may be applied similarly irrespective of whether the communication state is the online state or the offline state.

Code

In the processing described above, the terminal 20 requests the server 10 to generate a terminal display code image, and the terminal display code image generated by the server 10 is transmitted to the terminal 20, but there is no limitation thereto. For example, the terminal 20 may request the server 10 to generate original information (e.g., a payment number), and the original information generated by the server 10 may be transmitted to the terminal 20.

That is, in the processing shown in FIG. 3A, the contralto 21 transmits code request information to request generation of original information (in this example, a payment number) to the server 10 in operation A110. Then, the contralto 11 generates the original information based on the code generation request information in operation C120, and transmits the generated original information to the terminal 20 in operation C130. Upon receiving the original information from the server 10 in operation A130, the controller 21 generates a terminal display code image based on the received original information (in this example, the payment number). Then, the controller 21 causes the display 24 to display the generated terminal display code image.

Similarly, in the processing shown in FIG. 3D, upon receiving the original information (in this example, the payment number) from the server 10 in operation A130, the controller 21 stores the received original information (in this example, the payment number) in the terminal-display-code stock data 2831 in operation A240. Then, the controller 21 reads the stocked original information from the terminal-display-code stock data 2831 and generates a terminal display code image based on the read original information. Then, the controller 21 causes the display 24 to display the generated terminal display code image in operation A250.

Alternatively or additionally, a configuration may be employed in which the terminal 20 requests the server 10 to generate a terminal display code image and the terminal display code image generated by the server 10 is transmitted to the terminal 20, but the terminal 20 stocks original information that is acquired through decoding from the terminal display code image received from the server 10, rather than stocking the terminal display code image received from the server 10.

Effects of First Embodiment

In the first embodiment, the terminal 20 receives a code image or original information of a terminal display code (a non-limiting example of first information) transmitted from the server 10 via the communication I/F 22. The controller 21 of the terminal 20 store, the received code image or original information of the terminal display code in the terminal-display-code stock data 2831 in the storage 28.

Alternatively or additionally, the terminal 20 displays a terminal display code image (a non-limiting example of a first code image) that is based on the stored code image or original information of the terminal display code, in a code display screen (a non-limiting example of a display region of the terminal).

Alternatively or additionally, the terminal 20 executes processing (a non-limiting example of processing relating to payment) for receiving (acquiring) a terminal payment completion notification from the server 10 after payment is carried out by the server 10, based on display of the terminal display code image in the code display screen.

The terminal 20 is configured to display zero-remaining-codes information (a non-limiting example of second information) after receiving the terminal payment completion notification if a code image or original information of another terminal display code is not stored in the terminal-display-code stock data 2831.

In this configuration, second information relating to the fact that first information is not stored in the storage is displayed in the display region of the terminal based on processing relating to payment, and accordingly, the user may be notified that the first information is not stored, and this configuration has an effect of improving convenience for the user.

Alternatively or additionally, in the first embodiment, the terminal 20 includes a processor that reads the payment application program 282 from a memory in which the program is stored, and executes payment application processing based on the read payment application program 282. The processor is configured to receive a code image or original information of a terminal display code (a non-limiting example of first information) transmitted from the server 10 via the communication I/F 22, store the received code image or original information of the terminal display code in the terminal-display-code stock data 2831 in the storage 28, display a terminal display code image (a non-limiting example of the first code image) based on the stored code image or original information of the terminal display code, in a code display screen (a non-limiting example of the display region of the terminal), execute processing (a non-limiting example of processing relating to payment) for receiving a terminal payment completion notification from the server 10 after payment is carried out by the server 10, based on display of the terminal display code image in the code display screen, and display zero-remaining-codes information (a non-limiting example of second information) after receiving the terminal payment completion notification if a code image or original information of another terminal display code is not stored in the terminal-display-code stock data 2831.

With this configuration as well, the same effect as that described above may be achieved.

In the first embodiment, code images or original information of a plurality of terminal display codes are stored in the terminal-display-code stock data 2831. The zero-remaining-codes information is displayed in the code display screen based on a determination result of a condition regarding the number of code images or pieces of original information of the plurality of terminal display codes (the number of remaining codes) stored in the terminal-display-code stock data 2831.

In this configuration, a plurality of pieces of first information may be stored in the storage of the terminal, and therefore, this configuration has an effect of improving convenience for the user. Alternatively or additionally, the second information may be displayed in the display region of the terminal at an appropriate timing based on the plurality of pieces of first information stored in the storage.

Alternatively or additionally, in the first embodiment, the zero-remaining-codes information (a non-limiting example of second information) notifies the user of the terminal 20 that a code image or original information of any terminal display code is not stored in the terminal-display-code stock data 2831.

In this configuration, the user of the terminal may be notified that first information is not stored in the storage, and therefore, this configuration has an effect of improving convenience for the user.

First Variation (1)

In the first embodiment, at least one terminal display code image may also be stored in the terminal-display-code stock data 2831 as a terminal display code image that may be used in case of an emergency. In this case, a flag indicating that the code is for an emergency may be set in association with the terminal display code for an emergency in the terminal-display-code stock data 2831, for example, without limitation thereto.

In this case, the terminal display code for an emergency may be set in the terminal 20 through a selection operation performed by the user of the terminal 20, for example. A list of terminal display codes that are stored in the terminal-display-code stock data 2831 is displayed by the payment application, for example, without limitation thereto. Then, the user is urged to select (e.g., through a touch operation) a terminal display code for an emergency, and the flag indicating that the code is for an emergency is set in association with the selected terminal display code.

In some embodiments, a plurality of terminal display codes may be set as terminal display codes for an emergency.

In this case, the plurality of terminal display codes may be selected by the user as the terminal display codes for an emergency.

In this case, when the number of remaining codes is counted in operation D110 described above, a determination of whether or not the number of remaining codes (e.g., the stock number) is zero may be made while excluding terminal display code images for which the flag indicating that the codes are for an emergency is set, from the codes to be counted.

In this variation, the zero-remaining-codes information is displayed in the code display screen when a code image or original information of any terminal display code is not stored in the terminal-display-code stock data 2831, except for code images and original information of terminal display codes that are stored in the terminal-display-code stock data 2831 and may be used in case of an emergency.

With this configuration, the user may be notified that first information is not stored, while securing first information that may be used in case of an emergency, and therefore, this configuration has an effect of improving convenience for the user.

First Variation (2)

In the first embodiment, a terminal display code that is displayed in the code display screen may be excluded from remaining codes that are to be counted.

That is, when a terminal display code among terminal display codes stored in the terminal-display-code stock data 2831 is read and displayed, data of the terminal display code is saved in an active storage region of the storage 28 and is deleted from the terminal-display-code stock data 2831, for example, without limitation thereto. Thereafter, a total number of terminal display codes stored in the terminal-display-code stock data 2831 is counted as the number of remaining codes. Thus, the terminal display code displayed in the code display screen is excluded from the remaining codes to be counted.

Figure 4O:
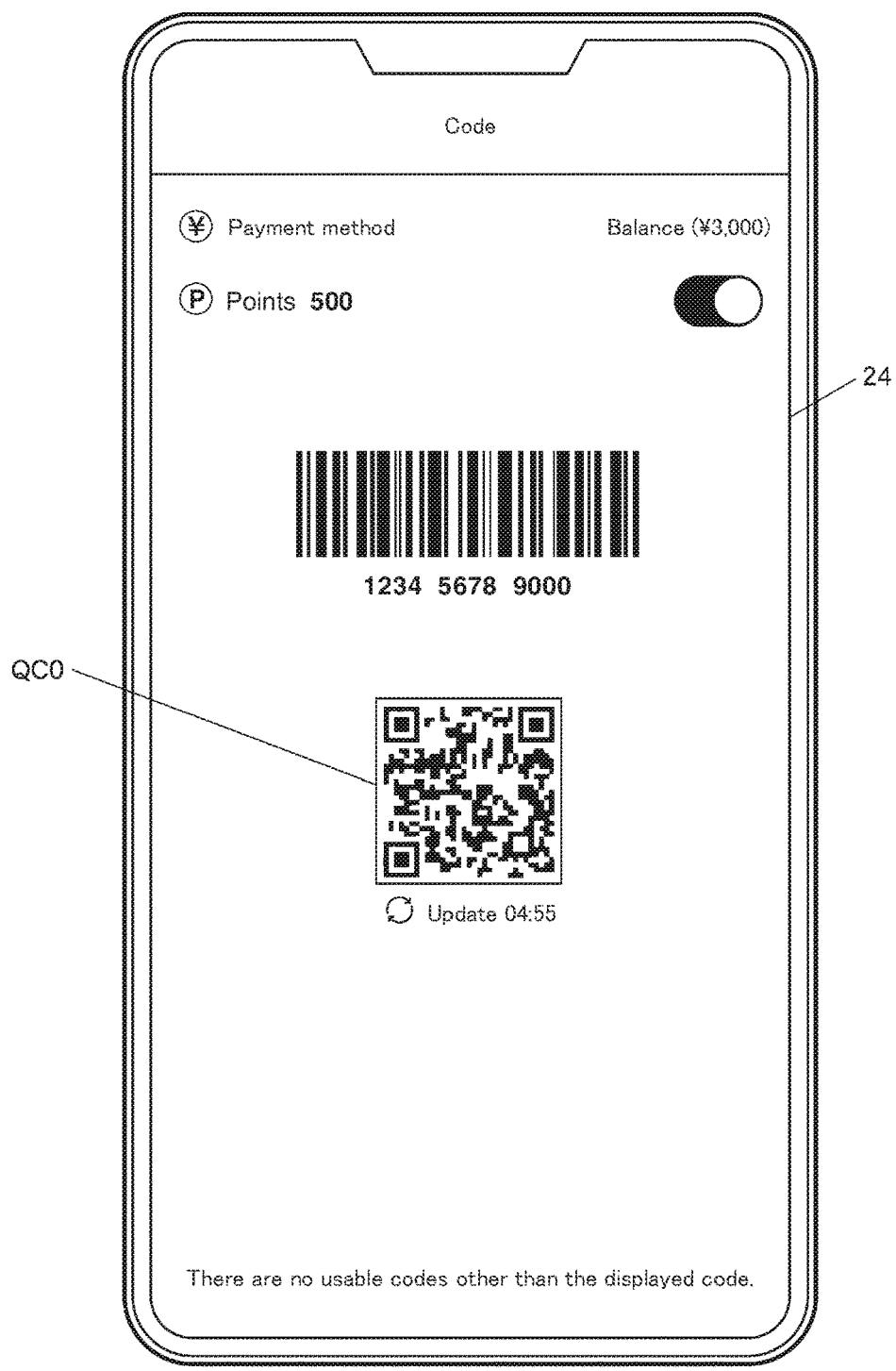
FIG. 4O is a diagram showing a third example of a display screen of the terminal according to the first embodiment.

FIG. 4O is a diagram showing an example of the code display screen in this variation.

This code display screen is displayed when the "code icon" is touched as shown in FIG. 4L, for example, without limitation thereto, and is an example of the code display screen that is displayed when a single terminal display code is stored in the terminal-display-code stock data 2831.

In this code display screen, a one-dimensional terminal display code image that is represented as a barcode and a two-dimensional terminal display code image QC1 that is represented as a QR code are displayed in different regions in the display screen as code images of a terminal display code stored in the active storage region. Alternatively or additionally, a 12-digit payment number is displayed below the one-dimensional terminal display code image, for example, without limitation thereto.

Alternatively or additionally, a message "There are no usable codes other than the displayed code." is displayed as an example of the zero-remaining-codes information in a lower portion of the code display screen.

Through this display, the terminal may notify the user of the terminal that first information other than the first information displayed in the display region is not stored in the storage.

First Variation (3)

In the first embodiment, the "first information (code information)" in the present disclosure may be a payment number or a terminal display code image including a payment number, but there is no limitation thereto. For example, a token, which is a type of authentication information, or a terminal display code image including a token may also be employed as the "first information (code information)" in the present disclosure.

In this case, a token that is issued using a method (and/or algorithm) for generating a random token may be included in the terminal display code image, for example, without limitation thereto, rather than a payment number being included in the terminal display code image. In this case, in the server 10, identification information for identifying the terminal 20 or the user of the terminal 20 may be stored in association with the issued token in the code management data of the code management database 159 in the storage 15.

The "token" is a type of authentication information for authenticating, by the server 10, the terminal 20 or the user of the terminal 20 as an authorized terminal 20 or an authorized user of the terminal 20, for example, without limitation thereto. The "authentication information" is information that is issued by a certification authority, and the token described above serves as authentication information that is issued by the server 10, which serves as the certification authority, to authenticate the terminal 20 or the user of the terminal 20.

In some embodiments, the token may be referred to as a "random token", an "access token", or a "payment token", for example. Since the token is issued at random as described above, a different token is issued every time a terminal display code is generated. Accordingly, the token serves as a one-time password.

Alternatively or additionally, in addition to the payment number or the token, information such as a URL (Uniform Resource Locator) for accessing a payment page that is a type of web page provided by the server 10 may be included as an example of access information that is used by the store code reader device 50 to access a web site or a web page provided by the server 10 after reading the terminal display code image.

First Variation (4)

In the first embodiment, when the terminal 20 displays a terminal display code image in the display 24, the controller 21 may instruct (guide) the user to present the displayed terminal display code image so as to be read by the store code reader device 50, for example, without limitation thereto. This processing is an example of processing relating to payment.

That is, a message such as "present displayed code image to be read by the code reader of the store" may be displayed in a region different from the region where the terminal display code image is displayed in the code display screen, for example, without limitation thereto.

First Variation (5)

In the first embodiment, the zero-remaining-codes information is displayed when the number of remaining codes is zero, but there is no limitation thereto. For example, the terminal 20 may be configured to cause the display 24 to display information indicating or suggesting that the number of remaining codes is insufficient, when the number of remaining codes is no greater than or smaller than a predetermined number (e.g., any of 1 to 3).

First Variation (6)

The display screen of the payment application described in the first embodiment is merely an example, and design changes may be appropriately made. For example, it is also possible to display a "code (offline) icon" that is shown as "code (offline)", other than the "code icon" described above, in the top screen of the payment application. In this case, a configuration may be employed in which, if it is determined that the terminal 20 is in the online state, a terminal display code is displayed when the "code icon" is operated, and if it is determined that the terminal 20 is in the offline state, a terminal display code is displayed when the "code (offline) icon" is operated.

First Variation (7)

In the processing shown in FIG. 3D, the terminal 20 may perform the processing performed in operations A240 and A250 to display a terminal display code in the display 24 upon receiving the terminal display code from the server 10 in operation A130.

In this case, the display may be directly switched to the code display screen including the terminal display code after the code icon is touched in the top screen (e.g., FIG. 3B) of the payment application, for example, without limitation thereto.

Second Embodiment

In a second embodiment, information that indicates the number of remaining codes or information that suggests the number of remaining codes (hereinafter collectively referred to as "the-number-of-remaining-codes information") is displayed as another example of the remaining code count related information in the display 24 of the terminal 20.

Features, embodiments, aspects, and the like that are described in the second embodiment may also be applied to other embodiments and variations.

Elements that are the same as those already described are denoted with the same reference numerals as those used for corresponding elements, and a redundant description thereof is omitted.

At least one of or a combination of two or more of the following may be included in the-number-of-remaining-codes information in the present embodiment, for example, without limitation thereto.

For example, the number of remaining codes may be expressed with a number, with a particular color, with a particular tone of a color, with a particular size, and/or with images.

Alternatively or additionally, at least one of or a combination of two or more of the following may be included in the number of remaining codes expressed with images, for example, without limitation thereto.

The number of remaining codes may be expressed with marks, icons, illustrations, or the like. Alternatively or additionally, the number of remaining codes may be expressed with a gauge (e.g., a gauge form). Alternatively or additionally, the number of remaining codes expressed with cards (e.g., card form). Alternatively or additionally, the number of remaining codes expressed with a graph (e.g., graph form).

For example, if at least one terminal display code is stored in the terminal-display-code stock data 2831 when the "code icon" is touched in the top screen of the payment application shown in FIG. 4L, the code display processing unit 2113 may cause any of the following code display screens to be displayed, for example, without limitation thereto.

Display Screen Examples

Figure 5A:
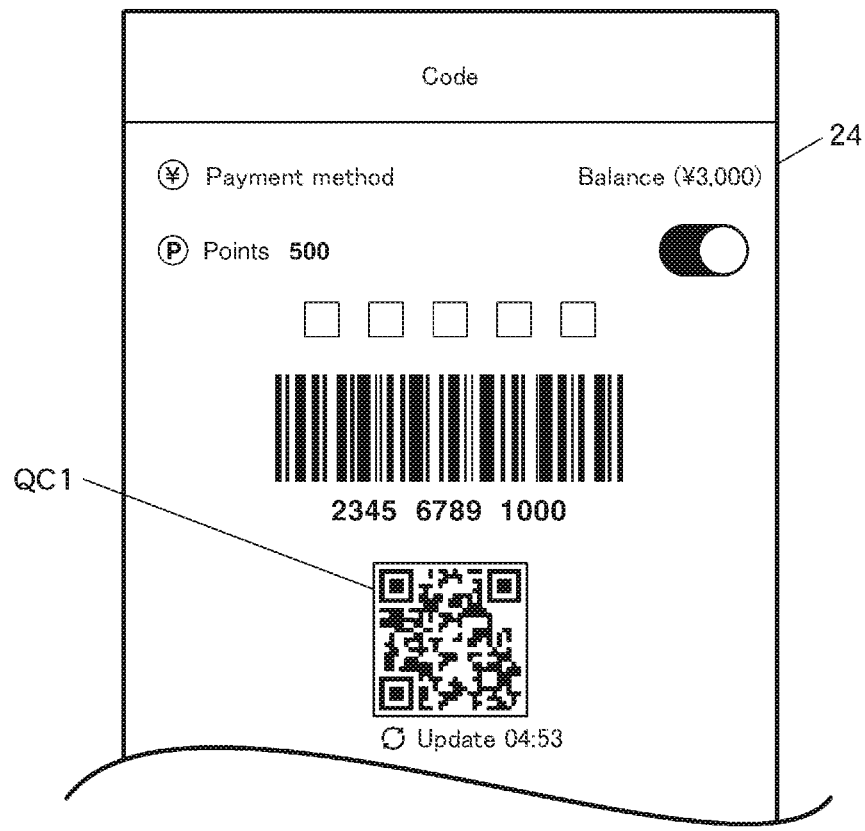
FIG. 5A is a diagram showing a first example of a display screen of a terminal according to a second embodiment.

FIG. 5A is a diagram showing an example of the code display screen in the present embodiment.

In this code display screen, the same number of images as the counted remaining codes, which are shown as rectangles, for example, and express the number of remaining codes, are displayed as one example of the-number-of-remaining-codes information that expresses the number of remaining codes with images, above the region in which a one-dimensional terminal display code is displayed. In this display example, the number of remaining codes is five, and therefore, five images expressing the number of remaining codes are displayed side by side. This display example enables the user of the terminal 20 to be aware of the number of remaining codes at a glance.

Figure 5B:
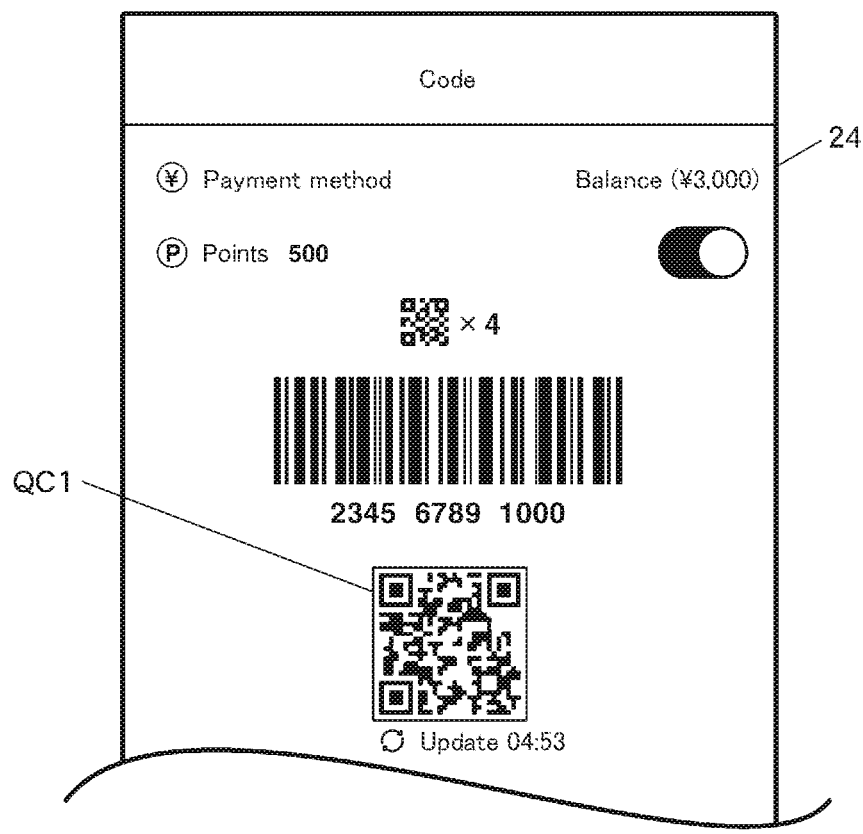
FIG. 5B is a diagram showing a second example of the display screen of the terminal according to the second embodiment.

FIG. 5B is a diagram showing another example of the code display screen in the present embodiment.

In this code display screen, a combination of an image of a two-dimensional code and a number (e.g., "×1, ×2, ×3, . . . ") indicating the number of remaining codes is displayed as one example of the-number-of-remaining-codes information that expresses the number of remaining codes with a combination of an image and a number, above the region in which a one-dimensional terminal display code is displayed. This display example also enables the user of the terminal 20 to be aware of the number of remaining codes at a glance.

Figure 5C:
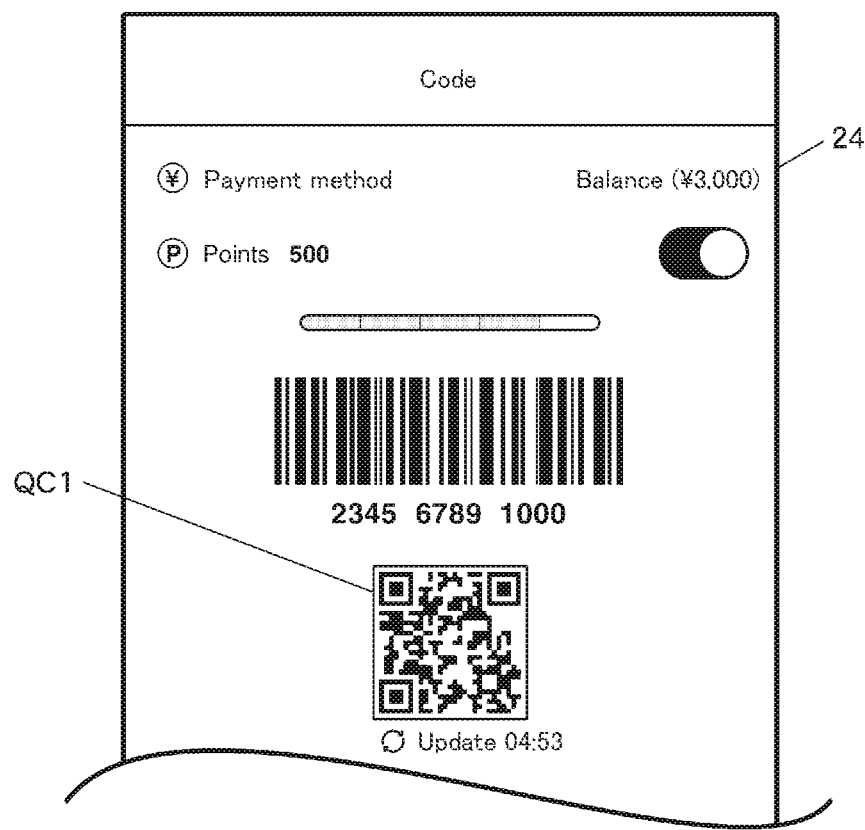
FIG. 5C is a diagram showing a third example of the display screen of the terminal according to the second embodiment.

FIG. 5C is a diagram showing another example of the code display screen in the present embodiment.

In this code display screen, a horizontal gauge that expresses the number of remaining codes is displayed as one example of the-number-of-remaining-codes information that expresses the number of remaining codes with an image, above the region in which a one-dimensional terminal display code is displayed.

The gauge expressing the number of remaining codes is divided into a plurality of regions, and the same number of regions as the remaining codes are colored. In this display example, the gauge expressing the number of remaining codes is divided into five regions, and four regions from the left are colored because the counted number of remaining codes was four. This display example also enables the user of the terminal 20 to be aware of the number of remaining codes at a glance.

Figure 5D:
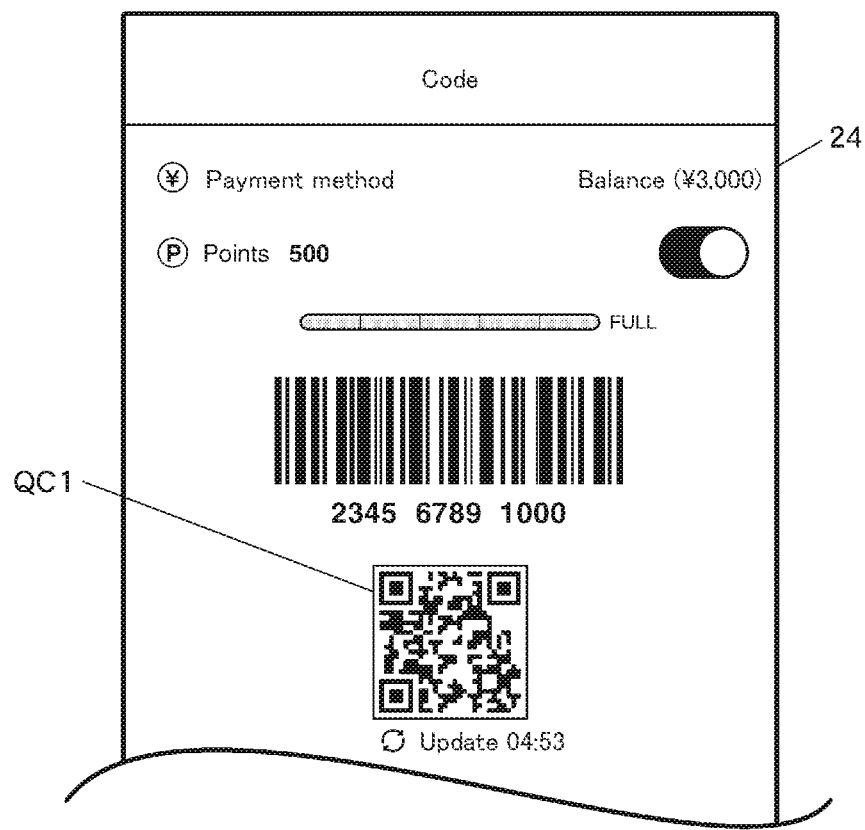
FIG. 5D is a diagram showing a fourth example of the display screen of the terminal according to the second embodiment.

FIG. 5D is a diagram showing another example of the code display screen in the present embodiment.

In this code display screen, a gauge expressing the number of remaining codes is displayed above the region in which a one-dimensional terminal display code is displayed, similarly to FIG. 5C. In this display example, five regions from the left (all regions) are colored because the counted number of remaining codes was five. Alternatively or additionally, characters "FULL" indicating that the number of remaining codes is the maximum number are displayed on the right of the gauge expressing the number of remaining codes.

Figure 5E:
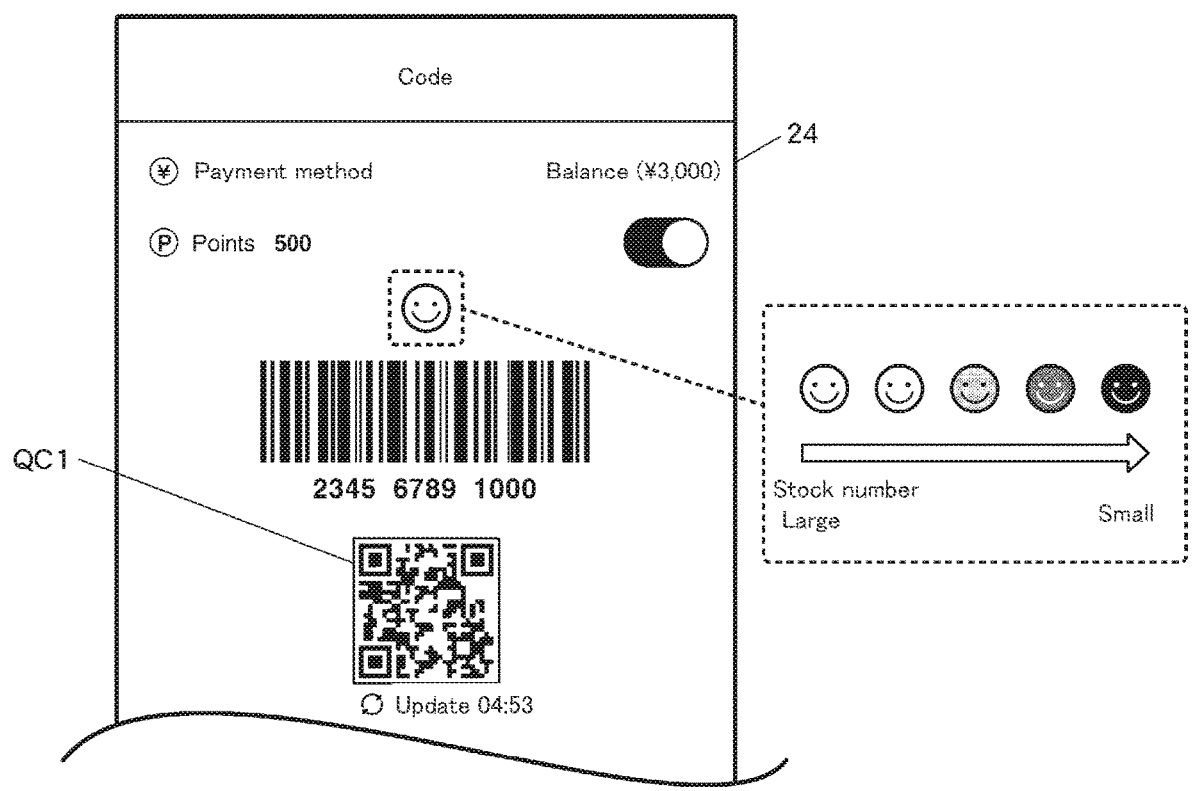
FIG. 5E is a diagram showing a fifth example of the display screen of the terminal according to the second embodiment.

FIG. 5E is a diagram showing another example of the code display screen in the present embodiment.

In this code display screen, a mark that is a face image and expresses the number of remaining codes is displayed as one example of the-number-of-remaining-codes information that expresses the number of remaining codes with an image, above the region in which a one-dimensional terminal display code is displayed. In this display example, the mark expressing the number of remaining codes is displayed with the same facial expression (e.g., smile) irrespective of the number of remaining codes, but the color of the mark (color of the face) varies according to the number of remaining codes. That is, the smaller the number of remaining codes is, the darker the color becomes, and to the contrary, the larger the number of remaining codes is, the lighter the color becomes, as a non-limiting example.

In some embodiments, the color of the mark expressing the number of remaining codes may be changed, rather than the tone of the color being varied.

For example, the color of the mark expressing the number of remaining codes may be changed in the order of "red→orange→yellow→green→blue" with "red" expressing a state where the number of remaining codes is at the minimum and "blue" expressing a state where the number of remaining codes is at the maximum.

Figure 5F:
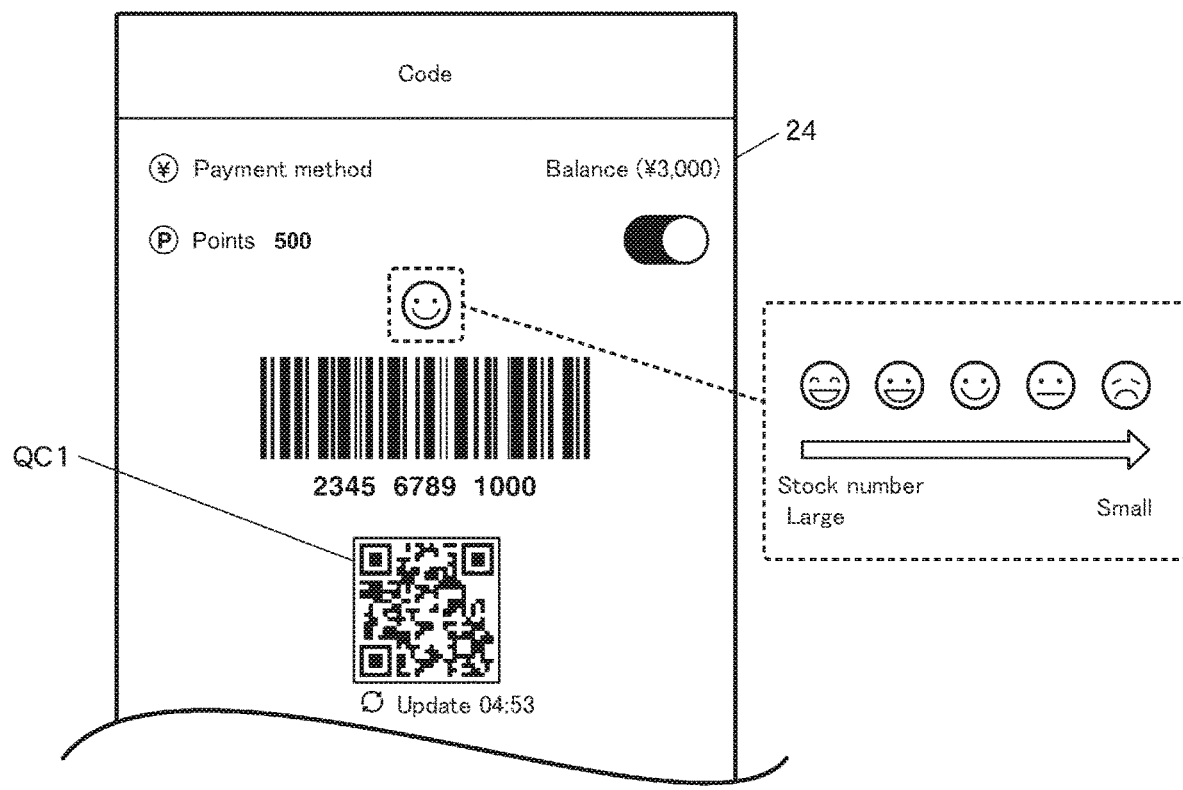
FIG. 5F is a diagram showing a sixth example of the display screen of the terminal according to the second embodiment.

FIG. 5F is a diagram showing another example of the code display screen in the present embodiment.

In this code display screen, a mark that is a face image and expresses the number of remaining codes is displayed above the region in which a one-dimensional terminal display code is displayed, similarly to the code display screen described above, but in this display example, the facial expression of the mark expressing the number of remaining codes vanes according to the number of remaining codes. That is, the larger the number of remaining codes is, the happier the facial expression becomes, and to the contrary, the smaller the number of remaining codes is, the sadder the facial expression becomes, for example, without limitation thereto.

In some embodiments, the mark expressing the number of remaining codes may also be displayed in a mode that is a combination of the mode shown in FIG. 5E and the mode shown in FIG. 5F. That is, a configuration is also possible in which the facial expression and the color of face of the mark expressing the number of remaining codes vary according to the number of remaining codes.

Processing

Figure 5G:
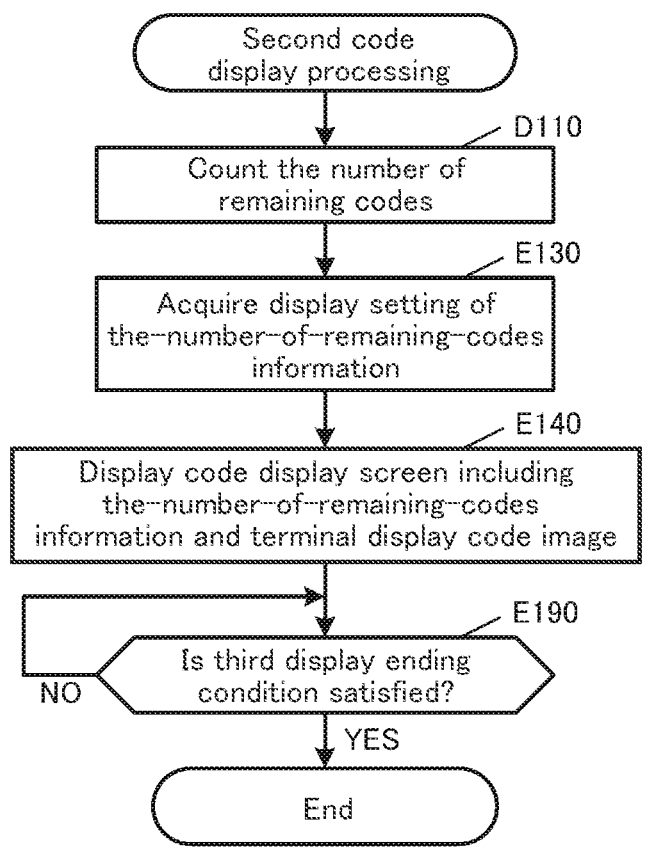
FIG. 5G is a flowchart showing an example flow of a second code display processing according to the second embodiment.

FIG. 5G is a flowchart showing an example flow of second code display processing that is executed by the code display processing unit 2113 of the terminal 20 in accordance with a second code display processing program, which is an example of the code display processing program 2823, in the present embodiment. The second code display processing is executed in operation A250 in the processing shown in FIG. 3D, for example, without limitation thereto.

Note that the same operations as those in the first code display processing (FIG. 4N) are denoted with the same reference numerals as those used for corresponding operations, and a redundant description thereof is omitted.

Processing after operation D110 of the first code display processing (FIG. 4N) is modified in the processing shown in FIG. 5G.

After operation D110, the code display processing unit 2113 acquires display settings of the-number-of-remaining-codes information, which are stored in the remaining code count related information display setting data 2835 (operation E130). Thereafter, the code display processing unit 2113 causes the display 24 to display a code display screen including the-number-of-remaining-codes information and a terminal display code image based on the display settings (including settings of display modes, for example) acquired in operation E130 (operation E140).

Thereafter, the code display processing unit 2113 determines whether or not a third display ending condition is satisfied (operation E190). The third display ending condition may be a condition that an operation performed by the user of the terminal 20 to hide the code display screen has been detected, or a condition that the code display time limit described above has expired, for example.

Upon determining that the third display ending condition is not satisfied (operation E190: NO), the code display processing unit 2113 waits in this state. Alternatively or additionally, upon determining that the third display ending condition is satisfied (operation E190: YES), the code display processing unit 2113 ends the second code display processing.

Effects of Second Embodiment

In the second embodiment, the-number-of-remaining-codes information (a non-limiting example of information relating to the number of pieces of first information stored in the storage) that indicates the number of code images or pieces of original information of terminal display codes (a non-limiting example of first information) stored in the terminal-display-code stock data 2831, that is, the number of remaining codes (stock number) is displayed in the code display screen.

This configuration has an effect of enabling the terminal to notify the user of the number of pieces of first information stored in the storage by displaying information relating to the number of pieces of first information stored in the storage, in the display region.

Alternatively or additionally, in this case, the zero-remaining-codes information described in the first embodiment is a type of the-number-of-remaining-codes information that indicates that the number of code images or pieces of original information of terminal display codes stored in the terminal-display-code stock data 2831 is zero.

This configuration has an effect of enabling the terminal to notify the user that the number of pieces of first information stored in the storage is zero, as well as notifying the user of the number of pieces of first information stored in the storage.

Alternatively or additionally, in the second embodiment, the-number-of-remaining-codes information is displayed in different display modes based on the number of code images or pieces of original information of terminal display codes stored in the terminal-display-code stock data 2831.

This configuration has an effect of enabling the terminal to display the number of pieces of first information stored in the storage such that the user may be easily aware of the number (at a glance).

Alternatively or additionally, in the second embodiment, the controller 21 of the terminal 20 executes control for changing a display mode of the-number-of-remaining-codes information based on display of a terminal display code image in the code display screen.

In this configuration, the terminal executes control for changing the display mode of information relating to the number based on display of a first code image in the display region, and therefore, this configuration has an effect of enabling the terminal to appropriately notify the user of the number of pieces of first information stored in the storage, upon the first code image being displayed.

Second Variation (1)

In the second embodiment, when the number of remaining codes is relatively large, the entirety of the-number-of-remaining-codes information may not be displayed in the screen or the appearance of the-number-of-remaining-codes information may be impaired, depending on the method for displaying the-number-of-remaining-codes information. Therefore, an upper limit number may be set for the-number-of-remaining-codes information to be displayed.

In this case, if the number of remaining codes is larger than the upper limit number, the-number-of-remaining-codes information may be displayed in the same mode as that of a case where the number of remaining codes is equal to the upper limit number. For example, if the upper limit number is set to "five", when the number of remaining codes is larger than five, the-number-of-remaining-codes information may be displayed in the same mode as that of the case where the number of remaining codes is five.

For example, the code display screen shown in FIG. 5D described above is a screen of a case where the number of remaining codes is five, and the five regions (all regions) of the gauge expressing the number of remaining codes are colored and the characters "FULL" are displayed on the right of the gauge. In this case, when the number of remaining codes is larger than five, the-number-of-remaining-codes information may be displayed in the same mode as that of the code display screen shown in FIG. 5D.

Alternatively or additionally, a configuration may be employed in which the five regions (all regions) of the gauge expressing the number of remaining codes are colored but the characters "FULL" are not displayed when the number of remaining codes is five, and the characters "FULL" are displayed when the number of remaining codes is larger than five.

Although a case where the-number-of-remaining-codes information is displayed in the gauge form shown in FIGS. 5C and 5D is described here, similar may be said for cases where the-number-of-remaining-codes information is displayed in other forms.

That is, in a case where the number of remaining codes is expressed with a number, for example, the number of remaining codes that is larger than the upper limit number may be expressed with the same number as that used when the number of remaining codes is equal to the upper limit number.

Alternatively or additionally, in a case where the number of remaining codes is expressed with a particular tone of a color, for example, the number of remaining codes that is larger than the upper limit number may be expressed with the same tone of the color as that used when the number of remaining codes is equal to the upper limit number.

Second Variation (2)

As described in First Variation (2), a terminal display code displayed in the code display screen may be excluded from remaining codes that are to be counted.

In this case, when a terminal display code among terminal display codes stored in the terminal-display-code stock data 2831 is read and displayed, data of the terminal display code is saved in an active storage region of the storage 28 and is deleted from the terminal-display-code stock data 2831 as described above.

Thereafter, a total number of terminal display codes stored in the terminal-display-code stock data 2831 is counted as the number of remaining codes. Thus, the terminal display code displayed in the code display screen is excluded from the remaining codes to be counted. The-number-of-remaining-codes information may be displayed in any of the modes shown in FIGS. 5A to 5F, for example, based on the number of remaining codes counted as described above.

Second Variation (3)

Processing may be executed in which display of the zero-remaining-codes information described in the first embodiment and display of the-number-of-remaining-codes information described in the second embodiment are combined.

Figure 5H:
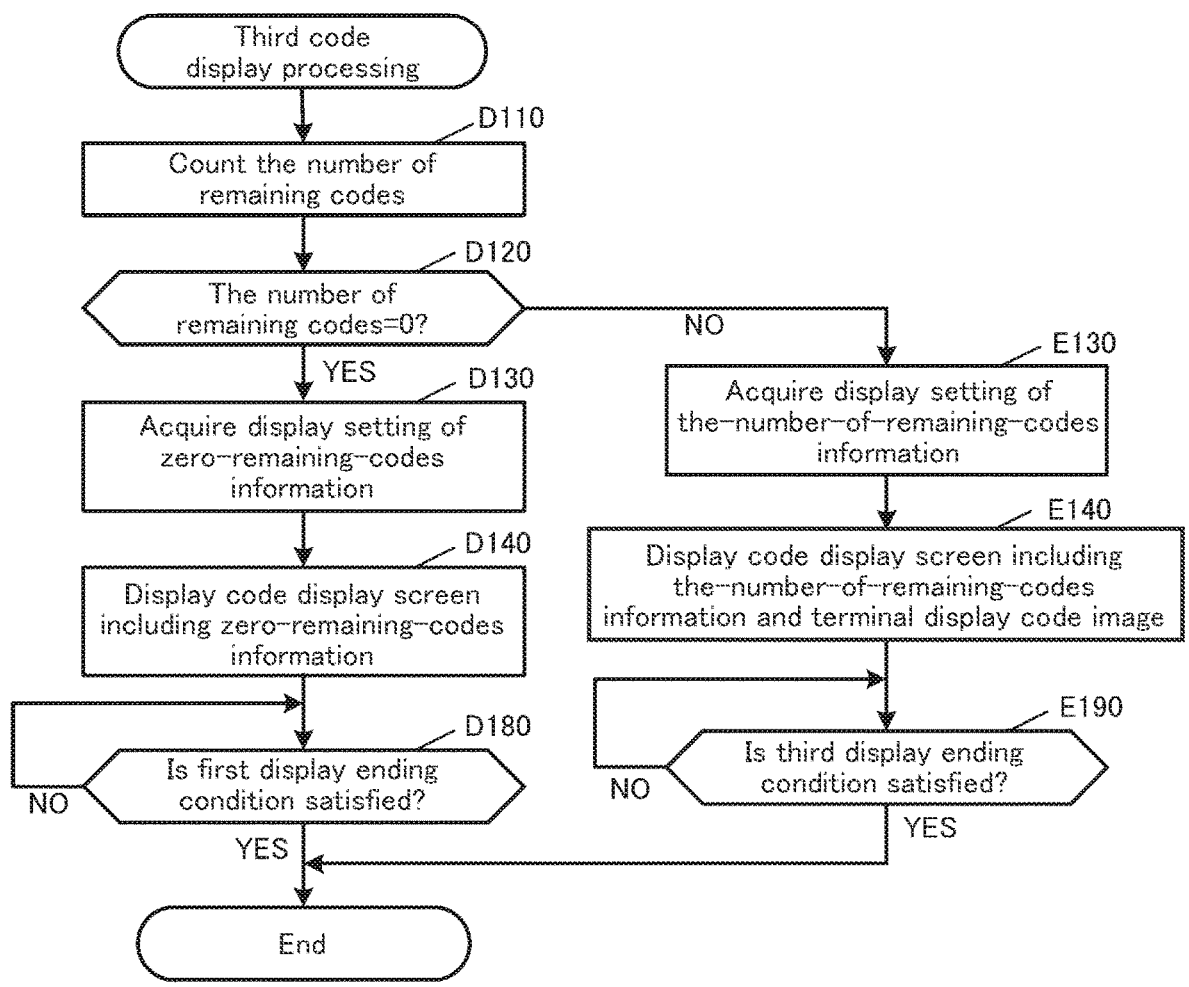
FIG. 5H is a flowchart showing an example flow of a third code display processing according to the second embodiment.

FIG. 5H is a flowchart showing an example flow of third code display processing that is executed by the code display processing unit 2113 of the terminal 20 in accordance with a third code display processing program, which is an example of the code display processing program 2823, in this variation. The third code display processing is executed in operation A250 in the processing shown in FIG. 3D, for example, without limitation thereto.

Note that the same operations as those in the already described processing are denoted with the same reference numerals as those used for corresponding operations, and a redundant description thereof is omitted.

The processing shown in FIG. 5H is a combination of the first code display processing (FIG. 4N) and the second code display processing (FIG. 5G).

After operation D110, upon determining that the counted number of remaining codes is zero (operation D120: YES), the code display processing unit 2113 performs the processing in operations D130 to D180, and then ends the third code display processing.

Alternatively or additionally, upon determining that the counted number of remaining codes is not zero (operation D120: NO), the code display processing unit 2113 performs the processing in operations E130 to E190, and then ends the third code display processing.

Second Variation (4)

It is also possible to set a time limit (hereinafter referred to as a "period of validity of a code") for a terminal display code generated by the server 10, within which payment may be performed using the terminal display code, and to display information indicating the period of validity of the code such that the user of the terminal 20 may recognize the period.

The period of validity of a code may be managed by the server 10 with respect to each generated terminal display code. For example, the date and time at which a terminal display code is generated by the server 10 is referred to as "code generation date and time", and a period of time that is set by the server 10 as the period during which the code is valid is referred to as a "code valid time". In this case, a "period from the code generation date and time to when the code valid time elapses" is set as the period of validity of the code, for example, without limitation thereto.

FIG. 5I is a flowchart showing an example flow of processing that is executed by the devices in this variation. Examples of processing executed by the controller 21 of the terminal 20, processing executed by the controller 51 of the store code reader device 50, and processing executed by the controller 11 of the server 10 are shown in this order from the left.

A portion of the flowchart shown in FIG. 5I is modified from the flowchart shown in FIG. 3D. Differences from the flowchart shown in FIG. 3D are operations A330 to A350, B350, B360, C320, C330, and C370, for example, without limitation thereto.

In this processing, the application ID described above will be described as identification information for identifying the terminal 20 or the user of the terminal 20, for example.

After operation C110, the controller 11 of the server 10 performs terminal display code generation processing (operation C320). That is, the controller 11 generates a random number having a predetermined number of digits (e.g., about 10 to 12 digits) as a payment number using a method (algorithm) for generating random numbers having the predetermined number of digits, for example, without limitation thereto. Then, the controller 11 generates a terminal display code image that includes at least the payment number as original information, for example, without limitation thereto. Moreover, the controller 11 generates the terminal display code image that is represented as an image of a two-dimensional code (e.g., a QR code), by encoding at least the payment number and expressing the payment number as a figure (image).

Alternatively or additionally, the controller 11 stores code generation date and time that is based on time measurement information output from the clock unit 19, a code No., the generated payment number, and a period of validity of the code that is set for the generated terminal display code, in association with each other, in code management data corresponding to an application ID included in the received code generation request information, among pieces of code management data stored in the code management database 159.

Then, the controller 11 transmits the generated terminal display code (in this example, the terminal display code image) and the period of validity of the code set for the terminal display code, together with the code No., to the terminal 20 through the communication I/F 14 (operation C330).

Upon receiving the terminal display code (in this example, the terminal display code image) and the period of validity of the code from the server 10 through the communication I/F 22 (operation A330), the controller 21 of the terminal 20 stocks the received terminal display code (in this example, the terminal display code image) (operation A340). That is, the controller 21 stores code data of the received terminal display code and the received period of validity of the code, in association with code received date and time and the code No., in the terminal-display-code stock data 2831.

When a code display operation is performed by the user of the terminal 20 in the offline state, for example, without limitation thereto, the code display processing unit 2113 performs code display processing (operation A350).

That is, the code display processing unit 2113 reads code data of the terminal display code stored in the terminal-display-code stock data 2831 and causes the display 24 to display a code display screen including the terminal display code image, for example, without limitation thereto. At this time, the code display processing unit 2113 causes the-number-of-remaining-codes information and information of the period of validity of the code to be displayed in association with each other in the code display screen, for example, without limitation thereto.

Thereafter, when the terminal display code image displayed in the display 24 is presented by the user of the terminal 20 to a store cleric or the like, the controller 51 controls the code reader 58 to read the terminal display code image displayed in the display 24 of the terminal 20 (operation B350).

Thereafter, the controller 51 accesses the server 10 through the communication I/F 54 using the application interface (API) described above, for example, and transmits payment request information that includes at least the payment number acquired from the read terminal display code image through decoding, store identification information, a to-be-paid amount, and a time point (hereinafter referred to as a "code reading time point") at which the terminal display code image was read, to the server 10 through the communication I/F 54 (operation B360).

Upon receiving the payment request information from the store code reader device 50 through the communication I/F 14 (operation C160), the controller 11 performs payment processing (operation C370).

That is, the controller 11 determines whether or not the payment number included in the received payment request information is stored in the code management database 159 in association with an application ID. Upon determining that the payment number has been stored, the controller 11 determines whether or not the code reading time point included in the received payment request information is within the period of validity of the code that is stored in association with the payment number in code management data corresponding to the application ID. If the code reading time point is within the period of validity of the code, the controller 11 determines that "payment can be made", and carries out payment by subtracting the to-be-paid amount from the balance stored in payment management data corresponding to the application ID in the payment management database 157A.

Figure 5J:
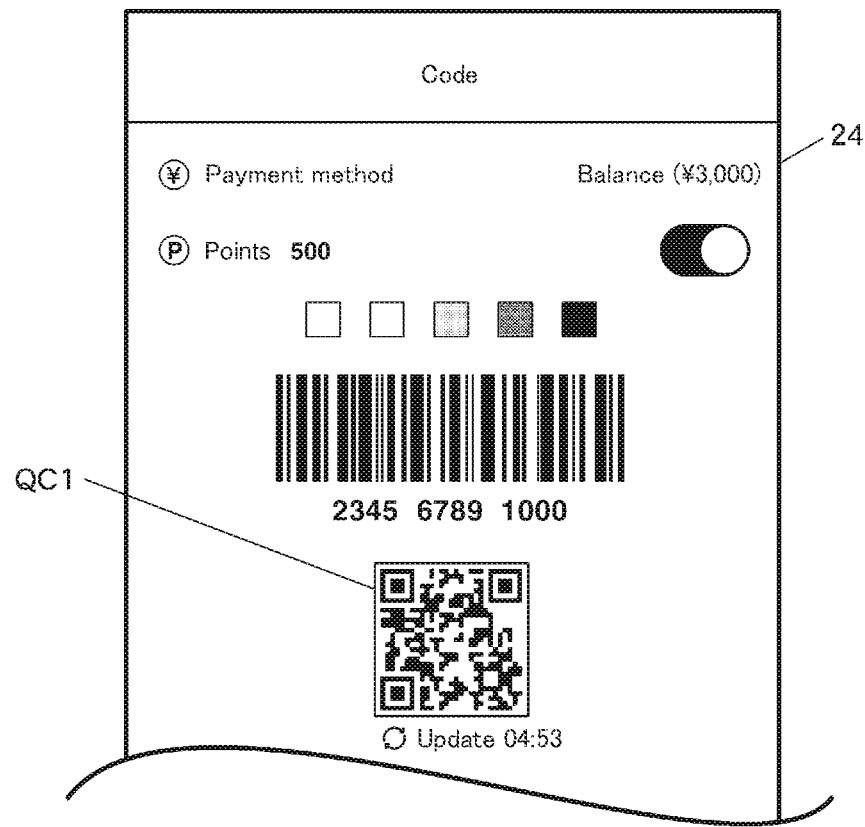
FIG. 5J is a diagram showing a seventh example of the display screen of the terminal according to the second embodiment.

FIG. 5J is a diagram showing an example of the code display screen in this variation. This code display screen is displayed in operation A350 of the processing shown in FIG. 5I, for example, without limitation thereto.

In this code display screen, the same number of images as the counted remaining codes, which are shown as rectangles, for example, and express the number of remaining codes, are displayed above the region in which a one-dimensional terminal display code is displayed, similarly to the code display screen shown in FIG. 5A. However, unlike the code display screen shown in FIG. 5A, the images that express the number of remaining codes and respectively correspond to terminal display codes are each displayed with a tone of color that is based on a period of validity associated with the corresponding terminal display code.

In this case, the code display processing unit 2113 displays the images expressing the number of remaining codes such that the shorter the remaining time of the period of validity of a terminal display code is, the lighter the color of an image corresponding to the terminal display code becomes, for example, without limitation thereto. To the contrary, the longer the remaining time of the period of validity of a terminal display code is, the darker the color of an image corresponding to the terminal display code becomes.

Rather than varying the tone of the color of the images expressing the number of remaining codes based on periods of validity of corresponding codes, a configuration may be employed in which the color of each image is changed based on the period of validity of a corresponding code. For example, based on the remaining time of the period of validity of a corresponding code, the color of each image expressing the number of remaining codes may be changed in the order of "red→orange→yellow→green→blue", among which red expressing the shortest remaining time.

In this configuration, the terminal may notify the user of the terminal of information regarding a period of validity (e.g., the remaining time of the period of validity) that is associated with each piece of first information (code information), together with the number of pieces of first information (code information) stored in the storage.

This method is effective in a case where terminal display codes have been acquired or supplemented from the server 10 at different time points, for example, because the user of the terminal may be aware of information regarding the period of validity of each terminal display code at a glance.

In the processing described above, a terminal display code and a period of validity of the code (a non-limiting example of information relating to a period of validity) are transmitted from the server 10 to the terminal 20 and are received by the terminal 20, but there is no limitation thereto.

That is, a configuration may be employed in which the code valid time is stored in advance in the payment application data 283 in the terminal 20, for example, without limitation thereto. Code generation date and time (a non-limiting example of information relating to a period of validity) is transmitted from the server 10 and received by the terminal 20, for example, without limitation thereto. In this case, the terminal 20 may specify the period of validity of the code based on the received code generation date and tune and the code valid time stored in the payment application data 283.

Alternatively or additionally, a configuration is also possible in which the period of validity of a code starts from date and time (hereinafter referred to as "code transmitted date and time") at which the terminal display code is transmitted from the server 10 to the terminal 20, rather than the code generation date and time. In this case, the terminal 20 may specify the period of validity of the code based on the code transmitted date and time and the code valid time stored in the payment application data 283, for example, without limitation thereto.

Other than the above, a configuration is also possible in which information of the date and time at which the period of validity of a code ends is transmitted from the server 10 to the terminal 20 as information relating to the period of validity, for example. In this case, the period of validity of the code may be specified by the terminal 20 based on the code valid time and the received date and time at which the period of validity of the code ends.

A configuration is also possible in which a period of validity associated with a terminal display code is not transmitted from the server 10 to the terminal 20 and the terminal 20 cannot be aware of the period of validity of the code set by the server 10. In this case, code received date and time, a code No., and code data may be stored in association with each other in the terminal-display-code stock data 2831, for example, without limitation thereto, without the period of validity of the code being stored.

In this case, a provisional period of validity of the code (hereinafter referred to as a "provisional validity period of the code") may be stored in the terminal 20. That is, a "period from the code received date and time (or the code stored date and time) to when the code valid time elapses" may be set as the provisional validity period of the code, for example, without limitation thereto.

Third Embodiment

In the second embodiment, the-number-of-remaining-codes information is displayed in the code display screen, but there are two methods for counting the number of remaining codes, as described above. Accordingly, there is a problem in that it is difficult for the user to know whether or not a terminal display code displayed in the code display screen is included in the number of remaining codes that may be recognized from the-number-of-remaining-codes information.

Matter described in a third embodiment may also be applied to other embodiments and variations.

Constitutional elements that are the same as those already described are denoted with the same reference numerals as those used for corresponding elements, and a redundant description thereof is omitted.

Figure 6A:
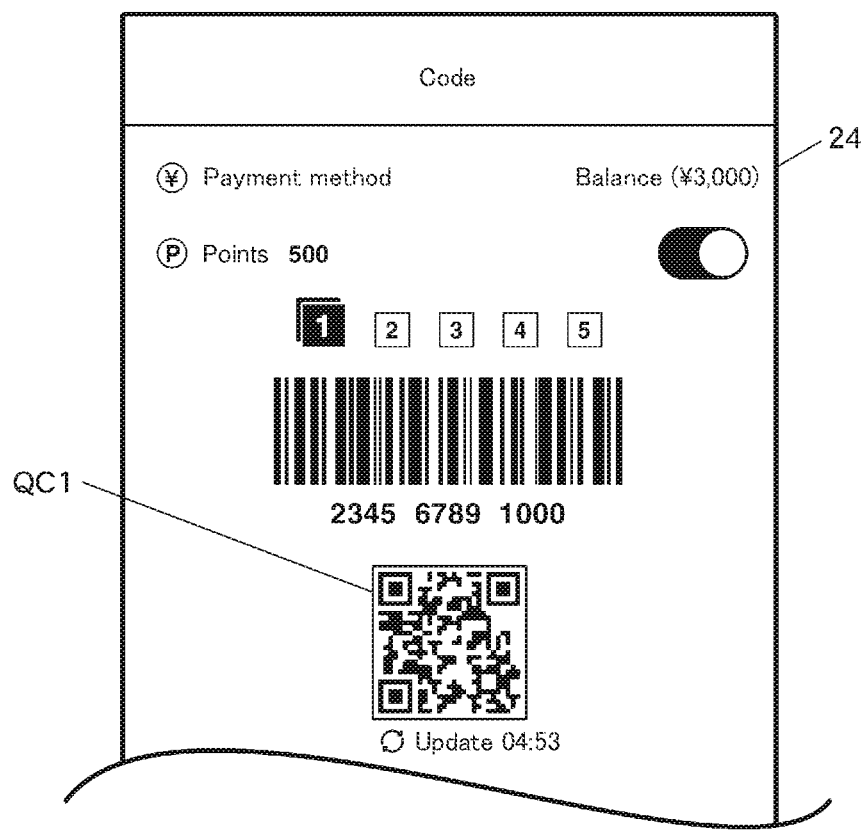
FIG. 6A is a diagram showing a first example of a display screen of a terminal according to a third embodiment.

FIG. 6A is a diagram showing an example of the code display screen in the present embodiment.

In this code display screen, the same number of first guide images as the counted remaining codes, which are shown as rectangles having numbers therein, for example, are displayed above the region in which a one-dimensional terminal display code is displayed.

In this display example, five first guide images are displayed and the leftmost first guide image is emphasized by being shown as if emerging forward and changed to black, for example, without limitation thereto. The remaining four first guide images are displayed in a default state. When any one of the remaining four first guide images is touched, a terminal display code image that corresponds to the touched first guide image is displayed at the center of the screen.

FIG. 6B is a diagram showing another example of the code display screen in the present embodiment.

In this code display screen, the same number of second guide images as the counted remaining codes, which are illustrations (imitations) of two-dimensional codes, for example, are displayed above the region in which a one-dimensional terminal display code is displayed.

In this display example, five second guide images are displayed, and when any one of the second guide images is touched by the user, a terminal display code image is displayed at the center of the screen using animation, based on data of a terminal display code that corresponds to the touched second guide image, for example, without limitation thereto.

In this display example, as a result of the leftmost second guide image being touched, an entire image that includes a terminal display code image is gradually scaled up to a prescribed size that is based on the size of the display screen of the display 24, from the position at which the leftmost second guide image is displayed, the scaling up processing ends when the image finally has the prescribed size, and the image is displayed as shown in the right drawing of FIG. 6B. When the scaling up processing ends, the corresponding second guide image is hidden, and the remaining four second guide images are displayed by being left-justified.

A configuration may be employed in which a guide image corresponding to a displayed terminal display code image is hidden, but the remaining guide images are displayed at their original positions without being left-justified, rather than the guide image corresponding to the displayed terminal display code image being hidden and the remaining guide images being displayed by being left-justified as in this example.

FIG. 6C is a diagram showing another example of the code display screen in the present embodiment.

In this code display screen, the same number of third guide images as the counted remaining codes, which are shown as rectangles, for example, are displayed above the region in which a one-dimensional terminal display code image is displayed, similarly to the code display screen shown in FIG. 6B, but this example differs from the code display screen shown in FIG. 6B in that a touched third guide image is displayed in the original state (active state) and the remaining third guide images are displayed in a non-active state.

That is, in this display example, five third guide images are displayed, and when any one of the third guide images is touched by the user, a terminal display code image is displayed at the center of the screen using animation, based on data of a terminal display code that corresponds to the touched third guide image, similarly to FIG. 6B.

In this display example, as a result of the leftmost third guide image being touched, an entire image that includes a terminal display code image is gradually scaled up to a prescribed size that is based on the size of the display screen of the display 24, from the position at which the leftmost third guide image is displayed, the scaling up processing ends when the image finally has the prescribed size, and the image is displayed as shown in the right drawing of FIG. 6C. Alternatively or additionally, the touched leftmost third guide image is displayed in the original state (active state), and the remaining four third guide images are displayed in the non-active state.

In some embodiments, the second guide images and the third guide images described above are icons (marks) that imitate two-dimensional code images (e.g., QR code images), and are not genuine code images. Consequently, these guide images may not be read using a code reader and/or used for payment.

Figure 6D:
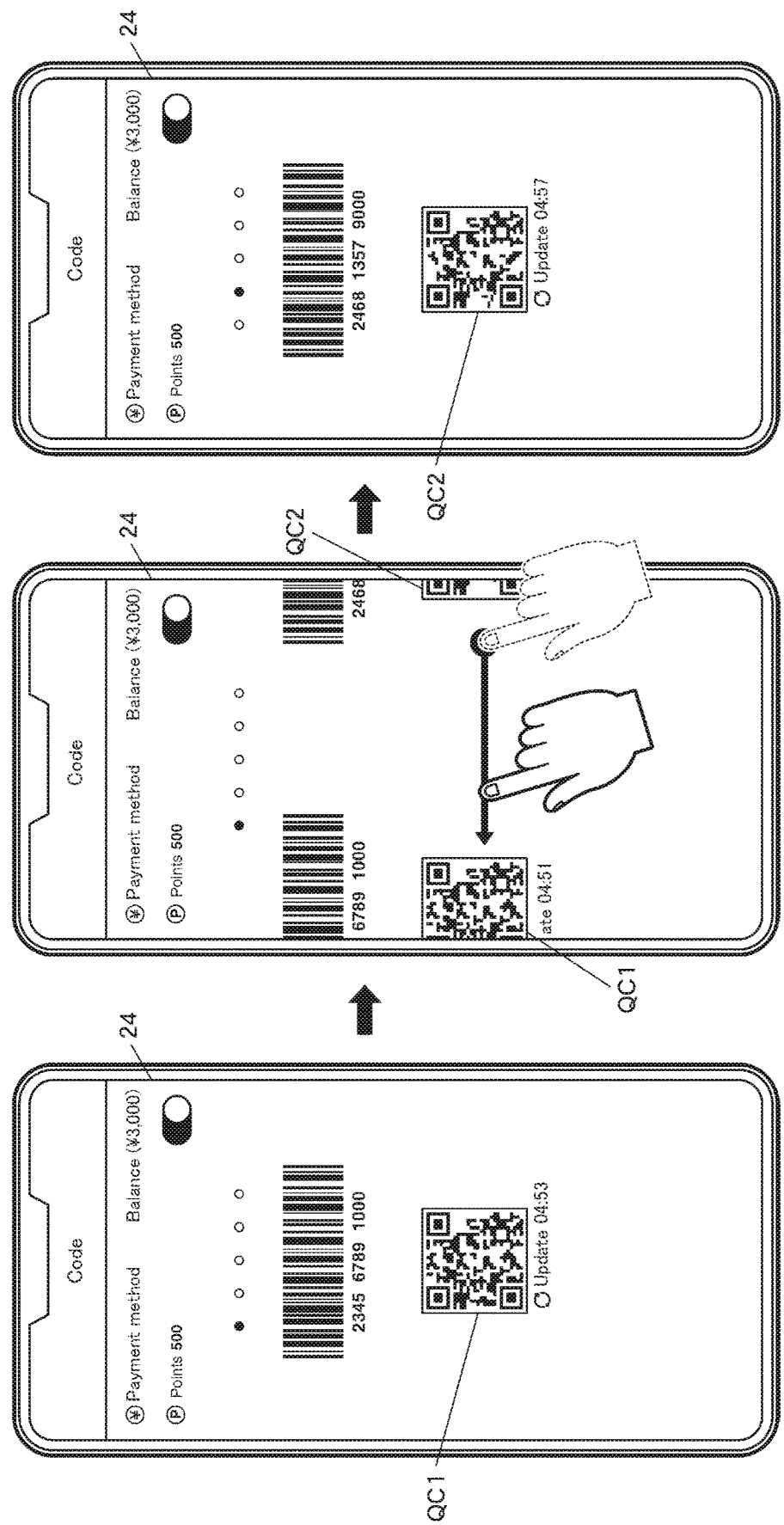
FIG. 6D is a diagram showing a fourth example of the display screen of the terminal according to the third embodiment.

FIG. 6D is a diagram showing another example of the code display screen in the present embodiment.

This code display screen is configured to enable the user of the terminal 20 to switch display of a plurality of terminal display codes (terminal display code images) stored in the terminal-display-code stock data 2831 in the manner of slides by performing a swipe operation, for example, without limitation thereto.

That is, the same number of fourth guide images as the terminal display codes stored in the terminal-display-code stock data 2831 (i.e., the same number as the number of remaining codes (stock number)), which are shown as circles (o), for example, are displayed side by side above the region in which a one-dimensional terminal display code image is displayed, for example, without limitation thereto.

The fourth guide images respectively correspond to a first terminal display code, a second terminal display code, a third terminal display code, and so on in order from the left, and when a code image of a terminal display code that corresponds to any of the fourth guide images is displayed at the center of the screen, the fourth guide image that has been shown in white is displayed in black, for example, without limitation thereto.

In this display example, the number of remaining codes (stock number) is five, and accordingly, display of five terminal display codes may be switched in the manner of slides, and five fourth guide images that respectively correspond to the terminal display codes and are shown as circles are displayed.

The left drawing shows a state where a first code image including a two-dimensional terminal display code image QC1 is displayed, the leftmost fourth guide image is displayed as a black circle, and the other fourth guide images are displayed as white circles.

The center drawing shows a state where the user of the terminal 20 has touched the display screen and then performed a swipe operation from the touched position to the left. As a result of the swipe operation being performed to the left, display of the first code image including the two-dimensional terminal display code image QC1 switches to display of a second terminal display code including a two-dimensional terminal display code image QC2.

The right drawing shows a state where the second terminal display code including the two-dimensional terminal display code image QC2 is displayed as a result of the swipe operation, the second from the left fourth guide image is displayed as a black circle, and the other fourth guide images are displayed as white circles.

The various types of guide images described above are the-number-of-remaining-codes information (a non-limiting example of information relating to the number of pieces of first information stored in the storage) and examples of guide information for informing the user of the terminal 20 of a correspondence with a displayed terminal display code image or original information (non-limiting example of first information).

Note that in the display examples described above, the guide images and the terminal display code images are arranged in the order of the time at which corresponding terminal display codes stored in the terminal-display-code stock data 2831 were acquired, such that the guide image and the terminal display code image corresponding to the terminal display code that was acquired earliest are displayed at the left end, for example, without limitation thereto.

However, the order in which the guide images and the terminal display code images are displayed is not limited to this order, and the guide images and the terminal display code images may be arranged in the order of the time at which corresponding terminal display codes stored in the terminal-display-code stock data 2831 were acquired, such that the guide image and the terminal display code image corresponding to the terminal display code that was acquired latest are displayed at the left end, for example.

Alternatively or additionally, the guide images and the terminal display code images may be arranged in random order.

Effects of Third Embodiment

In the third embodiment, a guide image (a non-limiting example of information relating to the number) that is based on the number of remaining codes is displayed in the code display screen displayed in the display 24 of the terminal 20, an entire image that includes a terminal display code image is gradually scaled up such that the image fills the display screen of the display 24 from the position at which the guide image is displayed (a non-limiting example of displaying a first code image in a first region near the position at which the information relating to the number is displayed in the display region), and when the image finally fills the display screen of the display 24, the scaling up processing ends and the terminal display code image is displayed (a non-limiting example of, after the first code image is displayed in the first region, displaying the first code image in a second region that is farther from the position at which the information relating to the number is displayed in the display region, than the first region is,).

This configuration has an effect of enabling the terminal to display a correspondence between information relating to the number of pieces of first information stored in the storage and first information that is displayed, such that the user of the terminal may be easily aware of (recognize) the correspondence.

Third Variation (1)

In the third embodiment, a display method of a case where a terminal display code displayed in the code display screen is included in the counted remaining codes is described as an example, but similar may be said for a case where a terminal display code displayed in the code display screen is excluded from remaining codes to be counted.

As described in Second Variation (2), it is conceivable to employ a method of displaying the-number-of-remainingcodes information while excluding a terminal display code displayed in the code display screen from remaining codes that are to be counted.

In this case, it is necessary to notify the user that the terminal display code (code image) displayed in the code display screen is not included in the remaining codes. Therefore, display may be performed as described below, for example, without limitation thereto.

For example, when a method of displaying rectangular guide images as shown in FIG. 6A is applied, the controller 21 displays a code image of a stocked terminal display code at the center of the code display screen, and displays the same number of guide images as remaining codes from which the displayed terminal display code is excluded, for example, without limitation thereto. At this time, the controller 21 causes all of the guide images to be displayed in the default state (docs not emphasize any of the guide images).

Alternatively or additionally, when a method of displaying guide images that are imitations of two-dimensional codes as shown in FIG. 6B or 6C is applied, for example, the controller 21 displays a code image of a terminal display code at the center of the code display screen, and displays the same number of guide images as remaining codes from which the displayed terminal display code is excluded, for example, without limitation thereto. At this time, the controller 21 causes all of the guide images to be displayed in the non-active state (does not cause any of the guide images to be displayed in the active state).

That is, when the number of remaining codes counted while excluding the terminal display code displayed in the code display screen is five, for example, five guide images are displayed in the display mode described above in the code display screen.

This configuration enables the user to recognize that the displayed terminal display code image does not correspond to (does not have a correspondence with) any of the guide images, and consequently know that the displayed code (code image) is not included in the remaining codes.

Third Variation (2)

Terminal display codes in the present disclosure may be used not only in the online state but also in the offline state as described above. In the online state, the terminal 20 may receive the terminal payment completion notification from the server 10 immediately after payment is carried out by the server 10. Accordingly, after receiving the terminal payment completion notification, the terminal 20 may delete data regarding a terminal display code used for payment from the terminal-display-code stock data 2831, for example, without limitation thereto.

However, in the offline state, the terminal 20 cannot receive the terminal payment completion notification from the server 10 until the terminal 20 returns to the online state, and therefore the terminal 20 cannot be aware of whether or not payment has been earned out by the server 10. Accordingly, even if the user of the terminal 20 used a terminal display code displayed in the code display screen for payment (presented the terminal display code so as to be read by the store code reader device 50) in the offline state, for example, the terminal 20 cannot delete the terminal display code. Therefore, there is a risk in that the user of the terminal 20 may cause the terminal display code that has been used for payment to be displayed again in the code display screen and use the terminal display code again for payment, for example.

Therefore, a configuration may be employed in which, when the controller 21 of the terminal 20 has detected a swipe operation performed by the user on the code display screen shown in FIG. 6D, for example, and switched display to the next terminal display code image, data of the terminal display code that has been displayed before the switching is deleted (discarded) so as not to be displayed again.

Similar may be said for other display methods (e.g., the display methods shown in FIGS. 6A to 6C). That is, a configuration may be employed in which date of a terminal display code that has been displayed and then hidden is deleted, for example, so that the terminal display code cannot be displayed (used for payment) again.

Alternatively or additionally, the following method may be employed.

When the terminal 20 has detected that the communication state is the online state, the terminal 20 does not delete a terminal display code that has been displayed and then hidden, and allows the terminal display code to be displayed again.

On the other hand, when the terminal 20 has detected that the communication state is the offline state, the terminal 20 deletes a terminal display code that has been displayed and then hidden so that the terminal display code will not be displayed again.

Third Variation (3)

Other than the various methods for displaying the-number-of-remaining-codes information described above, it is also possible to apply a display method in which, when the user of the terminal 20 performs a swipe operation (e.g., an upward swipe operation) to turn over a page that displays a terminal display code as if turning over a sheet of a page-a-day calendar, a page that displays the next terminal display code appears, for example, without limitation thereto.

In this case, a configuration may be employed in which data of the terminal display code displayed in the previous page is deleted when once the page is turned over, for example, and the terminal display code cannot be displayed again, similarly to Third Variation (2).

Third Variation (4)

In the third embodiment, display of a terminal display code image is triggered by a touch operation performed on a guide image, but there is no limitation thereto. That is, a configuration may be employed in which the various types of guide images described above are merely information (the-number-of-remaining-codes information) that indicates the number of remaining codes (stock number), and display of a terminal display code image is triggered by an operation other than a touch operation performed on a guide image.

The terminal 20 causes a code display screen including the same number of code images as the remaining codes to be displayed based on a touch operation performed on the code icon displayed in the top screen of the payment application, for example, without limitation thereto. At this time, an operation image such as a button for displaying or switching code information (including a code image and original information) or a button for displaying or switching pages is also displayed in the code display screen, for example, without limitation thereto.

Then, every time an operation (e.g., a touch operation) performed on the operation image is detected, the terminal 20 causes a terminal display code image to be displayed from among terminal display codes respectively corresponding to the guide images, in random order or in the order of the time at which the terminal display codes were acquired, and changes display modes of the guide images, for example, without limitation thereto.

Fourth Embodiment

A fourth embodiment is an embodiment relating to supplementation of terminal display codes stocked in the terminal 20 and a user interface for the supplementation.

Matter described in the fourth embodiment may also be applied to other embodiments and variations.

Constitutional elements that are the same as those already described are denoted with the same reference numerals as those used for corresponding elements, and a redundant description thereof is omitted.

Processing

Figure 7A:
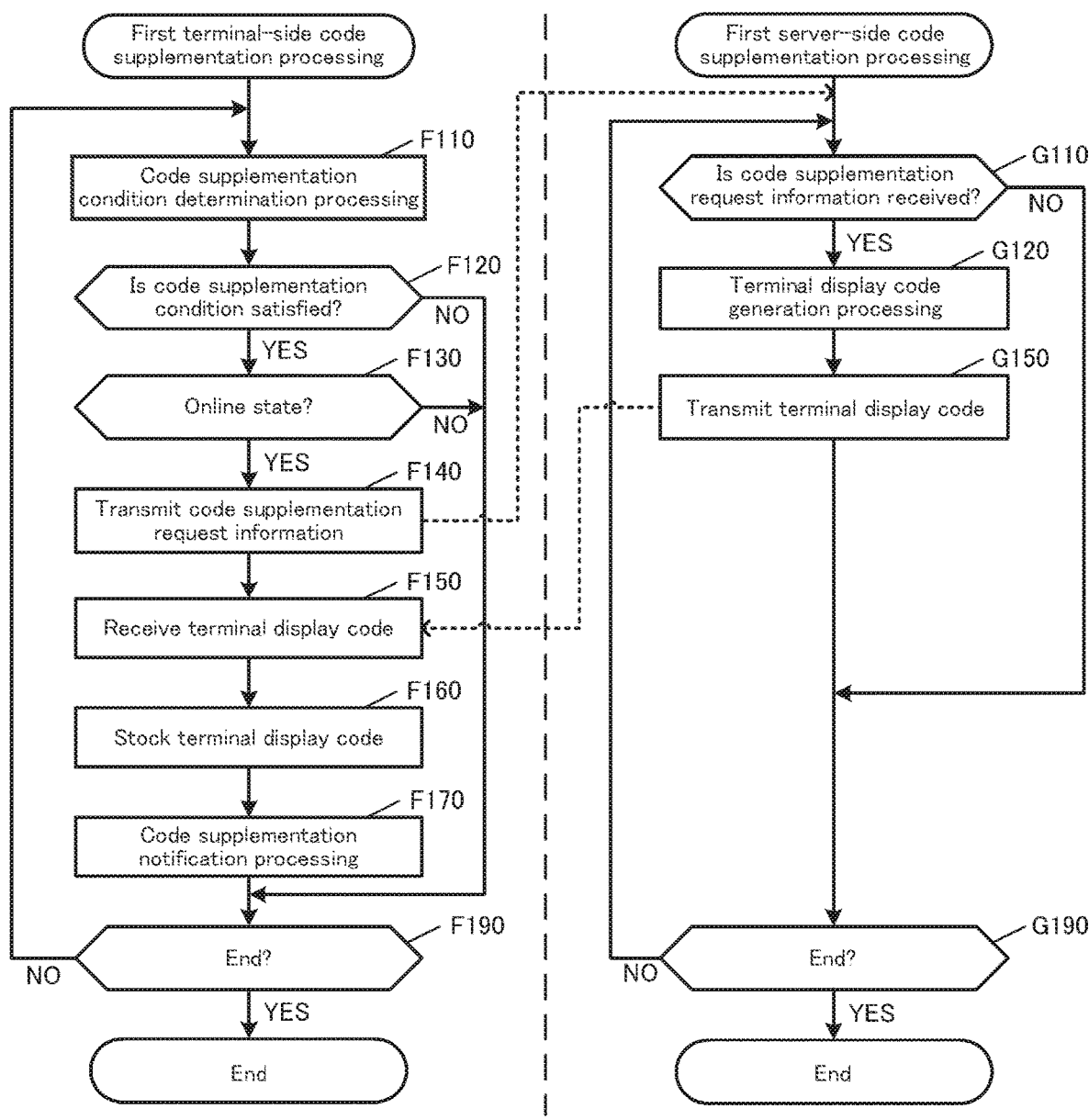
FIG. 7A is a flowchart showing an example flow of first terminal-side code supplementation processing and first server-side code supplementation processing according to a fourth embodiment.

FIG. 7A is a flowchart showing an example flow of processing that is executed by the devices in the present embodiment. First terminal-side code supplementation processing that is executed by the controller 21 of the terminal 20 is shown on the left, and first server-side code supplementation processing that is executed by the controller 11 of the server 10 is shown on the right.

The first terminal-side code supplementation processing and the first server-side code supplementation processing are respectively executed as sub processing (e.g., executed in the background) of the above-described payment application processing performed by the terminal 20 and the above-described payment management processing performed by the server 10, for example, without limitation thereto.

First, the controller 21 performs code supplementation condition determination processing (operation FI 10). The following conditions may be set as code supplementation conditions, for example.

(1) Zero-remaining-codes information is displayed and an approval operation is detected.

(2) A code supplementation operation is detected.

(3) An electromagnetic wave environment (communication environment) of the terminal has changed.

(4) A code update timing or a code update time has been reached.

The condition (1) is a condition indicating that a code is added when an approval operation performed by the user of the terminal 20 on zero-remaining-codes information is detected after the zero-remaining-codes information is displayed in the display 24 by the controller 21.

In some embodiments, a configuration may not include detection of the approval operation in the condition. For example, a configuration may be employed in which a code is automatically added when the zero-remaining-codes information is displayed in the display 24 by the controller 21.

The condition (2) is a condition indicating that a code is added when an operation (hereinafter referred to as a "code supplementation operation") for adding a code that is made by the user of the terminal 20 is detected.

The condition (3) is a condition indicating that a code is added when the electromagnetic wave environment (communication environment) of the terminal 20 has changed. Note that radio waves are commonly used for conventional communication, and accordingly a code may also be added based on a change in a radio wave environment, rather than a change in the electromagnetic wave environment.

When it is detected that the electromagnetic wave environment of the terminal 20 has changed from a "medium electromagnetic wave environment" to a "weak electromagnetic wave environment" based on the intensity of electromagnetic waves, for example, without limitation thereto, the terminal may enter the offline state, and accordingly a terminal display code may be added.

The condition (4) is a condition indicating that a code is added periodically (e.g., every 12 hours or every 24 hours) or at a specific time (e.g., midnight).

In operation FI 10, the controller 21 determines whether or not at least one of the code supplementation conditions described above is satisfied, for example, without limitation thereto.

Note that the code supplementation conditions described above are merely examples, and other conditions may also be set.

Alternatively or additionally, a combination of two or more of the code supplementation conditions described above may also be set as a code supplementation condition, for example, without limitation thereto.

Alternatively or additionally, which of the code supplementation conditions described above is to be applied may also be selected and set by the user of the terminal 20, for example, without limitation thereto.

Upon determining that a code supplementation condition is satisfied (operation F120: YES), the controller 21 determines whether or not the communication state is the online state (operation F130). Upon determining that the communication state is the online state (operation F130: YES), the controller 21 transmits code supplementation request information that includes at least an application ID, for example, without limitation thereto, through the communication I/F 22 to the server 10 (operation F140).

In some embodiments, the code generation request information described above may be transmitted from the terminal 20 to the server 10 instead of the code supplementation request information.

The controller 11 of the server 10 determines whether or not the code supplementation request information has been received from the terminal 20 (operation G110). Upon determining that the code supplementation request information has been received (operation G110: YES), the controller 11 performs terminal display code generation processing (operation G120). Then, the controller 21 transmits the generated terminal display code through the communication I/F 14 to the terminal 20 (operation G150).

Thereafter, the controller 11 determines whether or not to end the processing (operation G190), and upon determining to continue the processing (operation G190: NO), returns to operation G110. Upon determining to end the processing (operation G190: YES), the controller 11 ends the first server-side code supplementation processing.

If no code generation request information has been received from the terminal 20 (operation G110: NO), the controller 11 proceeds to operation G190.

Upon receiving the terminal display code from the server 10 through the communication I/F 22 (operation F150), the controller 21 adds and stores the received terminal display code in the terminal-display-code stock data 2831 (operation F160).

Thereafter, the controller 21 performs code supplementation notification processing (operation F170). In the code supplementation notification processing, processing is performed to display information (hereinafter referred to as "code supplementation notification information") indicating that the stock of terminal display codes has been supplemented, in the display 24.

That is, if the payment application is not being executed, the code supplementation notification information is displayed in the display 24 using a push notification that is associated with the payment application, for example, without limitation thereto.

Alternatively or additionally, if the payment application is being executed, the code supplementation notification information is displayed in the screen (e.g., the code display screen) of the payment application.

Thereafter, the controller 21 determines whether or not to end the processing (operation F190), and upon determining to continue the processing (operation F190: NO), returns to operation FI 10. Upon determining to end the processing (operation F190: YES), the controller 21 ends the first terminal-side code supplementation processing.

If it is determined that the code supplementation conditions are not satisfied (operation F120: NO), or it is determined that the communication state is not the online state (operation F130: NO), the controller 11 proceeds to operation F190.

In some embodiments, the code supplementation request information may be information that requests addition of a terminal display code, and/or may be information that requests addition of a plurality of terminal display codes. That is, in the terminal 20 or the server 10, an upper limit is set for the number of codes for which the terminal 20 requests the addition of at a time (or the number of codes to be generated by the server 10 at a time for addition), for example, without limitation thereto, rather than terminal display codes being added one-by-one. The user of the terminal 20 may add the upper limit number of terminal display codes through a single operation. In this case, the plurality of terminal display codes may be generated by the server 10, the generated terminal display codes may be transmitted to the terminal 20, and the received terminal display codes may be added to the stock in the terminal 20.

Display Screen Examples

Figure 7B:
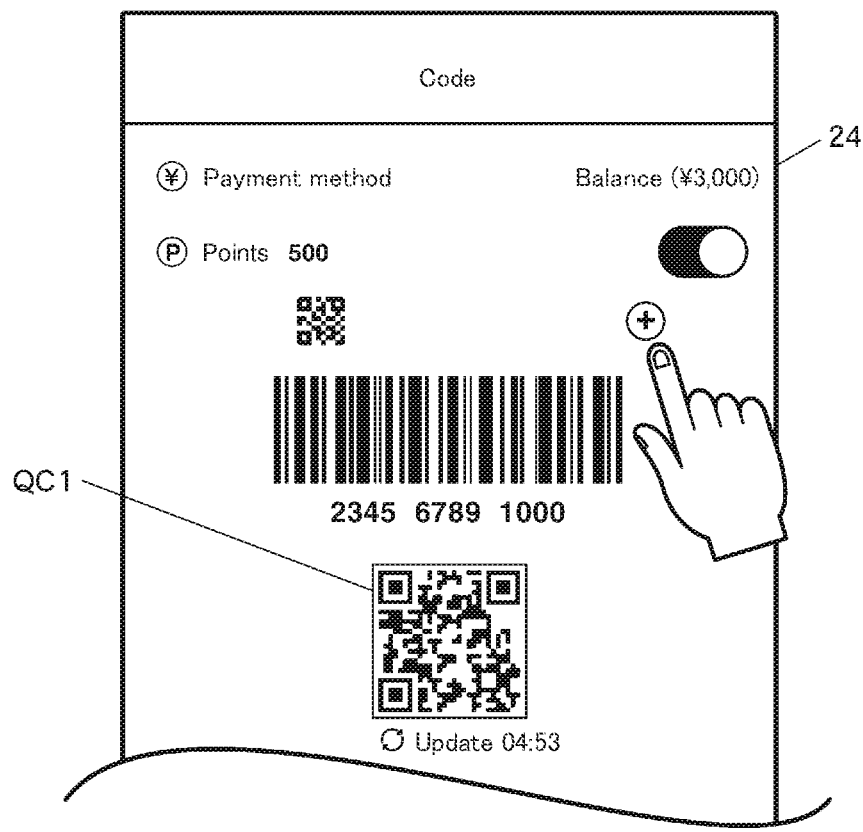
FIG. 7B is a diagram showing a first example of a display screen of a terminal according to the fourth embodiment.

FIG. 7B is a diagram showing an example of the code display screen in the present embodiment.

In this code display screen, a guide image that is an illustration of a two-dimensional code is displayed as one example of the-number-of-remaining-codes information, above the region in which a one-dimensional terminal display code image is displayed, similarly to the code display screen shown in FIG. 6C. Alternatively or additionally, on the right of the region in which the guide image is displayed, a code supplementation icon that is shown as a circle including a "+" mark therein is displayed as one example of an operation image to be used by the user of the terminal 20 to perform a code supplementation operation. When the code supplementation icon is touched by the user of the terminal 20, stock of terminal display codes is supplemented through the processing described above.

Figure 7C:
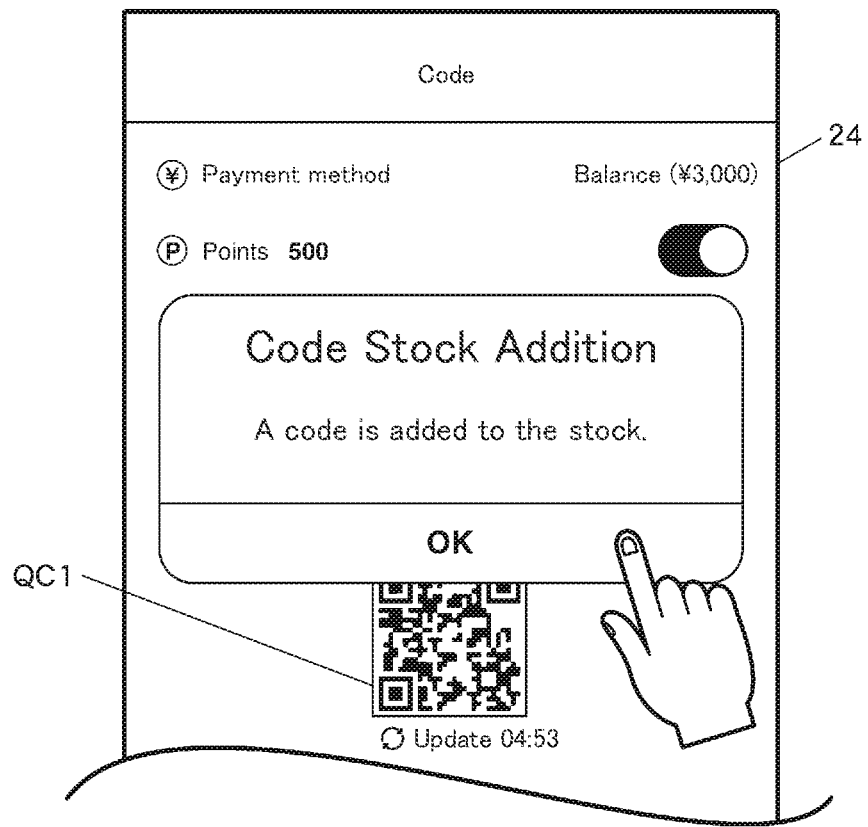
FIG. 7C is a diagram showing a second example of the display screen of the terminal according to the fourth embodiment.

FIG. 7C is a diagram showing an example of a code supplementation notification in the present embodiment.

In this code display screen, a pop-up message "Code Stock Addition A code is added to the stock." is displayed as one example of the code supplementation notification, together with an OK icon at the center of the screen.

Figure 7D:
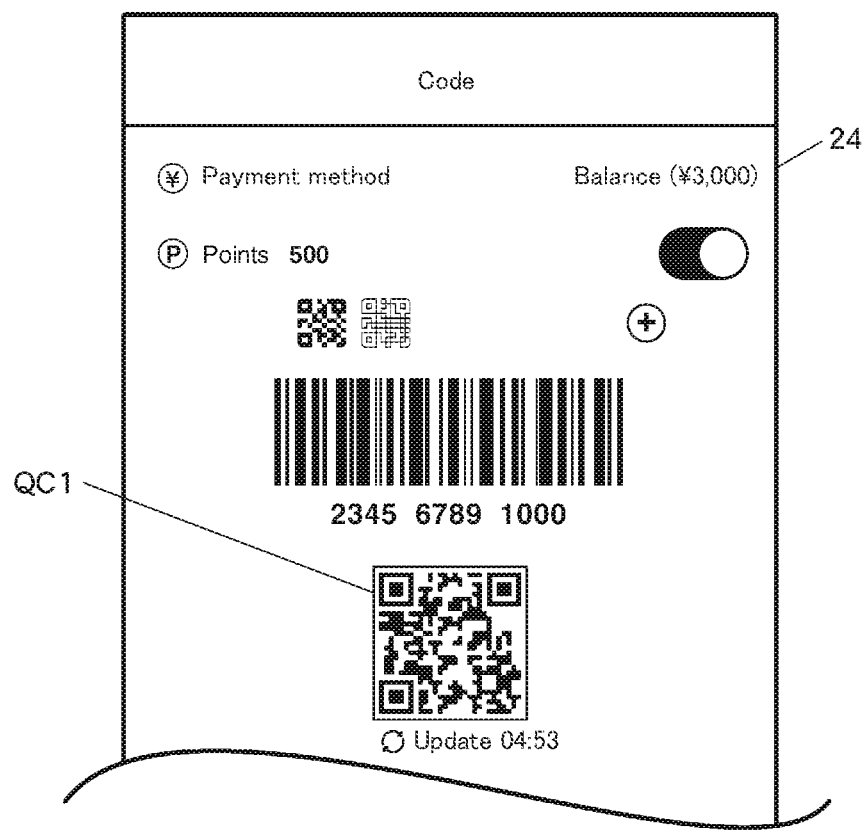
FIG. 7D is a diagram showing a third example of the display screen of the terminal according to the fourth embodiment.

FIG. 7D is a diagram showing an example of a screen that is displayed when the OK icon is touched in the screen shown in FIG. 7C.

In this code display screen, a guide image that corresponds to the added terminal display code is additionally displayed on the right of the guide image that is displayed in the code display screen shown in FIG. 7A, as a result of the terminal display code having been added to the stock. The additionally displayed guide image corresponding to the terminal display code is displayed in a non-active state.

This is an example of the display screen of a case where information that requests addition of a single terminal display code has been transmitted as code supplementation request information from the terminal 20 to the server 10, a single terminal display code has been generated by the server 10, the generated terminal display code has been transmitted to the terminal 20, and the received terminal display code has been added to the stock in the terminal 20.

Figure 7E:
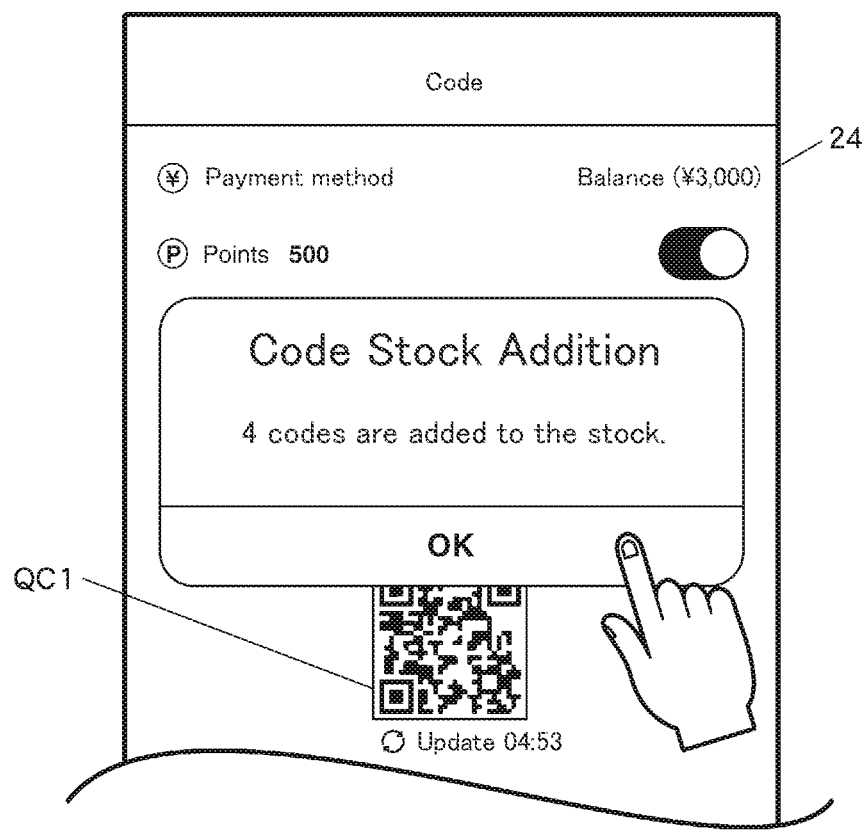
FIG. 7E is a diagram showing a fourth example of the display screen of the terminal according to the fourth embodiment.

FIG. 7E is a diagram showing an example of the code supplementation notification in the present embodiment.

In this code display screen, a pop-up message "Code Stock Addition 4 codes are added to the stock." is displayed as one example of the code supplementation notification, together with an OK icon at the center of the screen.

Figure 7F:
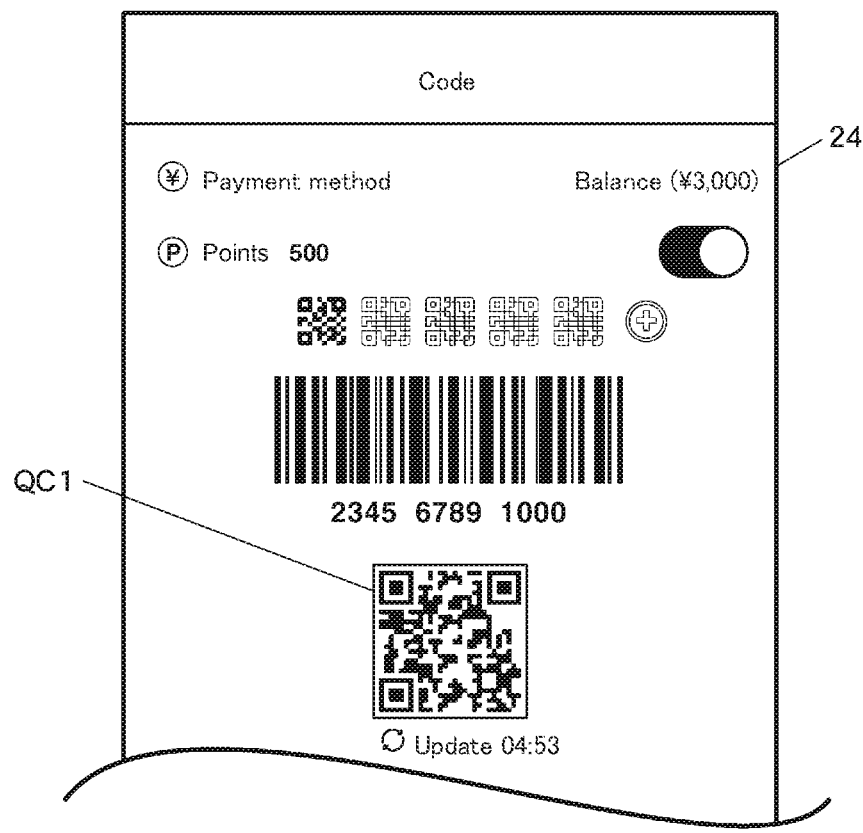
FIG. 7F is a diagram showing a fifth example of the display screen of the terminal according to the fourth embodiment.

FIG. 7F is a diagram showing an example of a screen that is displayed when the OK icon is touched in the screen shown in FIG. 7E.

In this code display screen, four guide images that correspond to four added terminal display codes are additionally displayed on the right of the guide image that is displayed in the code display screen shown in FIG. 7A, as a result of the four terminal display codes having been added to the stock. The additionally displayed guide images corresponding to the four terminal display codes are displayed in the non-active state.

This is an example of the display screen of a case where information that requests addition of four terminal display codes has been transmitted as code supplementation request information from the terminal 20 to the server 10, four terminal display codes have been generated by the server 10, the generated four terminal display codes have been transmitted to the terminal 20, and the received four terminal display codes have been added to the stock in the terminal 20.

Other than the above, a configuration may be employed in which the number of codes to be added is selected by the user of the terminal 20 when the user performs a code supplementation operation to add codes, for example.

Figure 7G:
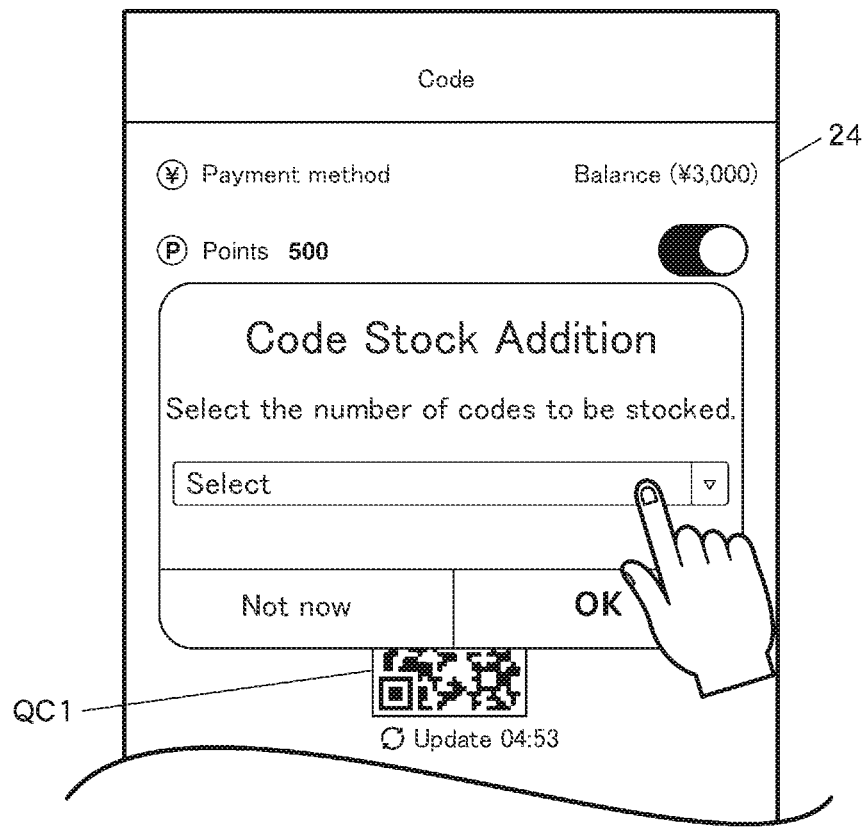
FIG. 7G is a diagram showing a sixth example of the display screen of the terminal according to the fourth embodiment.

FIG. 7G is a diagram showing an example of the code display screen of this case.

In this code display screen, a message "Code Stock Addition Select the number of codes to be stocked." is displayed together with a box that includes the text "Select" and that is to be used by the user of the terminal 20 to select the number of codes to be added.

Figure 7H:
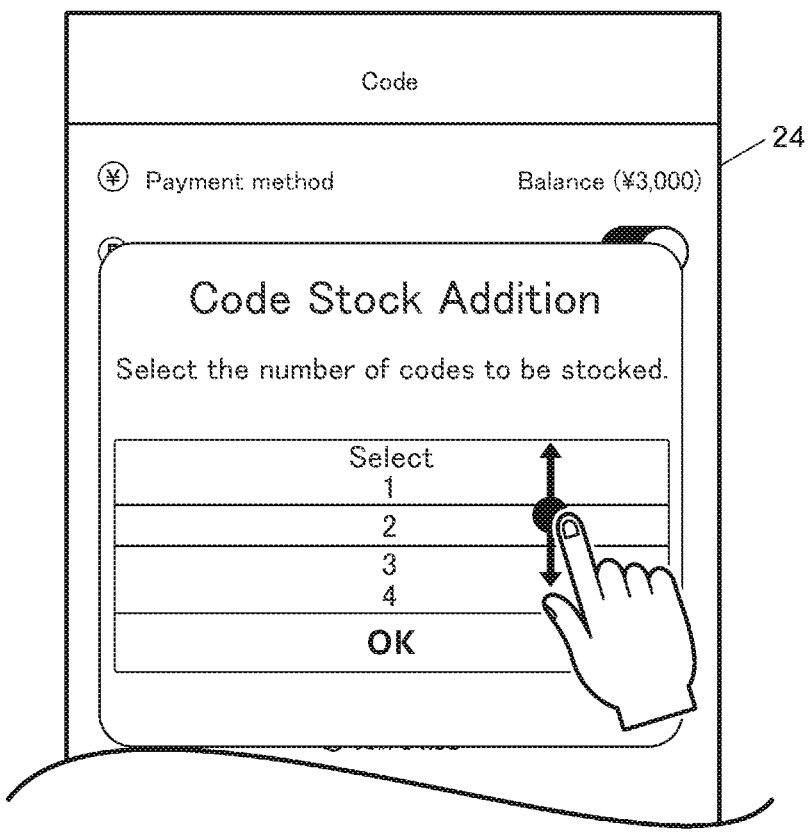
FIG. 7H is a diagram showing a seventh example of the display screen of the terminal according to the fourth embodiment.

When the box that includes the text "Select" is touched, a wheel picker that includes multiple candidates for the number of codes to be added and enables the user to select the number of codes by scrolling is displayed as shown in FIG. 7H, for example, without limitation thereto. For example, when "2" is selected by the user of the terminal 20, "2" is displayed in the box as shown in FIG. 7I, for example, and two codes are added when the OK icon is touched.

Figure 7I:
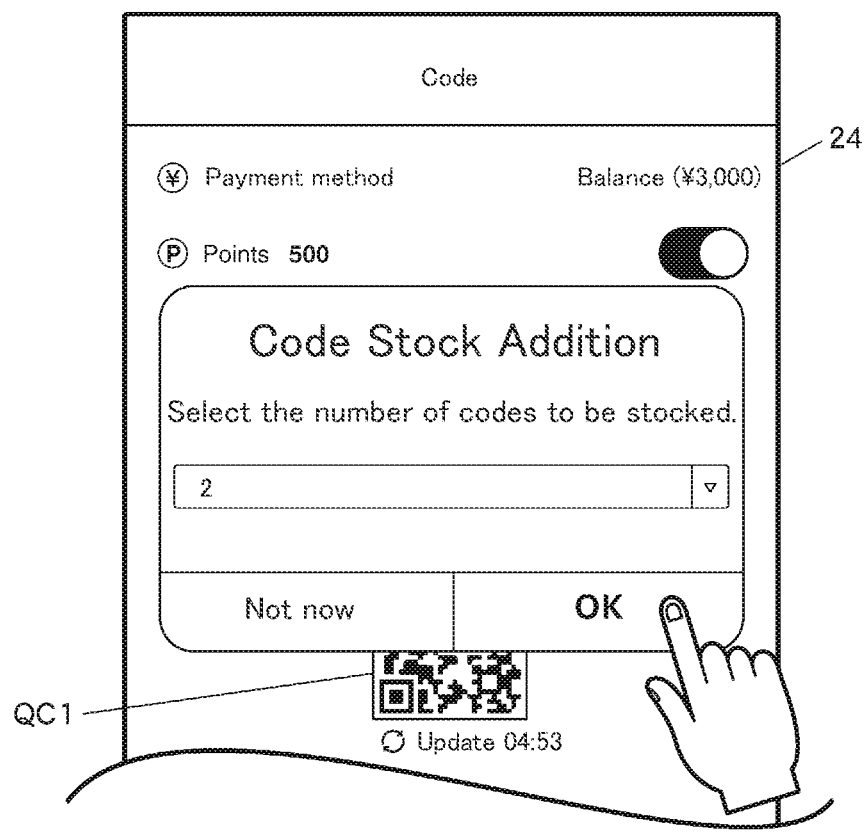
FIG. 7I is a diagram showing an eighth example of the display screen of the terminal according to the fourth embodiment.
Figure 7J:
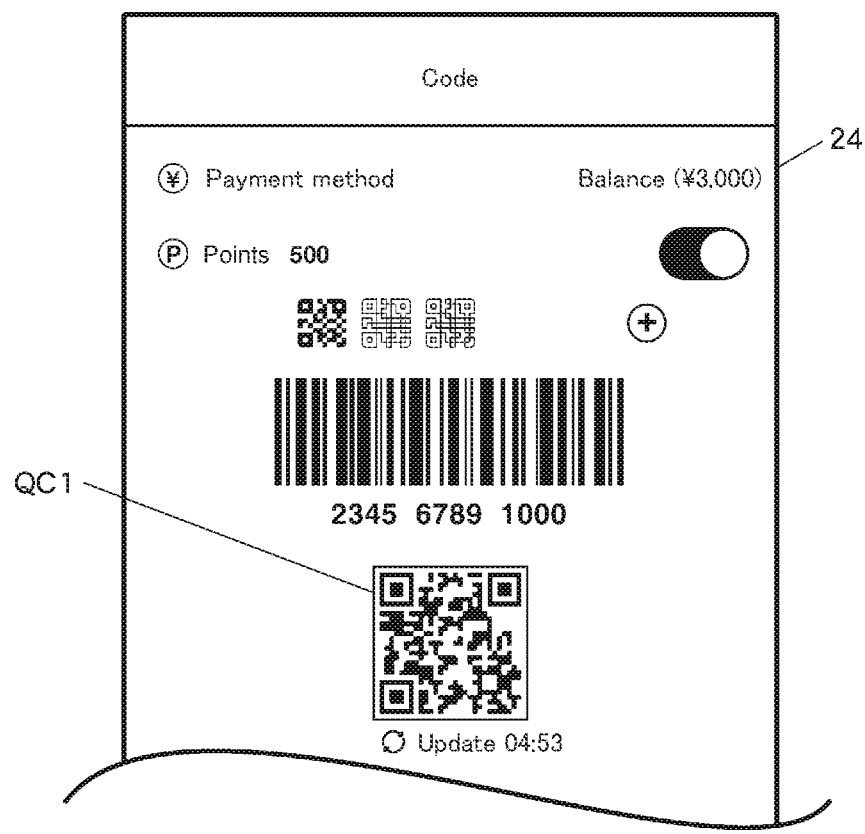
FIG. 7J is a diagram showing a ninth example of the display screen of the terminal according to the fourth embodiment.

FIG. 7J is a diagram showing an example of a screen that is displayed when the OK icon is touched in the screen shown in FIG. 7I.

In this code display screen, two guide images that correspond to the two added terminal display codes are additionally displayed on the right of the guide image that is displayed in the code display screen shown in FIG. 7A, as a result of the two terminal display codes having been added to the stock. The additionally displayed guide images corresponding to the two terminal display codes are displayed in the non-active state.

Effects of Fourth Embodiment

In the fourth embodiment, the controller 21 of the terminal 20 changes a display mode of the-number-of-remainingcodes information based on reception of a terminal display code via the communication I/F 22.

This configuration has an effect of enabling the terminal to notify the user of the terminal that first information has been supplemented via the communication interface, for example, by changing the display mode of information relating to the number of pieces of first information stored in the storage.

Alternatively or additionally, in the fourth embodiment, the controller 21 of the terminal 20 gives a code supplementation notification (a non-limiting example of a notification indicating that first information has been received) to the user of the terminal 20 based on reception of a terminal display code via the communication I/F 22.

This configuration has an effect of enabling the terminal to notify the user of the terminal that first information has been received.

Alternatively or additionally, in the fourth embodiment, the terminal 20 transmits code generation request information or code supplementation request information (a non-limiting example of a request relating to transmission of first information) to the server 10 via the communication I/F 22 based on display of remaining code count related information (a non-limiting example of second information) in the display 24.

This configuration has an effect of enabling the terminal to acquire first information from the server by transmitting a request relating to transmission of the first information, to the server, based on display of second information.

Fifth Embodiment

A fifth embodiment is an embodiment that realizes supplementation of the stock of terminal display codes in the offline state.

Matter described in the fifth embodiment may also be applied to other embodiments and variations.

Constitutional elements that are the same as those already described are denoted with the same reference numerals as those used for corresponding elements, and a redundant description thereof is omitted.

In the present embodiment, a state where the terminal 20 and the server 10 cannot communicate with each other using the first communication method described above will be referred to as the "offline state". It is assumed that the terminal 20 may communicate with the server 10 using the second communication method described above.

Processing

Figure 8A:
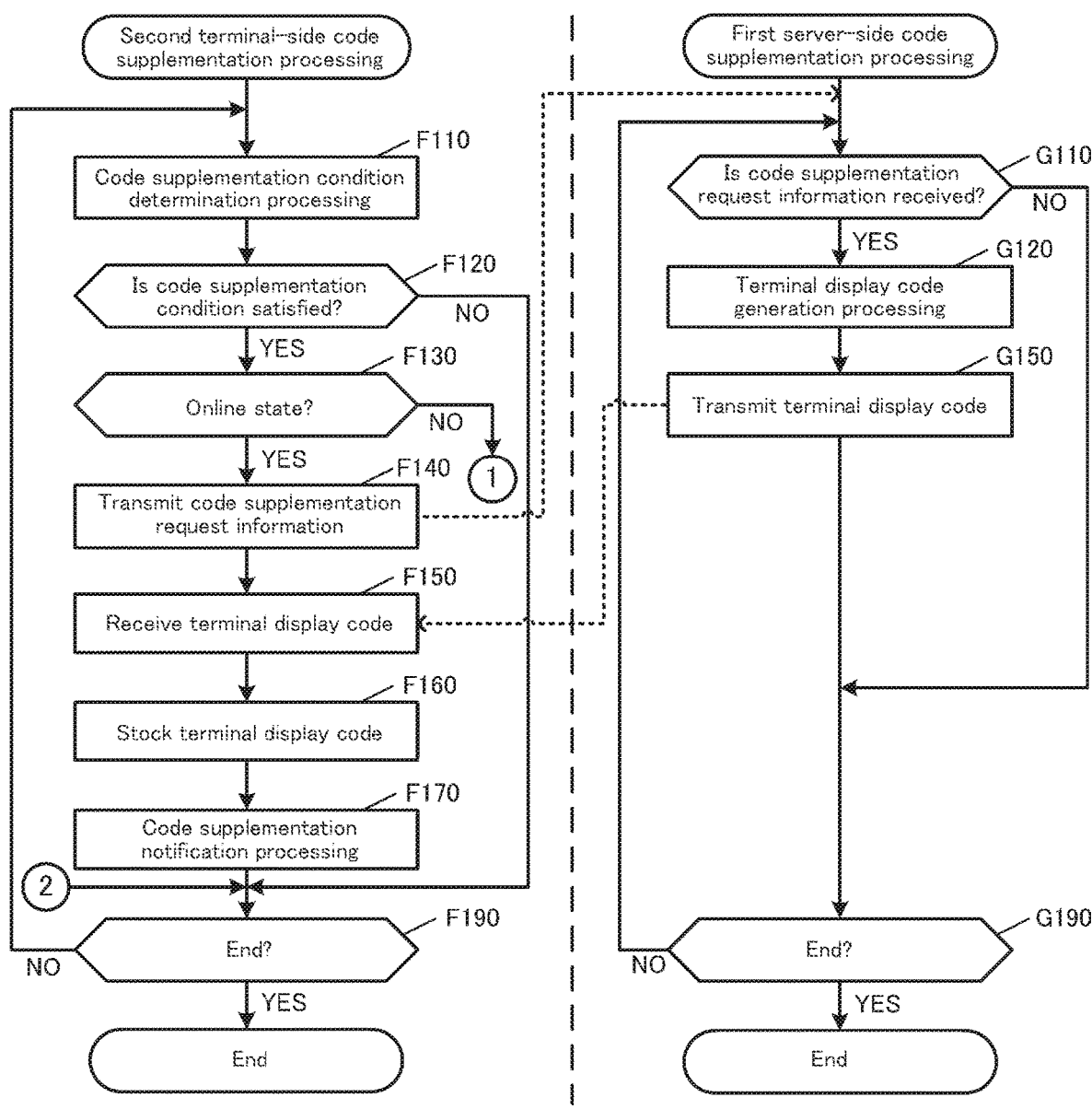
FIG. 8A is a flowchart showing an example flow of second terminal-side code supplementation processing according to a fifth embodiment.
Figure 8B:
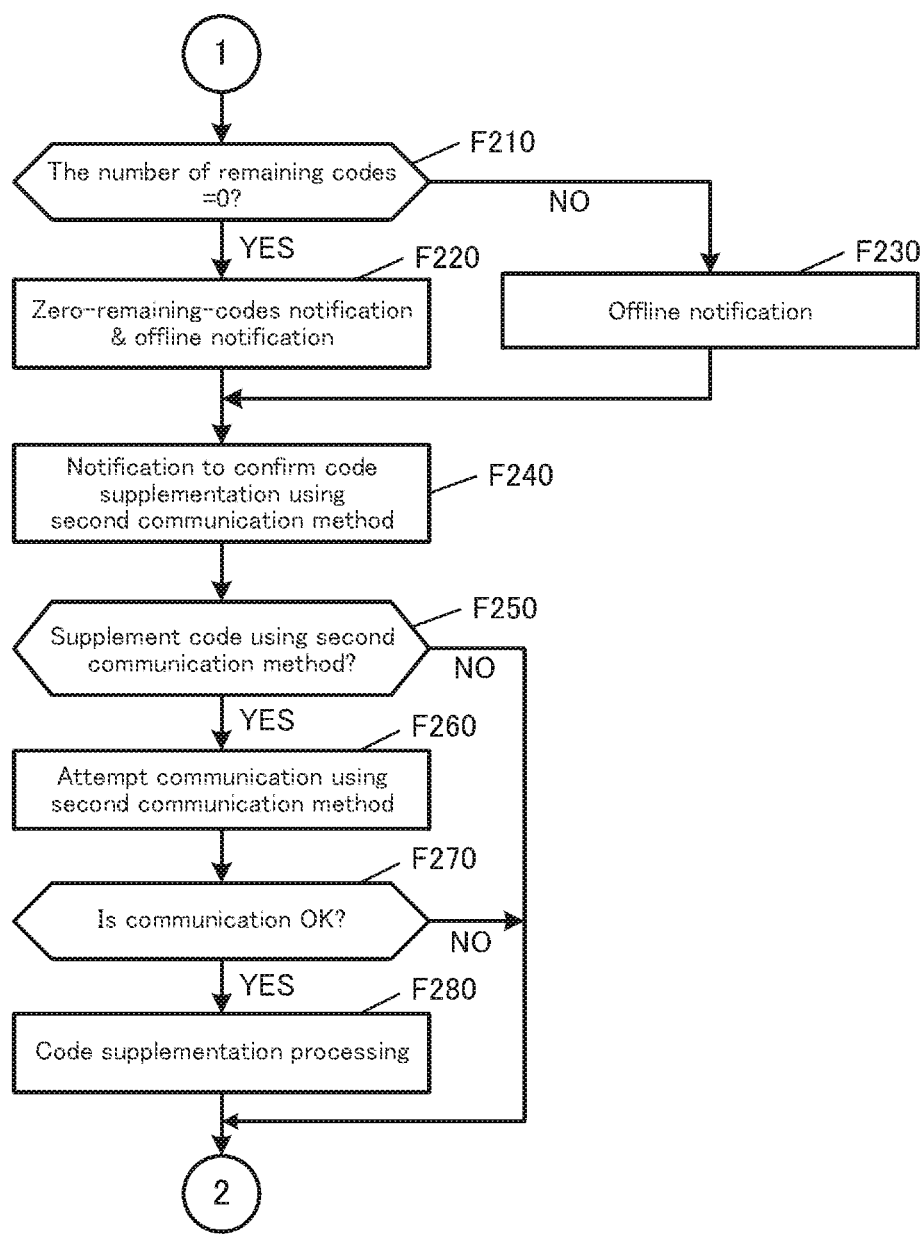
FIG. 8B is a flowchart showing an example flow of the second terminal-side code supplementation processing according to the fifth embodiment.

FIGS. 8A and 8B are flowcharts showing an example flow of processing that is executed by the devices in the present embodiment. Second terminal-side code supplementation processing that is executed by the controller 21 of the terminal 20 is shown on the left, and first server-side code supplementation processing that is executed by the controller 11 of the server 10 is shown on the right.

The second terminal-side code supplementation processing and the first server-side code supplementation processing are respectively executed as sub processing (e.g., executed in the background) of the above-described payment application processing performed by the terminal 20 and the above-described payment management processing performed by the server 10, for example, without limitation thereto.

The flowcharts shown in FIGS. 8A and 8B include processing (operations F210 to F280) that is performed in the case of NO in operation FI 30, in addition to the processing included in the flowchart shown in FIG. 7A.

Upon determining that the communication state is not the online state in operation F130 (operation F130: NO), the controller 21 determines whether or not the number of remaining codes is zero (operation F210).

Upon determining that the number of remaining codes is zero (operation F210: YES), the controller 21 gives a zero-remaining-codes notification and an offline notification (operation F220). That is, the controller 21 causes the display 24 to display information that indicates that communication cannot be performed with the server 10 using the first communication method (i.e., offline state), together with zero-remaining-codes information, for example, without limitation thereto.

Alternatively or additionally, upon determining that the number of remaining codes is not zero (operation F210: NO), the controller 21 gives an offline notification (operation F230). That is, the controller 21 causes the display 24 to display information indicating that communication cannot be performed with the server 10 using the first communication method (i.e., offline state), for example, without limitation thereto.

After operation F220 or operation F230, the controller 21 gives a notification to confirm code supplementation using the second communication method (operation F240). That is, the controller 21 causes the display 24 to display information for confirming whether or not the user of the terminal 20 has an intention to add a terminal display code using the second communication method, for example, without limitation thereto.

Next, the controller 21 determines whether or not the user of the terminal 20 has made a selection to add a code using the second communication method (operation F250), and upon determining that the user has made a selection to add a code (operation F250: YES), attempts communication using the second communication method (operation F260).

If communication using the second communication method is successful (operation F270: YES), the controller 21 performs code supplementation processing (operation F280). That is, the controller 21 transmits the code supplementation request information described above to the server 10, acquires a terminal display code from the server 10, and supplements the terminal-display-code stock data 2831 by storing the terminal display code therein. Then, the controller 21 proceeds to operation F190.

In some embodiments, in order to add a code using the second communication method, a search application for searching for places (spots) such as stores and facilities where wireless LAN (e.g., WiFi), which is an example of the second communication method, may be used is downloaded to the terminal 20 in advance and is stored in the storage 28, as an application that may cooperate with the payment application, for example, without limitation thereto.

If the user of the terminal 20 has made a selection to add a code using the second communication method when the notification to confirm code supplementation using the second communication method is given in operation F240, for example, the controller 21 may launch the search application stored in the terminal 20 and perform processing of searching for spots where the second communication method may be used.

Display Screen Examples

Figure 8C:
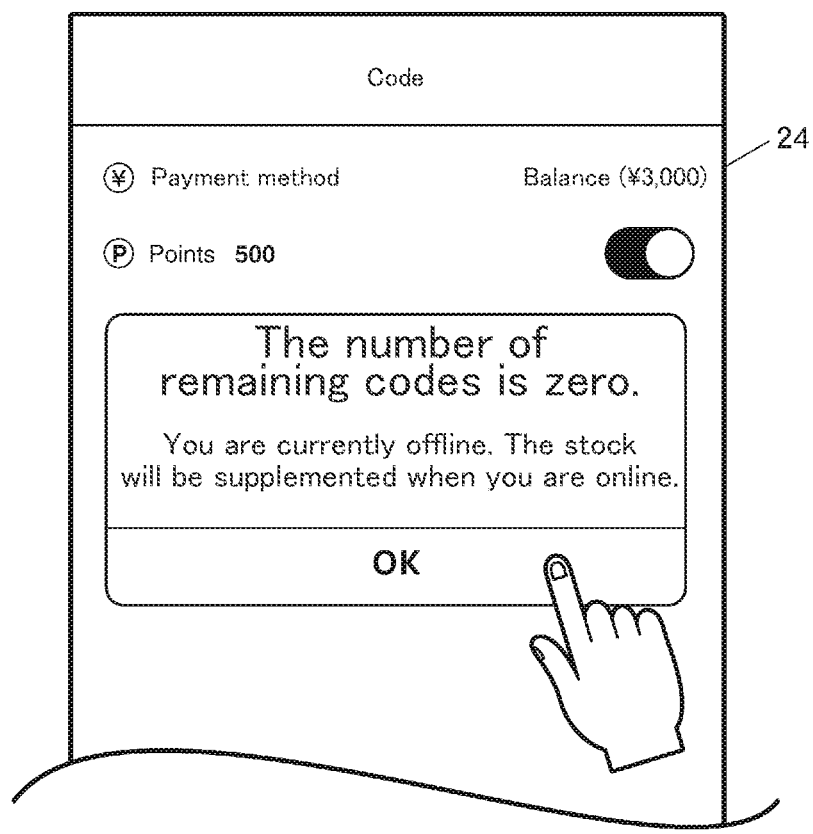
FIG. 8C is a diagram showing a first example of a display screen of a terminal according to the fifth embodiment.

FIG. 8C is a diagram showing an example of the code display screen in the present embodiment. This code display screen is displayed in operation F220 shown in FIG. 8B, for example, without limitation thereto.

In this code display screen, a pop-up message "The number of remaining codes is zero.", which is an example of zero-remaining-codes information, and a pop-up message "You are currently offline. The stock will be supplemented when you are online.", which is an example of information indicating that communication cannot be performed with the server 10 using the first communication method, are displayed as the zero-remaining-codes notification and the offline notification, at the center of the screen. Alternatively or additionally, an "OK" icon for expressing an intention to approve the content of these notifications is displayed.

Figure 8D:
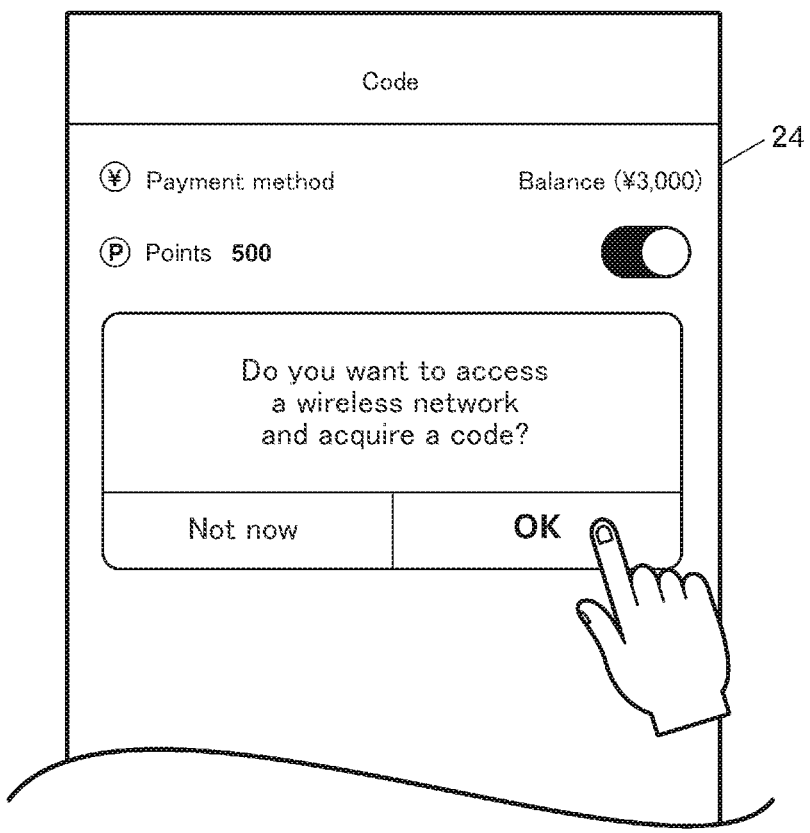
FIG. 8D is a diagram showing a second example of the display screen of the terminal according to the fifth embodiment.

FIG. 8D is a diagram showing an example of a screen that is displayed when the "OK" icon is touched in the code display screen shown in FIG. 8C. This screen is displayed in operation F240 of the processing shown in FIG. 8B, for example, without limitation thereto.

In this screen, as the notification to confirm code supplementation using the second communication method, a pop-up message "Do you want to access a wireless network and acquire a code?" is displayed at the center of the screen, as an example of information that confirms whether or not the user of the terminal 20 has an intention to add a terminal display code using the second communication method. Alternatively or additionally, an "OK" icon for expressing an intention to approve the content of this notification and a "not now" icon for expressing an intention not to approve the content of this notification at present are displayed.

Figure 8E:
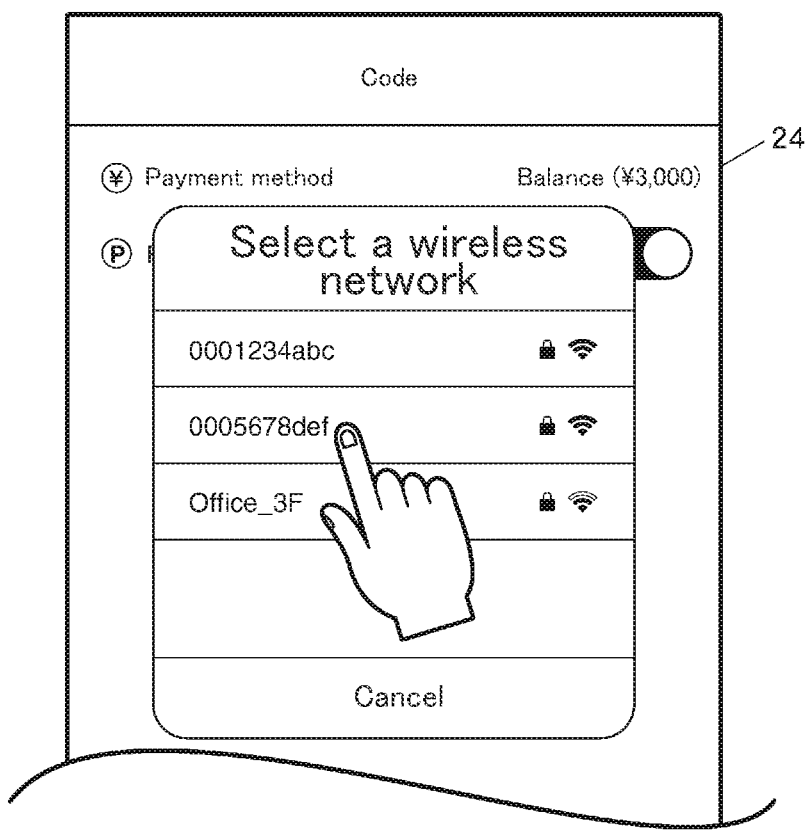
FIG. 8E is a diagram showing a third example of the display screen of the terminal according to the fifth embodiment.

If the "OK" icon shown in FIG. 8D is touched, a screen is displayed as shown in FIG. 8E, for example.

In this screen, a selection box for selecting a wireless network is displayed at the center of the screen, and the user of the terminal 20 selects a wireless network from candidate wireless networks shown in the selection box.

When a wireless network is selected in FIG. 8E, communication is attempted using the selected wireless network. If the communication is OK, a terminal display code is acquired from the server 10, and a screen shown in FIG. 8F is displayed, for example.

This display example shows a case where information that requests addition of five terminal display codes has been transmitted as code supplementation request information from the terminal 20 to the server 10, five terminal display codes have been generated by the server 10, the generated five terminal display codes have been transmitted to the terminal 20, and the received five terminal display codes have been added to the stock in the terminal 20, and a pop-up message "Code Stock Addition 5 codes are added to the stock" is displayed at the center of the screen.

Figure 8F:
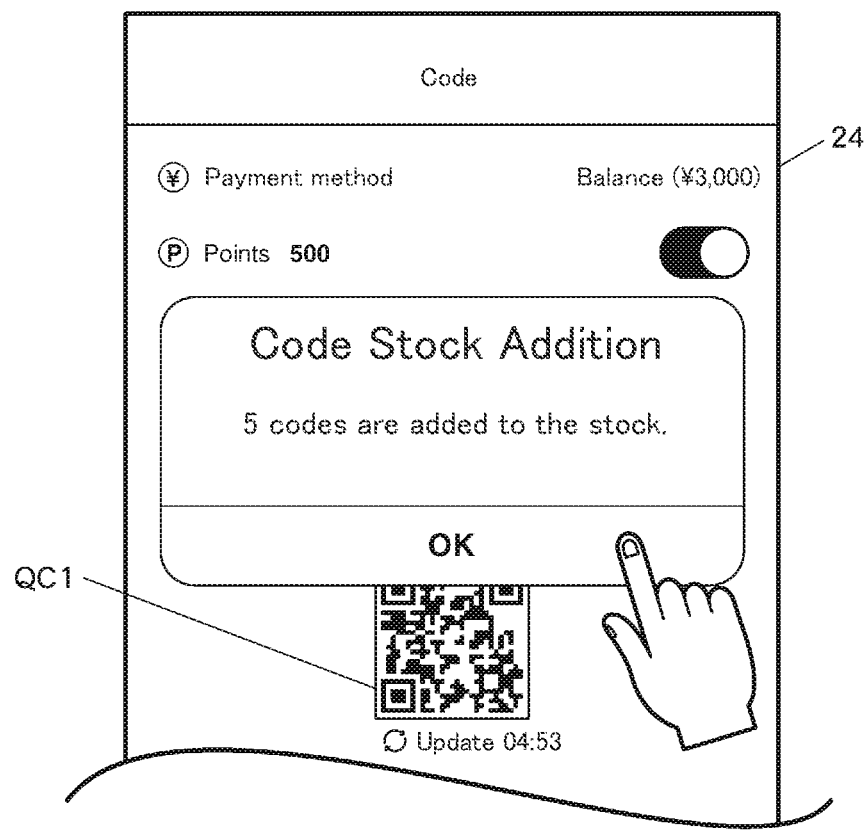
FIG. 8F is a diagram showing a fourth example of the display screen of the terminal according to the fifth embodiment.
Figure 8G:
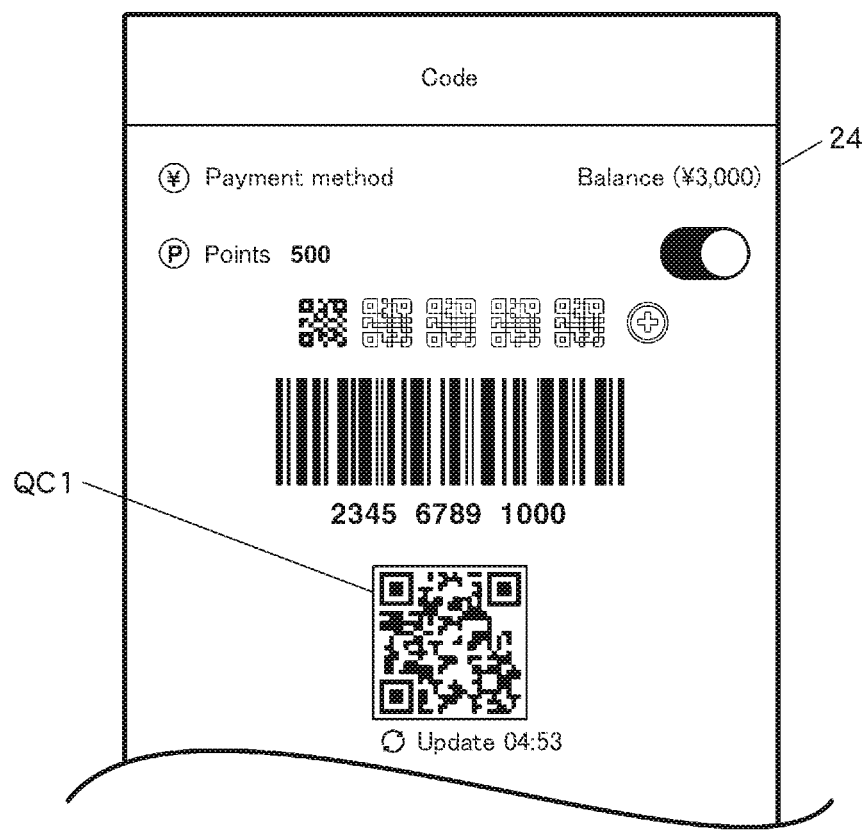
FIG. 8G is a diagram showing a fifth example of the display screen of the terminal according to the fifth embodiment.

FIG. 8G is a diagram showing an example of a screen that is displayed when the OK icon is touched in the screen shown in FIG. 8F.

In this code display screen, five guide images corresponding to the five added terminal display codes are displayed as a result of the five terminal display codes having been added to the stock. Alternatively or additionally, a terminal display code image that corresponds to the leftmost guide image is displayed at the center of the screen, and the four guide images other than the leftmost guide image are displayed in the non-active state.

Effects of Fifth Embodiment

In the fifth embodiment, the terminal 20 displays information indicating the offline state (a non-limiting example of information indicating that communication cannot be performed by the terminal) in the code display screen. Based on a touch operation that is made by the user of the terminal 20 (a non-limiting example of input that is made by the user of the terminal) with respect to the information indicating the offline state, the terminal 20 displays, in the code display screen, information (a non-limiting example of information regarding a setting of communication performed by the terminal) for adding a code using the second communication method.

This configuration has an effect of enabling the terminal to notify the user of the terminal that communication cannot be performed by the terminal, and perform setting of communication performed by the terminal based on the input made by the user of the terminal. Therefore, even if communication cannot be performed using the first communication method, for example, if the second communication method is set, communication may be performed with the server using the second communication method.

What is claimed is:

1. An information processing method of a terminal, the information processing method comprising:
    receiving, by the terminal from a server, first information for making a payment using a code image;
    scanning, by the terminal, the code image using a code reader;
    storing the first information in a storage of the terminal;
    storing, in the storage of the terminal, code generation time information based on a first time measurement of a clock of the terminal;
    determining whether a communication state of the terminal consists of an offline state or an online state;
    displaying, by a display of the terminal, the code image based on the first information;
    displaying, by the display, a remaining time based on the first time measurement of the clock of the terminal;
    processing, by the terminal whether the communication state of the terminal is the offline state or the online state, the payment based on the displaying of the code image and payment information received from the code reader, the payment information generated based on the first information;
    displaying, by the display, second information based on the processing of the payment and a second plurality of pieces of the first information other than a first plurality of pieces of the first information not being stored in the storage, the second information indicating the first information is not stored in the storage, the first plurality of pieces of the first information being stored in the storage, the first plurality of pieces of the first information indicating a case of an emergency;
    preventing deletion of the displayed code image based on determining that the communication state of the terminal is the online state and the terminal is connected to a network;
    stopping, based on a second time measurement of the clock indicating that the remaining time has elapsed and the payment information not being received from the code reader, the displaying of the code image and the remaining time, and causing a user of the terminal to acquire a new code image prior to making the payment; and
    after the new code image has been presented to the user via the display, processing, by the terminal based on the remaining time having elapsed, the payment based on the displaying of the new code image.

2. The information processing method according to claim 1, wherein the second information is displayed based on the first plurality of pieces of the first information stored in the storage.

3. The information processing method according to claim 1,
wherein the second information notifies the user of the terminal that the first information is not stored in the storage.

4. The information processing method according to claim 1, further comprising:
displaying, by the display, third information indicating a number of pieces of the first information stored in the storage,
wherein the second information is a type of the third information indicating the number of pieces and indicates that the number of pieces of the first information stored in the storage is zero.

5. The information processing method according to claim 4, wherein the displaying of the third information comprises:
displaying the third information indicating the number of pieces in a display mode that has been changed based on the number of pieces of the first information stored in the storage.

6. The information processing method according to claim 5, further comprising:
changing the display mode of the third information indicating the number of pieces, based on the displaying of the code image.

7. The information processing method according to claim 6, wherein the displaying of the code image comprises:
displaying the code image in a first region of the display at a first distance from a position on the display at which the third information indicating the number of pieces is displayed, the first distance being less than a threshold; and
displaying, after the code image has been displayed in the first region, the code image in a second region of the display at a second distance from the position at which the third information indicating the number of pieces is displayed, the second distance being greater than the first distance.

8. The information processing method according to claim 5, further comprising:
changing the display mode of the third information indicating the number of pieces, based on reception of the first information.

9. The information processing method according to claim 1, further comprising:
notifying, the user of the terminal, that the first information has been received, based on reception of the first information.

10. The information processing method according to claim 1, further comprising:
transmitting, to the server, a request requesting transmission of the first information, based on the displaying of the second information.

11. The information processing method according to claim 1, further comprising:
displaying, by the display, third information indicating that communication cannot be performed by the terminal; and
displaying, by the display, fourth information indicating establishment of communication to be performed by the terminal, based on input from the user of the terminal in response to the displaying of the third information.

12. A non-transitory computer-readable storage medium storing a program that, when executed by at least one processor of a terminal, causes the terminal to:
receive, from a server, first information for making a payment using a code image;
scan, by the terminal, the code image using a code reader;
store, in a storage of the terminal, the first information;
store, in the storage of the terminal, code generation time information based on a first time measurement of a clock of the terminal;
determine whether a communication state of the terminal consists of an offline state or an online state;
display, by a display of the terminal, the code image based on the first information;
display, by the display, a remaining time based on the first time measurement of the clock of the terminal;
process the payment, whether the communication state of the terminal is the offline state or the online state, based on the display of the code image and payment information received from the code reader, the payment information generated based on the first information;
display, by the display, second information based on the processing of the payment and a second plurality of pieces of the first information other than a first plurality of pieces of the first information not being stored in the storage, the second information indicating that the first information is not stored in the storage, the first plurality of pieces of the first information being stored in the storage, the first plurality of pieces of the first information indicating a case of an emergency;
prevent deletion of the displayed code image based on a determination that the communication state of the terminal is the online state and the terminal is connected to a network;
stop, based on a second time measurement of the clock indicating that the remaining time has elapsed and the payment information not being received from the code reader, the displaying of the code image and the remaining time, and cause a user of the terminal to acquire a new code image prior to making the payment; and
after the new code image has been presented to the user via the display, process, based on the remaining time having elapsed, the payment based on the display of the new code image.

13. A terminal for processing information, the terminal comprising:
a communication interface configured to receive, from a server, first information for making a payment using a code image;
a storage;
a clock configured to output time information;
a display; and
a processor configured to:
scan the code image using a code reader,
store, in the storage, the first information,
store, in the storage, code generation time information based on a first time measurement of the clock,
determine whether a communication state of the terminal consists of an offline state or an online state,
control the display to display the code image based on the first information,
control the display to display a remaining time based on the first time measurement of the clock of the terminal,
process the payment, whether the communication state of the terminal is the offline state or the online state, based on the display of the code image and payment information received from the code reader, the payment information generated based on the first information, control the display to display second information based on the processing of the payment and a second plurality of pieces of the first information other than a first plurality of pieces of the first information not being stored in the storage, the second information indicating that the first information is not stored in the storage, the first plurality of pieces of the first information being stored in the storage, the first plurality of pieces of the first information indicating a case of an emergency, prevent deletion of the displayed code image based on a determination that the communication state of the terminal is the online state and the terminal is connected to a network;

control the display, based on a second time measurement of the clock indicating that the remaining time has elapsed and the payment information not being received from the code reader, the displaying of the code image and the remaining time, to stop the display of the code image and the remaining time, and cause a user of the terminal to acquire a new code image prior to making the payment; and after the new code image has been presented to the user via the display, process, based on the remaining time having elapsed, the payment based on the display of the new code image.

14. A terminal for processing information, the terminal comprising:
a communication interface;
a display;
a clock configured to output time information;
a storage storing instructions; and
a processor configured to execute the instructions to:
receive, from a server via the communication interface, first information for making a payment using a code image;
scan the code image using a code reader;
store, in the storage, the first information;
store, in the storage, code generation time information based on a first time measurement of the clock;
determine whether a communication state of the terminal consists of an offline state or an online state;
control the display to display the code image based on the first information;
control the display to display a remaining time based on the first time measurement of the clock of the terminal;
process the payment, whether the communication state of the terminal is the offline state or the online state, based on the display of the code image and payment information received from the code reader, the payment information generated based on the first information;
control the display to display second information based on the processing of the payment and a second plurality of pieces of the first information other than a first plurality of pieces of the first information not being stored in the storage, the second information indicating that the first information is not stored in the storage, the first plurality of pieces of the first information being stored in the storage, the first plurality of pieces of the first information indicating a case of an emergency;
prevent deletion of the displayed code image based on a determination that the communication state of the terminal is the online state and the terminal is connected to a network;
control the display, based on a second time measurement of the clock indicating that the remaining time has elapsed and the payment information not being received from the code reader, the displaying of the code image and the remaining time, to stop the display of the code image and the remaining time, and a user of the terminal to acquire a new code image prior to making the payment; and
after the new code image has been presented to the user via the display, process, based on the remaining time having elapsed, the payment based on the display of the new code image.

* * * * *